US012737692B1

(12) United States Patent
Petersen

(10) Patent No.: US 12,737,692 B1
(45) Date of Patent: Sep. 15, 2026

(54) HETEROGENEOUS RELAXATIONS IN DIFFERENTIABLE LOGIC GATE NETWORKS

(71) Applicant: DiffLogic Inc., Dover, DE (US)

(72) Inventor: Felix Petersen, Santa Clara, CA (US)

(73) Assignee: DiffLogic Inc., Dover, DE (US)

( * ) Notice: Subject to any disclaimer, the term of this patent is extended or adjusted under 35 U.S.C. 154(b) by 0 days.

(21) Appl. No.: 19/562,765

(22) Filed: Mar. 11, 2026

Related U.S. Application Data

(60) Provisional application No. 63/772,329, filed on Mar. 14, 2025, provisional application No. 63/927,929, filed on Nov. 30, 2025, provisional application No. 64/002,139, filed on Mar. 10, 2026.

(51) Int. Cl.
*G06N 20/00* (2019.01)
*G06N 5/04* (2023.01)

(52) U.S. Cl.
CPC ............... *G06N 20/00* (2019.01); *G06N 5/04* (2013.01)

(58) Field of Classification Search
None
See application file for complete search history.

(56) References Cited

U.S. PATENT DOCUMENTS 10,970,441 B1 * 4/2021 Zhang .................. G06F 30/327
11,244,227 B2 2/2022 Asai
11,494,634 B2 11/2022 Luus et al.
11,861,486 B2 1/2024 Kim et al.
12,045,319 B2 7/2024 Riegel et al.
12,067,484 B2 8/2024 Umuroglu et al.
12,260,188 B2 3/2025 Shin et al.
12,327,182 B2 6/2025 Timofejevs et al.
2016/0342891 A1 * 11/2016 Ross ...................... G06N 3/063
(Continued)

FOREIGN PATENT DOCUMENTS

TW 202137070 A 10/2021
TW 202138785 A 10/2021
(Continued)

OTHER PUBLICATIONS

Liu et al., "DARTS: Differentiable Architecture Search," Apr. 23, 2019, https://arxiv.org/abs/1806.09055v2.*
(Continued)

*Primary Examiner* — Ryan Barrett
(74) *Attorney, Agent, or Firm* — PCFB, LLC; Justin K. Flanagan

(57) ABSTRACT

Systems, methods, and computer-readable media are described for training and implementing logic gate networks for inference tasks. An untrained node network includes a first set of nodes parameterized by differentiable parameters, each associated with a predefined set of potential logic gate operators, and a second set of nodes corresponding to predefined logic gate operators. During training, node outputs of the first set are computed using a first relaxation, and node outputs of the second set are computed using a second relaxation different from the first relaxation. Updated differentiable parameters are applied over multiple training iterations, and a fixed logic-gate network is generated by selecting logic gate operators for at least some nodes in the first set while retaining the predefined logic gate operators for the second set. In some embodiments, the second relaxation imposes structural inductive bias. ASICs and FPGAs implementing fixed logic gate networks are also described.

20 Claims, 25 Drawing Sheets

(56) References Cited

U.S. PATENT DOCUMENTS

| | | | |
|---|---|---|---|
| 2019/0044535 | A1 | 2/2019 | Ahmad |
| 2019/0156206 | A1* | 5/2019 | Graham ............ G06F 16/90335 |
| 2019/0311243 | A1 | 10/2019 | Whatmough et al. |
| 2020/0005148 | A1 | 1/2020 | Nori et al. |
| 2020/0042877 | A1 | 2/2020 | Whatmough et al. |
| 2020/0282719 | A1* | 9/2020 | Katayama ............ B41J 2/16517 |
| 2021/0089889 | A1 | 3/2021 | Gope et al. |
| 2021/0097130 | A1 | 4/2021 | Liu et al. |
| 2021/0182653 | A1 | 6/2021 | Markram et al. |
| 2021/0192272 | A1* | 6/2021 | Liu ..................... C22B 21/0015 |
| 2021/0192323 | A1 | 6/2021 | Whatmough et al. |
| 2021/0374508 | A1 | 12/2021 | Whatmough et al. |
| 2021/0390367 | A1 | 12/2021 | Liu et al. |
| 2022/0035890 | A1 | 2/2022 | Liu et al. |
| 2022/0101085 | A1 | 3/2022 | Garcia Redondo et al. |
| 2022/0164127 | A1 | 5/2022 | Bhargava et al. |
| 2022/0164137 | A1 | 5/2022 | Bhargava et al. |
| 2022/0188345 | A1* | 6/2022 | Onkar ................... G06F 16/433 |
| 2022/0351032 | A1 | 11/2022 | Chou et al. |
| 2022/0382690 | A1 | 12/2022 | Whatmough et al. |
| 2023/0019360 | A1 | 1/2023 | Whatmough et al. |
| 2023/0026113 | A1 | 1/2023 | Whatmough et al. |
| 2023/0042271 | A1 | 2/2023 | Fedorov et al. |
| 2023/0082952 | A1 | 3/2023 | Kim et al. |
| 2023/0155702 | A1* | 5/2023 | Wang ................... H04B 17/391 370/252 |
| 2023/0169391 | A1* | 6/2023 | Chen ...................... G06N 3/082 706/12 |
| 2023/0229921 | A1 | 7/2023 | Fedorov et al. |
| 2023/0260200 | A1* | 8/2023 | Aroudj .................... G06T 15/06 345/418 |
| 2023/0267319 | A1 | 8/2023 | Rouhani et al. |
| 2023/0281432 | A1 | 9/2023 | Nazemi et al. |
| 2024/0007631 | A1* | 1/2024 | Finlay .................. G06N 3/0455 |
| 2024/0104387 | A1* | 3/2024 | Alesiani ................... G06N 3/08 |
| 2024/0289163 | A1* | 8/2024 | Akutsu ................. G06F 9/4806 |
| 2024/0394532 | A1* | 11/2024 | Marrie ................... G06N 3/084 |
| 2025/0004762 | A1 | 1/2025 | Mehendale et al. |
| 2025/0005354 | A1* | 1/2025 | Zeghidour ............. G06N 3/084 |
| 2025/0111231 | A1 | 4/2025 | Witschen et al. |
| 2025/0139457 | A1* | 5/2025 | Petersen ................ G06N 3/082 |
| 2025/0225386 | A1* | 7/2025 | Binkley ................... G06N 3/08 |
| 2025/0330601 | A1* | 10/2025 | Mazumdar ........... H04N 19/597 |

FOREIGN PATENT DOCUMENTS

| | | | |
|---|---|---|---|
| TW | 202147250 | A | 12/2021 |
| TW | 202201290 | A | 1/2022 |
| WO | 2025240550 | A1 | 11/2025 |

OTHER PUBLICATIONS

Petersen et al., "Differentiable Sorting Networks for Scalable Sorting and Ranking Supervision," Jul. 14, 2021, https://arxiv.org/abs/2105.04019.*

Jang et al., "Pooling Revisited: Your Receptive Field is Suboptimal," Jun. 29, 2022, https://arxiv.org/abs/2205.15254.*

Petersen et al., "Convolutional Differentiable Logic Gate Networks," Nov. 7, 2024, https://arxiv.org/abs/2411.04732v1.*

Chang Yue and Niraj K. Jha, "Learning Interpretable Differentiable Logic Networks," IEEE Transactions on Circuits and Systems for Artificial Intelligence, vol. 1, No. 1, pp. 69-82, Sep. 2024, DOI: 10.1109/TCASAI.2024.3462303.

European Patent Office, Communication pursuant to Article 94(3) EPC, European Patent Application No. 22 713 283.4, Applicant Petersen Research, LLC, dated Apr. 9, 2026, 11 pages.

Arkin Gupta, "How a Neural Network Works," Data Science Student Society @ UC San Diego, Medium, May 27, 2018, 11 pages, https://medium.com/ds3ucsd/how-a-neural-network-works-db6fcc90ef92.

International Search Report for International Application No. PCT/EP2022/051710, Applicant Universität Konstanz, dated Sep. 12, 2022, 3 pages.

Diederik P. Kingma and Jimmy Lei Ba, "Adam: A Method for Stochastic Optimization," Published as a conference paper at ICLR 2015, arXiv: 1412.6980v9 [cs.LG], Jan. 30, 2017, 15 pages.

Christos Louizos, Max Welling, and Diederik P. Kingma, "Learning Sparse Neural Networks Through LO Regularization," Published as a conference paper at ICLR 2018, arXiv:1712.01312v2 [stat.ML], Jun. 22, 2018, 13 pages.

Xiangming Meng, Roman Bachmann, and Mohammad Emtiyaz Khan, "Training Binary Neural Networks using the Bayesian Learning Rule," Proceedings of the 37th International Conference on Machine Learning, PMLR 119, 2020, arXiv:2002.10778v4 [cs.LG], Aug. 18, 2020, 18 pages.

Felix Petersen, Christian Borgelt, Hilde Kuehne, and Oliver Deussen, "Deep Differentiable Logic Gate Networks," 36th Conference on Neural Information Processing Systems (NeurIPS 2022), arXiv:2210.08277v1 [cs.LG], Oct. 15, 2022, 18 pages.

Felix Petersen, Hilde Kuehne, Christian Borgelt, Julian Welzel, and Stefano Ermon, "Convolutional Differentiable Logic Gate Networks," 38th Conference on Neural Information Processing Systems (NeurIPS 2024), arXiv:2411.04732v1 [cs.LG], Nov. 7, 2024, 17 pages.

Iván Ramírez, Francisco J. García-Espinosa, David Concha, and Luis Alberto Aranda, "Logic Neural Networks for Efficient FPGA Implementation," IEEE Transactions on Circuits and Systems I: Regular Papers, vol. 72, No. 7, pp. 3390-3398, Jul. 2025, DOI: 10.1109/TCSI.2024.3488119.

Wolfgang Roth, Günther Schindler, Bernhard Klein, Robert Peharz, Sebastian Tschiatschek, Holger Fröning, Franz Pernkopf, and Zoubin Ghahramani, "Resource-Efficient Neural Networks for Embedded Systems," arXiv:2001.03048v3 [stat.ML], Apr. 7, 2024, 51 pages.

European Patent Office as International Searching Authority, Written Opinion of the International Searching Authority for International Application No. PCT/EP2022/051710, Applicant Universität Konstanz, dated Sep. 12, 2022, 10 pages.

* cited by examiner

1200

| Method | Acc. | # Gates |
|---|---|---|
| DiffLogic Net (medium) [12] | 57.39% | 0.51 M |
| DiffLogic Net (xlarge) [12] | 62.14% | 5.12 M |
| Conv. TTNet (small) [31] | 50.10% | 0.57 M |
| Conv. TTNet (large) [31] | **70.75%** | 189 M |
| FINN CNV [36] | **80.10%** | 901 M |
| LUTNet [33] | **84.95%** | 1 290 M |
| XNOR-Net [35] (NIN) [40] | **86.28%** | 1 780 M |
| RebNet (1 residual) [41] | 80.59% | 2 270 M |
| RebNet (2 residuals) [41] | 85.94% | 2 830 M |
| BinaryNet [42] | 88.60% | 4 090 M |
| Zhao et al. [43] | 88.54% | 4 940 M |
| FBNA CNV [44] | 88.61% | 5 540 M |
| Hirtzlin et al. [45] | 91.   % | 87 400 M |
| LogicTreeNet-S | **60.38%** | 0.40 M |
| LogicTreeNet-M | **71.01%** | 3.08 M |
| LogicTreeNet-B | **80.17%** | 16.0 M |
| LogicTreeNet-L | **84.99%** | 28.9 M |
| LogicTreeNet-G | **86.29%** | 61.0 M |

| Method | Acc. | FPGA t. |
|---|---|---|
| FINN CNV [36] | 80.10% | 45.6 μs |
| RebNet (1 residual) [41] | 80.59% | 167 μs |
| RebNet (2 residuals) [41] | 85.94% | 333 μs |
| Zhao et al. [43] | 88.54% | 5.94 ms |
| FBNA CNV [44] | 88.61% | 1.92 ms |
| FracBNN [47] | 89.10% | 356 μs |
| TrueNorth [48] | 83.41% | A: 801μs |
| LogicTreeNet-S | 60.38% | 9 ns |
| LogicTreeNet-M | 71.01% | 9 ns |
| LogicTreeNet-B | 80.17% | 24 ns |

| Method | Acc. | # Gates | FPGA t. |
|---|---|---|---|
| DiffLogic Net (small) [12] | 97.69% | 48 K | – |
| DiffLogic Net (xlarge) [12] | 98.47% | 384 K | – |
| TTNet (small) [31] | 97.23% | 46 K | – |
| TTNet [31] | 98.02% | 360 K | – |
| LUTNet [33] | 98.01% | – | 5 ns |
| FINN CNV [36] | 98.40% | 5.28 M | 641 ns |
| FINN FCN [36] | 98.86% | 258 M | – |
| LowBitNN [49] | 99.2 % | – | 1.52 μs |
| FPGA-NHAP [50] | 97.81% | – | 4.9 ms |
| LogicTreeNet-S | 98.46% | 147 K | 4 ns |
| LogicTreeNet-M | 99.23% | 566 K | 5 ns |
| LogicTreeNet-L | 99.35% | 1.27 M | – |

| Model | Individual accs. |
|---|---|
| S | 98.21% ± 0.31% |
| M | 99.13% ± 0.11% |
| L | 99.29% ± 0.06% |

| Method | Accuracy | # train. layers | # total layers | or-pool | residual init. | weight decay | 2 input channels |
|---|---|---|---|---|---|---|---|
| LogicTreeNet-L | 84.99% | 15 | 23 | ✓ | ✓ | ✓ | ✓ |
| Conv. d: 1,1,1,1 | 80.98% | 7 | 15 | ✓ | ✓ | ✓ | ✓ |
| Conv. d: 1,1,2,2 | 82.68% | 9 | 17 | ✓ | ✓ | ✓ | ✓ |
| Conv. d: 2,2,2,2 | 83.32% | 11 | 19 | ✓ | ✓ | ✓ | ✓ |
| Conv. d: 2,2,3,3 | 84.13% | 13 | 21 | ✓ | ✓ | ✓ | ✓ |
| No or pooling | 81.45% | 15 | 15 | ✗ | ✓ | ✓ | ✓ |
| Gaussian init. | 76.18% | 15 | 23 | ✓ | ✗ | ✓ | ✓ |
| No weight decay | 83.94% | 15 | 23 | ✓ | ✓ | ✗ | ✓ |
| 8 input channels | 83.53% | 15 | 23 | ✓ | ✓ | ✓ | ✗ |

1600

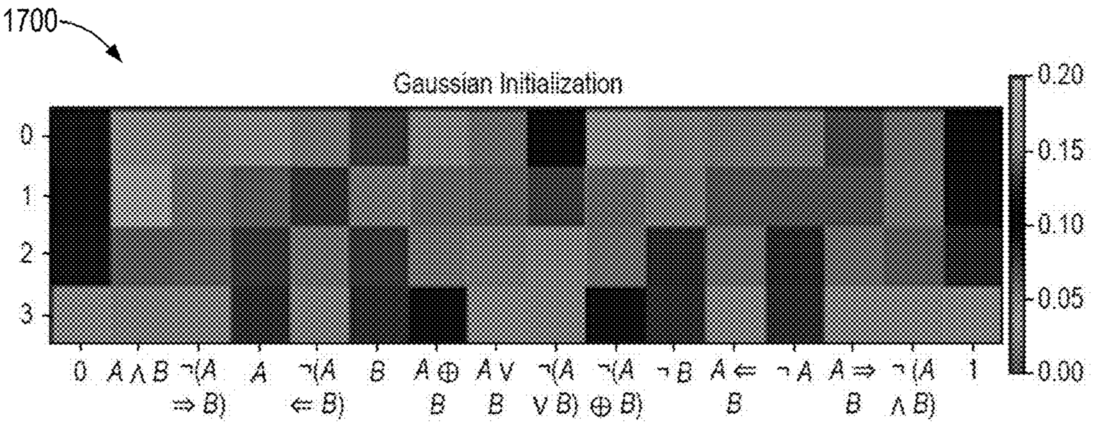
FIG. 17A
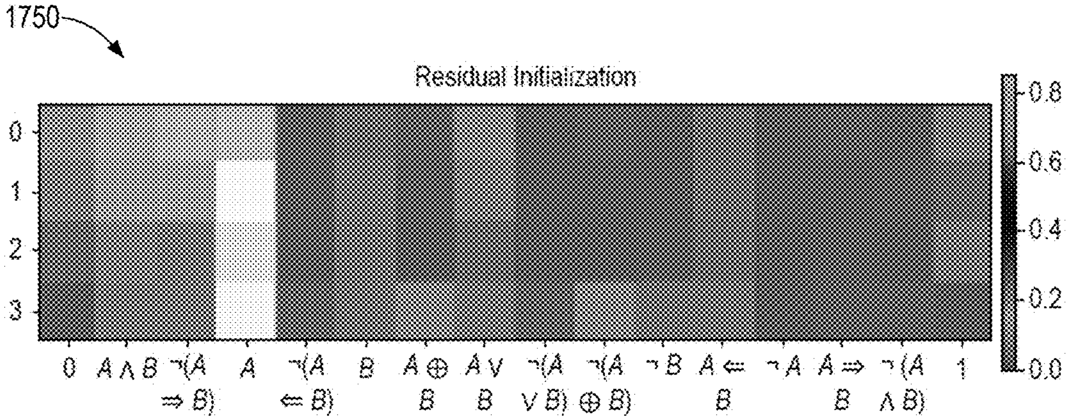
FIG. 17B
1800
| | Neural net teacher | | Diff. LGN student | |
|---|---|---|---|---|
| Environment | reward | latency | reward | latency |
| CartPole-v1 | 493.7 | 12 μs | 500.0 | ≤ 5 ns |
| Acrobot-v1 | −85.09 | 12 μs | −82.78 | ≤ 5 ns |
| LunarLander-v3 | 36.64 | 12 μs | 64.63 | ≤ 5 ns |
FIG. 18

2200

| Data set | | CIFAR-10 | | | | | MNIST | | |
|---|---|---|---|---|---|---|---|---|---|
| Model identifier | | S | M | B | L | G | S | M | L |
| Model scale | k | 32 | 256 | 512 | 1024 | 2 560 | 16 | 64 | 256 |
| Temperature | $T$ | 20 | 40 | 280 | 340 | 450 | 6.5 | 28 | 35 |
| Learning rate | $\eta$ | 0.02 | 0.02 | 0.02 | 0.02 | 0.02 | 0.01 | 0.01 | 0.01 |
| Weight decay | $\beta$ | 0.002 | 0.002 | 0.002 | 0.002 | 0.001 | 0 | 0 | 0 |
| Batch size | bs | 128 | 128 | 128 | 128 | 128 | 512 | 256 | 128 |
| Output gate factor | ox | 1 | 1 | 2 | 2 | 1 | 2 | 2 | 1 |
| # input bits | | 2 | 2 | 5 | 5 | 5 | 1 | 1 | 1 |
| Outputs/ class | $n_{\lambda\lambda}/c$ | 1K | 8K | 32K | 64K | 80K | 1K | 4K | 8K |
| Max score | $n_{\lambda\lambda c}/T$ | 51 | 205 | 117 | 193 | 182 | 158 | 146 | 234 |

2300

2400

2500

2600

| ID | Operator | real-valued | 00 | 01 | 10 | 11 |
|---|---|---|---|---|---|---|
| 0 | False | 0 | 0 | 0 | 0 | 0 |
| 1 | $A \wedge B$ | $A \cdot B$ | 0 | 0 | 0 | 1 |
| 2 | $\neg(A \Rightarrow B)$ | $A - AB$ | 0 | 0 | 1 | 0 |
| 3 | $A$ | $A$ | 0 | 0 | 1 | 1 |
| 4 | $\neg(A \Leftarrow B)$ | $B - AB$ | 0 | 1 | 0 | 0 |
| 5 | $B$ | $B$ | 0 | 1 | 0 | 1 |
| 6 | $A \oplus B$ | $A + B - 2AB$ | 0 | 1 | 1 | 0 |
| 7 | $A \vee B$ | $A + B - AB$ | 0 | 1 | 1 | 1 |
| 8 | $\neg(A \vee B)$ | $1 - (A + B - AB)$ | 1 | 0 | 0 | 0 |
| 9 | $\neg(A \oplus B)$ | $1 - (A + B - 2AB)$ | 1 | 0 | 0 | 1 |
| 10 | $\neg B$ | $1 - B$ | 1 | 0 | 1 | 0 |
| 11 | $A \Leftarrow B$ | $1 - B + AB$ | 1 | 0 | 1 | 1 |
| 12 | $\neg A$ | $1 - A$ | 1 | 1 | 0 | 0 |
| 13 | $A \Rightarrow B$ | $1 - A + AB$ | 1 | 1 | 0 | 1 |
| 14 | $\neg(A \wedge B)$ | $1 - AB$ | 1 | 1 | 1 | 0 |
| 15 | True | 1 | 1 | 1 | 1 | 1 |

| | |
|---|---|
| Minimum | $\top^{M}(a,b)=\min(a,b)$ |
| Probabilistic | $\top^{P}(a,b)=ab$ |
| Einstein | $\top^{E}(a,b)=\frac{ab}{2-a-b+ab}$ |
| Hamacher | $\top_{p}^{H}(a,b)=\frac{ab}{p+(1-p)(a+b-ab)}$ |
| Frank | $\top_{p}^{F}(a,b)=\log_{p}\left(1+\frac{(p^{a}-1)(p^{b}-1)}{p-1}\right)$ |
| Yager | $\top_{p}^{Y}(a,b)=\max\left(0,1-((1-a)^{p}+(1-b)^{p})^{\frac{1}{p}}\right)$ |
| Aczél-Alsina | $\top_{p}^{A}(a,b)=\exp(-(\lvert\log(a)\rvert^{p}+\lvert\log(b)\rvert^{p})^{\frac{1}{p}})$ |
| Dombi | $\top_{p}^{D}(a,b)=\left(1+\left(\left(\frac{1-a}{a}\right)^{p}+\left(\frac{1-b}{b}\right)^{p}\right)^{\frac{1}{p}}\right)^{-1}$ |
| Schweizer-Sklar | $\top_{p}^{S}(a,b)=(a^{p}+b^{p}-1)^{\frac{1}{p}}$ |

| | |
|---|---|
| Maximum | $\perp^{M}(a,b)=\max(a,b)$ |
| Probabilistic | $\perp^{P}(a,b)=a+b-ab$ |
| Einstein | $\perp^{E}(a,b)=\perp_{2}^{H}(a,b)=\frac{a+b}{1+ab}$ |
| Hamacher | $\perp_{p}^{H}(a,b)=\frac{a+b+(p-2)ab}{1+(p-1)ab}$ |
| Frank | $\perp_{p}^{F}(a,b)=1-\log_{p}\left(1+\frac{(p^{1-a}-1)(p^{1-b}-1)}{p-1}\right)$ |
| Yager | $\perp_{p}^{Y}(a,b)=\min\left(1,(a^{p}+b^{p})^{\frac{1}{p}}\right)$ |
| Aczél-Alsina | $\perp_{p}^{A}(a,b)=1-\exp(-(\lvert\log(1-a)\rvert^{p}+\lvert\log(1-b)\rvert^{p})^{\frac{1}{p}})$ |
| Dombi | $\perp_{p}^{D}(a,b)=\left(1+\left(\left(\frac{1-a}{a}\right)^{p}+\left(\frac{1-b}{b}\right)^{p}\right)^{-\frac{1}{p}}\right)^{-1}$ |
| Schweizer-Sklar | $\perp_{p}^{S}(a,b)=1-((1-a)^{p}+(1-b)^{p}-1)^{\frac{1}{p}}$ |

FIG. 28

HETEROGENEOUS RELAXATIONS IN DIFFERENTIABLE LOGIC GATE NETWORKS

RELATED APPLICATIONS

This application claims priority to and benefit under 35 U.S.C. § 119 to U.S. Provisional Patent Application No. 63/772,329, filed on Mar. 14, 2025, titled "Extended Differentiable Logic Gate Networks" (DFL0100); U.S. Provisional Patent Application No. 63/772,339, filed on Mar. 14, 2025, titled "Efficiency Improvements for Training Differentiable Logic Gate Networks" (DFL0400); and U.S. Provisional Patent Application No. 63/927,929, filed on Nov. 30, 2025, titled "Training Apparatus with Integrated Circuits for Training Logic Gate Networks" (DFL1000); and U.S. Provisional Patent Application No. 64/002,139, filed on Mar. 10, 2026, titled "Logic Gate Network Systems, Methods, and Devices" (DFL0101), each of which is hereby incorporated by reference in its entirety.

This application also relates to and can be further understood in the context of U.S. patent application Ser. No. 19/301,717, filed on Aug. 15, 2025, titled "Logic Gate Networks Generated Using Differentiable Logic Gate Models" (DFL0800), which is hereby incorporated by reference in its entirety.

TECHNICAL FIELD

This disclosure relates to artificial intelligence, machine learning, and logic gate networks. This application also relates to training logic gate networks for subsequent synthesis and implementation on field-programmable gate arrays or fixed-silicon application-specific integrated circuits.

BRIEF DESCRIPTION OF THE DRAWINGS

FIG. 12 illustrates an example results table comparing accuracy and gate counts for CIFAR-10 across logic gate network models and baseline models, according to one embodiment.

FIG. 13 illustrates an example results table comparing accuracy and hardware inference timing across models for CIFAR-10, according to one embodiment.

FIGS. 14A-B illustrate example results tables for MNIST, including accuracy, gate counts, hardware timing, and variability across model instances, according to one embodiment.

FIGS. 17A-B illustrates example distributions of selected logic gate operators in trained models under different initialization schemes, according to one embodiment.

FIG. 18 illustrates an example results table comparing reinforcement-learning rewards and inference latencies for a neural-network teacher and a logic gate-network student, according to one embodiment.

FIG. 26 illustrates an example table that enumerates two-input logic operators, their corresponding real-valued relaxation formulations, and their truth tables, according to one embodiment.

FIG. 27 illustrates an example table of t-norm formulations usable as differentiable relaxations of logical AND, according to one embodiment.

FIG. 28 illustrates an example table of t-conorm formulations usable as differentiable relaxations of logical OR, according to one embodiment.

DETAILED DESCRIPTION

Figure 1:
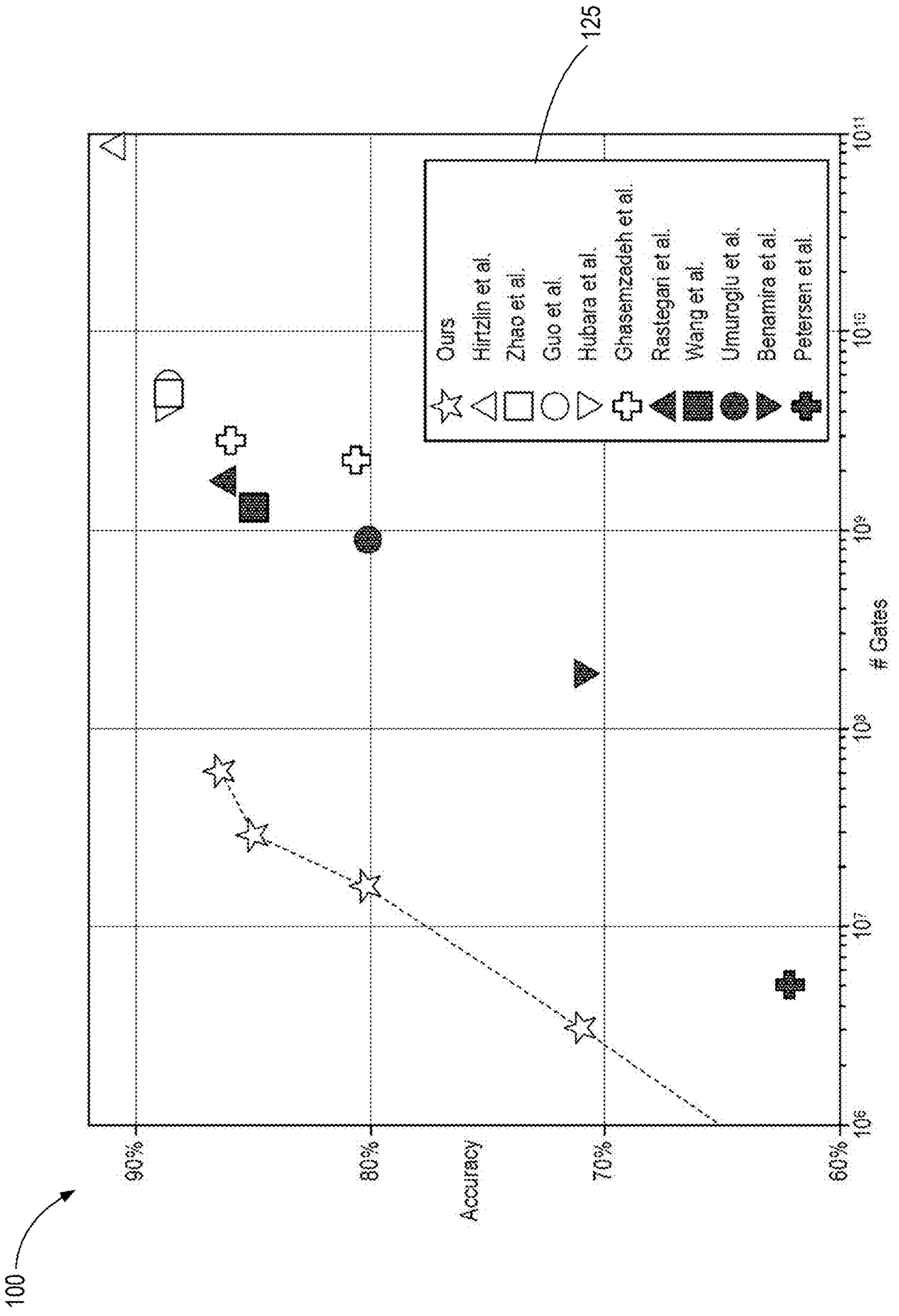
FIG. 1 illustrates an example accuracy-versus-gate-count comparison plot for logic gate network models, according to one embodiment.

Machine-learning models are increasingly deployed in real-world inference settings where compute, power, latency, determinism, and verifiability matter as much as raw accuracy. For example, inference models may be deployed on embedded devices, industrial control systems, cyber-physical systems, and other environments with strict timing constraints. In such settings, even modest increases in model latency can reduce control bandwidth, limit achievable performance, and/or constrain the complexity of the model that can be used. In reinforcement-learning ("RL") deployments, these constraints can be particularly acute because decisions may be made at high frequency and directly coupled to physical processes. For example, real-time reinforcement-learning agents have been explored for controlling complex systems such as tokamaks, fiber-laser systems, and network systems, where low latency can limit agent expressivity and overall system performance. In at least some reported tokamak-control contexts, latency budgets on the order of tens of microseconds (e.g., 50 μs) have been identified as constraining agent expressivity and performance.

Conventional deep neural networks (e.g., convolutional neural networks ("CNNs"), transformer-based architectures, and the like) are typically parameterized by real-valued weights and biases and rely on matrix multiplications and other dense numeric operations. These operations can impose substantial inference cost, both in computation and in memory traffic (e.g., repeatedly fetching weights and intermediate tensors). Specialized accelerators can improve throughput, but practical deployments often remain constrained by power budgets, memory bandwidth, thermal limits, and/or end-to-end latency. Moreover, in some applications, including safety-critical or regulated applications, there is growing interest in models that are more interpretable and/or more amenable to verification, auditing, and deterministic execution.

As a result, a variety of approaches have been explored to reduce inference cost, including model quantization, binary-weight networks, binary activations, and structured sparsity. In the broader class of "binary neural networks," for example, an abstraction based on neural network layers is retained, but representations are constrained and/or quantized to reduce compute and improve hardware efficiency. However, even when weights and activations are quantized, many systems still rely on neural-network abstractions that are ultimately compiled, translated, or otherwise mapped into executable logic, thereby imposing additional complexity and overhead. In contrast, another approach is to represent an inference model directly in terms of logic (e.g., as a network of logic gates) and optimize the logic itself, thereby directly targeting the computational substrate of digital hardware.

Logic gate networks may be viewed as networks of nodes, where each node implements a Boolean operator such as AND, NAND, OR, NOR, XOR, XNOR, and/or related logic functions. Logic gate networks (also referred to as logical circuits or binary circuits) are the type of representation used at a fundamental abstraction level to implement digital computation in hardware. The function computed by a logic gate network depends on the interconnections among the nodes and on which logic operation is selected at each node. From a deployment perspective, logic gate networks can be attractive because they can be implemented directly as logic circuitry. When an inference model is represented as a logic gate network (or can be discretized into one), inference can be performed using only logic gate operations, enabling highly efficient, deterministic execution on logic-based hardware such as CPUs, FPGAs, and ASICs. In some implementations, the absence of large weight fetches and dense floating-point operations can enable extremely low-latency inference; for example, logic gate inference may be executed on hardware with latency on the order of nanoseconds (or less) and, in some cases, may enable evaluation of an entire model within a single clock cycle depending on architecture and target device constraints.

However, optimizing a logic gate network for a machine-learning task is generally challenging. In its native form, a logic gate network involves discrete gate choices and discrete Boolean computations. Selecting connections and selecting a gate type for each node is naturally a combinatorial optimization problem. While combinatorial search or heuristic synthesis can be effective for some circuit-design tasks, direct combinatorial optimization becomes infeasible when a machine-learning problem demands extremely large models (e.g., models having millions of parameters or gates). In addition, conventional gradient-based training is not directly applicable because discrete logic operations and discrete gate-selection decisions are not differentiable.

To enable scalable training, differentiable relaxations of logic gate networks have been proposed that relax Boolean logic operations into differentiable, real-valued computations and replace the discrete choice of logic operator at each node with a differentiable parameterization, such as a probability distribution over candidate operators. This enables the use of gradient-based optimization to train networks that are ultimately intended to be discretized into hard logic for inference.

In one illustrative approach, a differentiable logic gate node may maintain a set of learnable parameters that define a categorical distribution over a predefined set of logic gate operators (e.g., 16 two-input Boolean operators). A "soft" node output can then be computed as a weighted combination (e.g., an expectation) of the outputs of the candidate logic functions, where the weights are determined by the learned distribution (e.g., via a softmax over the learnable parameters). As training progresses, the learned distributions may sharpen, and training may converge toward concrete logic gate choices. The resulting trained model can then be discretized by selecting, for each node, the operator with the highest learned probability, yielding a hard logic gate network suitable for deployment as logic circuitry.

In some embodiments, during training, a node configurable to implement a discrete operation in a discretized (deployment) form is represented as a trainable form that combines the outputs of multiple candidate operations in a differentiable manner. For example, a two-input node receiving inputs $a_1$ and $a_2$ (which may be real-valued relaxations in [0,1] during training) may be associated with candidate operations $\{g_i\}$ (e.g., candidate logic gate operators, candidate node functions, or candidate lookup-table entries, as described in detail herein), and a parameter vector z (e.g., unnormalized scores, logits, etc.) that is mapped to coefficients or selection weights used to combine the outputs of the candidates. In some embodiments, the process may include selecting between and/or the learning of connections (e.g., wires). For example, some differentiable logic gate nodes with two inputs may be restricted to two options, each option being a respective direct wire connection (e.g., selecting between "Wire A" and "Wire B"). In another illustrative example, an eight-input differentiable logic gate node may be restricted to eight options, each option being a respective direct wire connection (e.g., selecting one of Wires A, B, C, D, E, F, G, or H). In such embodiments, at least some nodes of the network correspond to logic gate operators that actively rely on two or more inputs (e.g., AND, NOR, OR, XOR, etc.).

In some embodiments, a "convex combination" (e.g., an expectation or weighted average) is used to compute a differentiable node output. For example, a node output $f_z(a_1, a_2)$ may be expressed as:

$$f_z(a_1, a_2) = \mathbb{E}_{i\sim S(z), A_1\sim \mathcal{B}(a_1), A_2\sim \mathcal{B}(a_2)}[g_i(A_1, A_2)] = \sum_{i=0}^{15} \frac{\exp(z_i)}{\sum_j \exp(z_j)} \cdot g_i(a_1, a_2)$$

In the equation above, S(z) denotes a distribution over the candidate operations derived from z, and B(a) denotes a Bernoulli distribution parameterized by a. Alternatively, or in addition to the convex combination above, some embodiments compute the differentiable node output using an "exponential combination" (e.g., a product form), for example:

$$f_z(a_1, a_2) = \prod_{i=0}^{15} g_i(a_1, a_2)^{\frac{exp(z_i)}{\sum_j exp(z_j)}}$$

In some embodiments, such an exponential combination provides a differentiable mechanism to emphasize or de-emphasize candidate operations while maintaining compatibility with operator-selection parameterizations. Alternatively, or in addition, some embodiments use alternative mappings from the $z_i$ values (or other trainable parameters) to coefficients pi. In such embodiments, the coefficients $p_i$ may be derived using any of a wide variety of suitable mappings, including those with nonnegative weights, normalized weights, sparse weights, temperature-scaled weights, or other coefficient structures. Using such coefficients $p_i$, the differentiable node output may be computed using, for example:

$$f_z(a_1, a_2) = \prod_{i=0}^{15} g_i(a_1, a_2)^{p_i}, \text{ or}$$

$$f_z(a_1, a_2) = \sum_{i=0}^{15} p_i \cdot g_i(a_1, a_2).$$

In various embodiments, the coefficients $p_i$ are computed from trainable parameters using mappings including, but not limited to, softmax mappings, sigmoidal mappings, bounded mappings, normalized exponential mappings, thresholded mappings, learned mappings, and/or other coefficient-generating functions. The node output may be computed using one or more of the foregoing combination forms. After training, the node network may be discretized such that, for at least some nodes, a single candidate operation is selected for deployment (e.g., by applying a discretization rule that selects a candidate operation associated with a largest coefficient, a largest probability, or a largest score), thereby producing a fixed representation in which the deployed node output is computed using the selected discrete operation rather than a mixture.

Although the examples above are written for a two-input node with sixteen candidate operations (indexed I=0 to 15), in various embodiments, the candidate operation set may include fewer than sixteen options, more than sixteen options, and/or operations with more than two inputs. For example, in some embodiments, a node corresponds to a k-input operation and is configurable to implement, in a discretized form, any of a plurality of k-input Boolean functions and/or lookup-table-defined functions. These embodiments are compatible with the training, residual initialization, discretization, and deployment techniques described throughout this disclosure.

Any number of candidate operations may be available in a particular embodiment, and more or fewer parameters may be used to specify the number of candidate operations. For example, in various embodiments, the trainable form used during training may be parameterized in any suitable manner, and the number of trainable parameters associated with a node need not equal the number of discrete operations that the node may implement in a discretized form. For example, although a two-input node may be discretizable to any of sixteen possible functions, the trainable form may be implemented using (i) a set of operator-selection parameters (e.g., scores or logits) that define a selectable distribution over the sixteen functions, and/or (ii) a set of operator-selection parameters comprising four trainable values corresponding to the four possible two-input patterns (e.g., 00, 01, 10, and 11), such that discretizing the four values yields a 4-bit table and thereby selects one of the sixteen possible functions. More generally, for a node having k inputs, the trainable form may comprise a parameterization that, upon discretization, defines a discrete mapping for the node (e.g., a lookup table with 2^k) entries and thus one of 2^(2^k) possible discrete functions), and the trainable form may be over-parameterized or under-parameterized relative to the number of discrete options while still supporting optimization and later discretization. Accordingly, regardless of the particular parameterization, the node's trainable computation may be expressed as a function of the node inputs and a parameter set, as reflected in the generalized expressions below:

$f_z(a_1, a_2)=g(a_1, a_2, p)$, or with a greater number of inputs, as follows:

$f_z(a_1, a_2, \ldots a_k)=g(a_1, a_2, \ldots a_k, p)$

In reinforcement-learning and control tasks, inference latency can be a primary performance constraint. In many reinforcement-learning deployments, an agent repeatedly observes a state (or observation) and produces an action. When a control loop must execute at high frequency, the agent's inference latency can limit the policy's complexity and the achievable responsiveness. As noted above, real-time applications such as tokamak control, fiber-laser control, and network control have motivated interest in inference latencies on the order of microseconds and nanoseconds.

Differentiable logic gate networks can be used as reinforcement-learning agents (or as components of reinforcement-learning agents) because, after discretization, the resulting models can be executed as pure logic. This can potentially allow substantially lower latency than conventional neural-network inference, particularly when deployed on programmable logic or dedicated hardware.

FIG. 1 shows a plot 100 of gate count versus accuracy for the CIFAR-10 dataset from various sources identified in the legend 125, highlighting the broader challenge of achieving high accuracy at low logic cost. As illustrated, the gate-count axis can span multiple orders of magnitude (e.g., on a log scale), demonstrating that logic cost is often a key driver of the feasibility of hardware deployment. Thus, there remains a continuing need for training and architecture techniques that improve the accuracy-per-gate tradeoff for logic-based inference models. As models are scaled in depth to increase expressivity, training stability can degrade. Conventional deep neural networks often use techniques such as residual connections to preserve information flow and mitigate vanishing gradients as depth increases. In contrast, in logic gate and differentiable logic gate networks, architectural and operational differences can make the direct transfer of certain deep-learning techniques non-trivial. In particular, while residual additions are widely used in conventional networks, direct additive residual pathways are generally not native to purely logical computation, and deeper networks may be more susceptible to instability if intermediate representations "wash out" toward ambiguous values (e.g., toward 0.5 in a probabilistic relaxation). Moreover, when a differentiable relaxation is used, gradients can decay significantly across many logic layers, inhibiting learning in deep architectures.

Figure 2A:
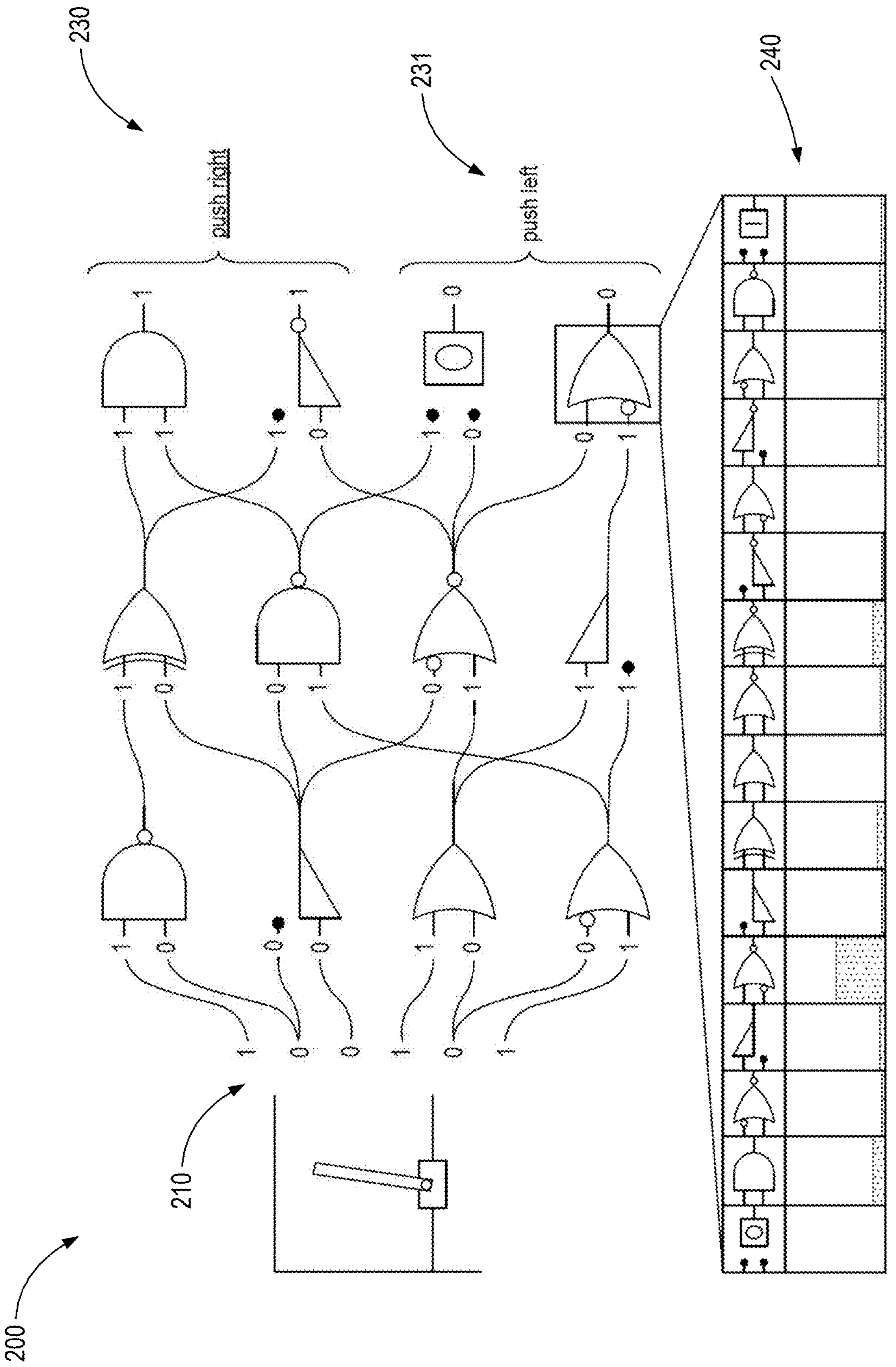
FIGS. 2A-B illustrate example trained logic gate networks for performing inference tasks, including reinforcement learning control and image classification, according to various embodiments.

FIG. 2A illustrates a logic gate network 200 that maps a set of inputs 210 to possible action outputs 230 and 231, highlighting how a policy can be realized as combinational logic rather than as a dense numeric computation. Nevertheless, while logic gate based inference can reduce runtime cost, training and scaling differentiable logic gate networks introduce their own challenges. These challenges include architectural limitations, optimization stability, and the difficulty of achieving high accuracy at a given logic cost.

Computer-vision tasks such as image classification, object recognition, and related perception problems have historically benefited from architectures that exploit spatial structure, such as convolution and pooling. Conventional CNNs rely on local receptive fields, structured parameter sharing, and pooling operations to efficiently capture translational invariance and local spatial patterns.

By contrast, the differentiable logic gate networks originally proposed typically use randomly selected connectivity. Because logic gates, in some implementations, are inherently two-input operators, the resulting logic gate networks are sparse and cannot form fully connected layers in the same way that dense neural networks can. In many differentiable logic gate network formulations, a node connectivity option is selected at random from the available options 240 and held fixed during training, and the learning problem focuses on selecting a gate operator for each node given the fixed wiring. This random connectivity can work for some tasks but becomes problematic when the input data has strong inherent structure, such as the spatial structure of images. Such limitations have been observed in reported results. For example, a noted limitation of randomly connected logic gate networks is their inability to learn spatial relations in images, which has been reported to limit performance on datasets such as CIFAR-10 to relatively low accuracy (e.g., around 62% in certain reported contexts).

Figure 2B:
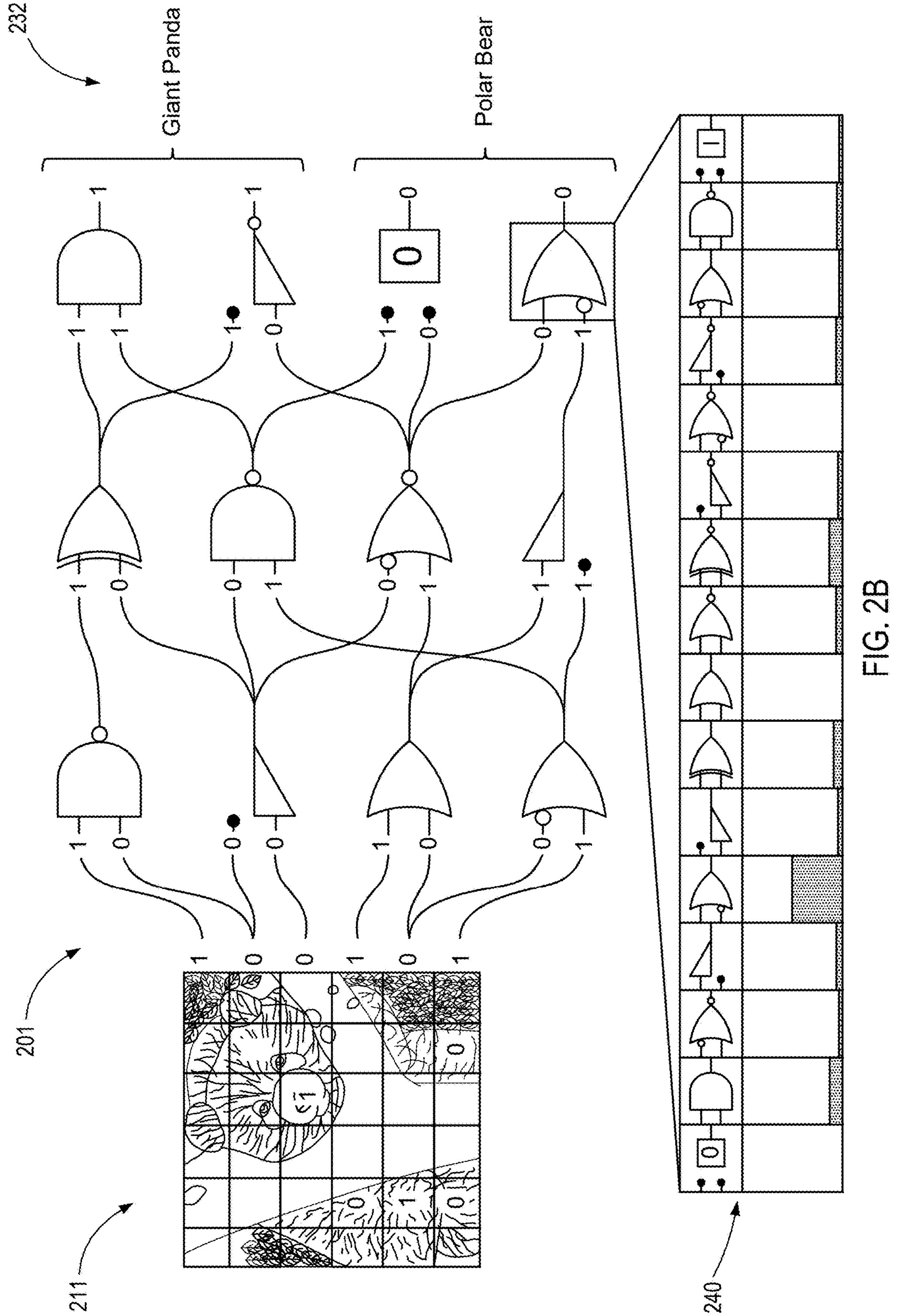

FIG. 2B illustrates an example randomly connected logic gate network architecture 201. In the illustrated embodiment, an input representation 211 (e.g., a binarized or discretized input patch corresponding to a portion of an image or other structured input) provides input values to a plurality of interconnected logic gate nodes of the architecture 201. The nodes are connected in a non-convolutional, non-parameter-shared manner (i.e., with connectivity that is not constrained to local receptive fields or structured weight sharing), and the resulting network produces one or more outputs 232, which in the illustrated example correspond to classification outputs (e.g., a "Giant Panda" output and a "Polar Bear" output). In some embodiments, each node of the architecture 201 is represented as a selectable logic gate chosen from an available set of logic gate choices 240, and during training, the node's selected operation (or a trainable representation thereof) is learned (e.g., by learning gate-choice distributions and/or other trainable parameters that are later discretized into fixed per-node gate selections).

In practice, while the randomly connected architecture 201 can be effective for some tasks, such architectures may be less able to incorporate inductive biases and architectural components that are well suited to structured domains (including, for example, local receptive fields, parameter sharing, and pooling), while maintaining the desirable deployment properties of logic-based inference. In many practical deployments, it is not sufficient to merely execute inference as logic; rather, it is important to achieve high model quality at an acceptable cost of logic. Logic cost can be measured in various ways (e.g., total number of logic operators, total number of gates, depth, routing complexity, area, or power). In at least some contexts, the number of logic gates (or binary operations) can serve as an approximate proxy for hardware cost, because gate counts relate to chip area and can correlate with transistor count for ASIC implementations or resource utilization (occupancy) for FPGA implementations.

Accordingly, there remains a need for training techniques and initialization approaches that allow differentiable logic gate networks to scale in depth while preserving trainability, maintaining stable information flow, and enabling convergence to useful discrete logic after discretization. In view of the foregoing, there is a continuing need for improved systems, methods, and computer-readable media that facilitate practical training and deployment of logic gate-based machine-learning models. By way of example and without limitation, desirable improvements include: (i) achieving improved model accuracy for a given logic cost (e.g., gate count), (ii) improving the ability of logic gate networks to model structured domains such as images and other spatial/temporal signals, (iii) providing pooling- and convolution-like architectural components compatible with logic-based computation, (iv) improving optimization stability and trainability, particularly for deeper networks, and (v) enabling efficient, deterministic, low-latency deployment of trained models as logic circuitry on hardware such as FPGAs and ASICs. These needs are particularly salient in real-time decision-making settings such as reinforcement learning and control, where inference latency may directly limit achievable system performance.

In various embodiments, the present disclosure relates to training and deploying machine-learning models implemented using logic-gate-based computation. In some embodiments, a logic gate network comprises a plurality of interconnected nodes configured to receive inputs and produce outputs for an inference task, where one or more nodes are associated with a predefined set of potential logic gate operators. In some embodiments, the logic gate network is trained in a differentiable manner by parameterizing at least some nodes with differentiable parameters that define operator-selection probability distributions over the predefined set, thereby enabling gradient-based optimization, while further enabling generation of a fixed logic gate network after training by identifying discrete logic gate operators for respective nodes based on the learned differentiable parameters.

While differentiable logic gate networks can provide advantages in inference efficiency, compactness, and hardware implementability, practical deployment may benefit from improvements that enhance trainability, scalability to structured data, and computational efficiency of both forward propagation and backpropagation. Accordingly, in various embodiments, the present disclosure provides multiple complementary techniques directed to these challenges, including, without limitation, student-teacher supervision to reduce training cost and/or improve resulting model quality, convolutional architectures in which convolution kernels are implemented as tree-structured logic gate sub-networks with parameter sharing across kernel placements, pooling operations expressed in a logic-compatible manner using min/max relaxation operations and associated gradient-propagation techniques, and residual-style initialization approaches that bias nodes toward feedforward behavior at initialization to improve signal and gradient flow in deeper architectures.

The foregoing techniques may be implemented independently or in any combination, depending on the target task, compute platform, and performance characteristics. For example, a convolutional logic gate tree network may be trained using residual initialization and logic-compatible pooling, and may further be supervised using teacher-generated outputs; after training, the differentiable network may be discretized to yield a fixed logic gate network representable as a logical expression and implementable in software and/or in logic circuitry (including programmable logic and/or application-specific integrated circuits). The following paragraphs summarize non-limiting embodiments relating to each of these aspects.

In some embodiments, a node network comprises at least two node subsets treated differently during training. For example, a first set of nodes may comprise learnable nodes parameterized by differentiable parameters associated with respective predefined sets of potential logic gate operators, while a second set of nodes may comprise nodes corresponding to respective predefined logic gate operators. In some embodiments, outputs of nodes in the first set are computed using a first relaxation, and outputs of nodes in the second set are computed using a second relaxation different from the first relaxation. In some embodiments, the second set of nodes is used to impose structural inductive bias in the node network, including, by way of example and without limitation, spatial pooling in convolutional logic gate networks, temporal connections in sequential logic gate networks, and/or gates configured to combine an activation from one layer with a residual activation from a different layer. In some embodiments, after training, a fixed logic gate network is generated based on (i) the predefined logic gate operators of the second set of nodes and (ii) selected logic gate operators for at least some nodes of the first set based on the differentiable parameters thereof.

In some embodiments, systems, methods, and computer-readable media are provided for training and deploying logic gate networks with student-teacher supervision. Training differentiable logic gate networks may be slower than training conventional neural networks; therefore, distillation from a teacher model may be used to reduce training costs and/or improve the quality of the resulting student model.

In some embodiments, a teacher model (e.g., a conventionally trained neural network, including a reinforcement-learning policy network) is trained to perform a machine-learning task and to generate, for each input, a teacher output (e.g., a probability distribution over classes or actions). A training corpus is formed that includes input observations and corresponding teacher outputs. A differentiable logic gate network is then trained as a student by minimizing a divergence measure between the student outputs and the teacher outputs. For example, the system may use a Kullback-Leibler divergence approach to measure the divergence between the student and teacher outputs. The student-teacher approach transfers the teacher model's behavior into a logic-gate-based student model.

In some embodiments, teacher supervision is applied at the output-representation level suitable for logic gate networks. For example, classification may be represented via class scores formed by aggregating outputs of groups of output gates, and temperature scaling may be applied to logits or class scores, including in implementations where the teacher supervises at the class-score level. In various embodiments, the logic gate network comprises a set of group sum operations, which may be per-group popcount operations, bit counters, or adder circuits. For example, each group may correspond to one class or one output. In various embodiments, the group sum operation is performed via a real-valued summation during training, corresponding to a population counter or bit counter that is used in the fixed circuit after training. In some embodiments, approximate bit counters or approximate adders are used. This can provide the benefit of reducing the inference cost, while maintaining sufficiently high quality.

In some embodiments, after training, the differentiable logic gate network is discretized (e.g., by selecting a logic gate operator for each node based on learned probabilities) to yield a hard, fixed logic gate network. The fixed logic gate network may be synthesized and deployed as logic circuitry, including on hardware such as an FPGA or ASIC, to provide efficient inference and/or low-latency control.

In some embodiments, the training corpus may be collected in multiple ways, including by collecting teacher-labeled observations from the beginning, from a later time, or as a mixture. In some embodiments, the current logic gate network is used as an agent to obtain observations while a teacher provides feedback and/or a secondary teacher model is trained on residuals of the logic gate network. In some embodiments, real-valued inputs are encoded into binary vectors prior to logic-gate evaluation, for example, via thermometer encoding with quantiles as thresholds.

In various embodiments, the present disclosure provides systems and methods for implementing convolutional logic gate networks by convolving activations with logic gate trees. In some embodiments, each convolution kernel is realized as a logic gate tree (e.g., a complete binary tree of depth d) whose leaves are selected from a predefined receptive field across one or more channels, and whose internal nodes apply logic gate operations. By using tree-structured kernels and sharing node parameterizations across kernel placements, the disclosed approaches extend the convolutional paradigm, including spatial equivariance via parameter sharing, to logic gate networks, while improving expressivity relative to single-gate kernels and efficiency by reducing memory accesses and improving the locality of operations.

In some examples, a system includes one or more processors and a memory storing instructions that, when executed, cause the system to instantiate a convolutional logic gate tree network in which each logic gate node is parameterized by a set of differentiable parameters corresponding to a respective set of candidate logic operators (e.g., AND, OR, NAND, NOR, XOR, XNOR, constants, inverters, and/or direct connections), each convolution kernel comprises a tree of such logic gate nodes, and the differentiable parameters for at least some nodes are shared among multiple kernel placements of the convolution. In some embodiments, the system trains the network by forward propagating training inputs through differentiable relaxations of the candidate logic operators, evaluating a loss with respect to target outputs, and updating the differentiable parameters using gradient-based optimization, and defines a fixed convolutional logic gate tree network after training by selecting a single logic operator for each respective node based on the updated differentiable parameters.

In some embodiments, a computer-implemented method includes performing a convolution over an activation tensor. For example, for each kernel placement, the system may select a set of input activations from a receptive field as the leaves of a logic gate tree, compute the outputs of internal tree nodes based on corresponding logic gate operations, and produce a kernel output for the placement from the root node of the tree. In some embodiments, the method further includes using pooling operations compatible with logic, such as logical OR pooling (e.g., via a maximum t-conorm relaxation), and/or improving trainability of deep convolutional logic gate tree networks using residual initializations that bias one or more nodes toward direct connections (e.g., wire-like behavior) at initialization while allowing training to replace such behavior with other learned logic operations as needed.

In some embodiments, a non-transitory computer-readable medium stores instructions that, when executed by one or more processors, cause performance of any of the foregoing operations, including training a convolutional logic gate tree network and defining a fixed logic gate network after training. In some embodiments, the fixed network is stored as data defining a logical expression and/or is implemented in programmable logic (e.g., an FPGA) or synthesized into an application-specific integrated circuit (ASIC), thereby enabling efficient deployment of the convolutional logic gate tree network for inference tasks such as image recognition, language processing, and other machine learning inference tasks.

In some embodiments, pooling operations in a neural network are implemented using min/max relaxation operations that correspond to relaxed Boolean aggregation. For example, a pooling operation may be configured as a relaxed logical OR over a receptive field by using a maximum t-conorm relaxation (e.g., a max operator) to produce a pooled activation that represents a disjunction of activations within the receptive field. Alternatively, a pooling operation may be configured as a relaxed logical AND over a receptive field by using a minimum t-norm relaxation (e.g., a min operator) to produce a pooled activation that represents the conjunction of activations within the receptive field. These pooling operations may be applied to real-valued activations used during training and/or to discrete activations used during inference.

In some embodiments, the pooling operation is performed as strided pooling (SPooling) in which the stride of the pooling operation ("pooling stride") is set to the size of the pooling receptive field (e.g., non-overlapping pooling regions). This configuration can provide substantial computational advantages, including reduced computation and reduced memory traffic relative to pooling implementations that require evaluating and/or storing intermediate values for all positions within each receptive field. In some embodiments, the pooling operation stores the pooled activation and an index (or other selection data) identifying which activation within the receptive field was selected by the min/max relaxation operation. During backpropagation, gradients may be propagated only through the selected activation, thereby reducing both computation and memory bandwidth.

In some embodiments, the pooling operations described herein are integrated into convolutional or hierarchical architectures (including architectures that implement convolution via learned logic gate trees), and the pooling operation may be fused with upstream and/or downstream operations to reduce memory accesses by keeping intermediate values in registers or other local storage. In addition, the disclosed pooling operations may be used with various relaxation formulations, including embodiments in which probabilistic and min/max relaxations are selectively combined across different layers or portions of a network, depending on target accuracy, differentiability, and computational efficiency. The disclosed subject matter may be implemented as computer-implemented methods, as systems including one or more processors and memories that store instructions, and/or as non-transitory computer-readable media that store instructions to perform the disclosed pooling operations.

In differentiable logic gate networks, a logic gate operation may be represented by a differentiable parameterization over a set of discrete logic gate choices (e.g., via a softmax over gate options). Conventional random initialization of such parameters can lead to "washed out" initial distributions over gate choices, which in turn can cause activations to rapidly converge toward intermediate values and can exacerbate vanishing gradients as network depth increases. While residual connections are commonly used in conventional neural networks to preserve information flow in deep architectures, direct additive residual connections are generally not available when operating purely in logic.

To address these issues, residual initialization techniques may be utilized in which one or more learnable logic-gate nodes (and in some embodiments, substantially all learnable logic-gate nodes in one or more layers, blocks, or stages) are initialized to behave primarily as a feedforwarding logic gate, such as a direct-connection (wire-like) operator or an inverter operator. In some embodiments, this is implemented by initializing differentiable parameters of a node (e.g., a vector of unnormalized scores mapped to a categorical distribution via softmax) so that an initial operator-selection probability distribution assigns a dominant initial probability to a selected feedforward operator while assigning smaller probabilities to other candidate operators in the predefined set. This residual initialization provides an information-preserving pathway through depth while remaining fully learnable, such that, during iterative training, the differentiable parameters can be updated to make a non-feedforward operator (e.g., AND, OR, XOR, NAND, or NOR) more probable, thereby improving task performance.

Residual initialization can provide a residual-like information pathway in a differentiable logic gate network without requiring hard-wired residual adders or additional residual logic gates. In operation, the residual initialization may preserve information flow and reduce gradient decay in deeper networks at the beginning of training. As training progresses, gates that do not benefit from remaining feedforward connections may be learned to perform other logic operations. Thus, in various embodiments, residual initialization functions as a differentiable analogue to residual connections while remaining compatible with logic gate-based computation and subsequent discretization.

In some embodiments, residual initialization is used in conjunction with training workflows that produce discrete logic gate networks for inference, including architectures employing logic gate trees, convolutional application of such trees, and pooling operations expressed through logic. In some embodiments, after training, gates that remain trivial feedforward choices may be simplified during synthesis, which can reduce circuit complexity (e.g., because feedforward gates may correspond to wiring rather than additional active logic), thereby improving efficiency for hardware implementations (including, but not limited to, FPGA or ASIC implementations).

As used herein, the terms “logic gate network,” “logic gate neural network,” and “differentiable logic gate network” generally refer to a computational model comprising a plurality of interconnected nodes (also referred to as neurons, units, or gates) arranged in one or more layers and/or other topologies (e.g., trees, directed acyclic graphs, or recurrent topologies). Each node may be configured to compute a node output from one or more node inputs using at least one logic gate operator. A “logic gate operator” is not limited to a strict Boolean operator (e.g., AND, OR, XOR, NAND, NOR) and may include constants (e.g., TRUE, FALSE), pass-through or direct-connection operators (e.g., outputting one of the inputs), inverter operators, and/or multi-input operators that receive three or more inputs. In some embodiments, during training, one or more logic gate operators are implemented using differentiable and/or continuous relaxations (e.g., fuzzy-logic and/or t-norm-based relaxations or t-conorm-based relaxations) such that node outputs are real-valued (e.g., within [0,1]) and gradients can be computed with respect to trainable parameters. “Differentiable parameters” may include any values usable to select and/or blend among candidate operators (e.g., logits, unnormalized scores, weights, probabilities, temperatures, and/or other parameters) and may define an operator-selection probability distribution (e.g., a categorical distribution derived via a softmax or other mapping to a simplex). In various embodiments, differentiable parameters refer to those parameters for which a gradient is computed via backpropagation. The gradient may be an exact gradient or an approximate gradient, and the gradient may be used in a gradient-based optimization algorithm. “Discretizing,” “hardening,” or “generating a fixed logic gate network” includes any technique for selecting one or more discrete operators per node (e.g., selecting a mode/argmax operator, sampling, thresholding, pruning, and/or synthesis-based simplification), such that the resulting network can be represented as a logic expression, netlist (e.g., a gate-level netlist), circuit description, hardware description language (HDL), or other fixed representation.

As used herein, a “first set of nodes” may refer to nodes of a node network that are parameterized by differentiable parameters associated with respective predefined sets of potential logic gate operators, such that outputs of the nodes are computed using a first relaxation during training. A “second set of nodes” may refer to nodes of the node network that correspond to respective predefined logic gate operators, such that outputs of the nodes are computed using a second relaxation during training. In some embodiments, the second set of nodes is used to impose “structural inductive bias,” which generally refers to introducing fixed or predefined structural elements into a node network to encourage a desired architectural behavior, connectivity pattern, or signal-flow constraint. In some embodiments, a plurality of such predefined nodes is used repeatedly at multiple locations in a network, and such nodes may be referred to as “repeating structural inductive bias gates.” In some embodiments, the repeating structural inductive bias gates are arranged at multiple locations in a fixed logic gate network implemented in hardware, including, for example, at multiple pooling locations in a convolutional logic gate network, at multiple temporal-connection locations in a sequential logic gate network, and/or at multiple residual-activation-combination locations.

In some embodiments, the first relaxation is a probabilistic relaxation in which the differentiable parameters define probabilities corresponding to respective logic gate operators of a predefined set of potential logic gate operators (e.g., a finite set), and node inputs are represented as input activation probabilities between 0 and 1. In some embodiments, under the first relaxation, the node output is computed as an expectation under the assumption of independent node input probabilities. In some embodiments, the first relaxation comprises a continuous non-linear function of node inputs and differentiable parameters, and/or a stochastic sampling-based relaxation in which one or more candidate logic gate operators are sampled according to values derived from the differentiable parameters during training. In some embodiments, the first relaxation is based on a Yager t-norm and Yager t-conorm. In some embodiments, the second relaxation is a continuous relaxation and comprises at least one of (i) for a predefined node corresponding to a logical AND operator, a minimum operation as a relaxation of the logical AND operator, and (ii) for a predefined node corresponding to a logical OR operator, a maximum operation as a relaxation of the logical OR operator. In some embodiments, the second relaxation is based on a Hamacher t-norm and Hamacher t-conorm. In some embodiments, different relaxations are assigned to different subsets of nodes within the same node network.

As used herein, a “logic gate tree” refers to an acyclic, directed topology of interconnected logic gate nodes having a leaf-to-root information flow, in which a plurality of leaf inputs receive leaf input activations selected from one or more sources (e.g., network inputs and/or intermediate activations) and internal nodes compute node outputs that are provided to parent nodes, culminating in a root node output that defines a tree output activation. A “tree topology” is not limited to a balanced binary tree and may be balanced or unbalanced, and/or may be constructed subject to one or more connectivity constraints.

As used herein, “tree depth” may refer to a number of internal node levels between the leaf inputs and the root node. In one non-limiting example, a complete binary tree of depth d receives 2^d leaf inputs and includes 2^d−1 internal nodes. More generally, a k-ary tree may include internal nodes configured to receive k inputs (where k is an integer≥2). A “tree layer” (or level) refers to nodes of a logic gate tree that are at a common or approximately common depth/level in the tree, such that outputs of nodes of a lower tree layer are used as inputs to nodes of a higher tree layer.

In addition to operator-selection parameterizations that select among enumerated candidate functions (e.g., via a softmax), in some embodiments, a node having k discrete inputs is parameterized with an operator-selection parameterization in a truth-table form using a parameter vector having 2^k entries, where each entry corresponds to a respective input pattern of the k inputs and is mapped into a range such as [0,1] (e.g., by a sigmoid mapping). In such embodiments, discretizing includes selecting, for each truth-table entry, a discrete output value (e.g., 0 or 1), thereby defining a discrete node operation (a truth table) without requiring selection from an enumerated list of candidate operations. In some other embodiments, values [−1,+1] are respectively used via respective transformations of the space.

As used herein, a "teacher model" broadly refers to any model that can provide supervision signals for training another model, including but not limited to a conventionally trained artificial neural network, a reinforcement-learning policy/value model, an ensemble of models, a heuristic model, a probabilistic model, a decision-tree model, and/or a previously trained logic gate network. A "student model" broadly refers to any model trained with teacher-model supervision, including a differentiable logic gate network and/or a fixed logic gate network derived therefrom. "Teacher output values" (also referred to as teacher predictions or supervision signals) may include hard labels, soft labels, logits, probabilities, normalized or unnormalized scores, action distributions, intermediate representations, embeddings, and/or per-node or per-layer targets. In some embodiments, teacher supervision is applied at an output-representation level adapted for logic gate networks, such as class scores obtained by aggregating multiple output bits/gates per class, action scores, and/or other structured outputs. A "training data set" or "training corpus" includes any collection of inputs and corresponding target values, including (i) direct ground-truth labels, (ii) teacher-labeled data generated by evaluating the teacher model on inputs, (iii) synthetic inputs, (iv) simulated environment observations, and/or (v) mixtures thereof. Further, "training" includes minimizing any objective that encourages a student output to match a teacher output, including divergence-based losses (e.g., Kullback-Leibler divergence), cross-entropy losses, mean-squared error losses, margin-based losses, and/or composite losses that combine task loss and distillation loss; and "temperature scaling" includes any scaling applied to logits, scores, and/or probabilities to adjust entropy or smoothness of the supervision signal.

The systems and methods described herein may be implemented in a wide variety of computing environments and are not limited to any particular hardware, software, or network architecture. A "computing system" may include one or more processors (e.g., CPUs, GPUs, microcontrollers, DSPs), accelerators (e.g., NPUs, TPUs), and/or programmable or custom logic (e.g., FPGAs, ASICs), and may further include one or more memories, buses, interconnects, storage devices, and communication interfaces. Any "module," "engine," "unit," "component," or "block" described herein may be implemented in hardware, software, firmware, or any combination thereof, and may be integrated into a single device or distributed across multiple devices (e.g., across a client device and one or more servers). For example, training operations may be executed in a cloud computing environment, and inference operations may be executed on an edge device, embedded controller, FPGA, and/or ASIC. Further, "memory" and "computer-readable medium" include one or more non-transitory storage media (e.g., RAM, ROM, flash, SSD, HDD, optical media) that store instructions and/or data, including trained parameters, operator selections, connection-index arrays, circuit descriptions, and/or other representations of trained or fixed networks.

The figures and the corresponding detailed description are intended to be illustrative and non-limiting. Functional blocks shown in the figures may represent hardware components, software components, data structures, and/or combinations thereof; and boundaries between blocks are exemplary and may be rearranged, subdivided, combined, or omitted in various implementations. Any flowcharts, sequences, or steps described herein (including training iterations and forward/backward passes) are examples and may be performed in different orders, repeated, performed concurrently, and/or performed with additional or fewer steps, unless expressly stated otherwise. As used herein, the terms "comprising," "including," and "having" are open-ended and do not exclude additional elements; "or" is inclusive unless the context clearly indicates otherwise; "based on" means "based at least in part on;" and terms such as "first," "second," and the like are used merely as labels and do not imply a required order or ranking. Ranges and numerical examples are illustrative, and terms such as "about" and "approximately" encompass variations consistent with the disclosed purpose and the tolerances of a given implementation.

Many existing computing systems, methods, and devices may be used in combination with the systems and methods described herein. Some of the infrastructure that can be used with embodiments disclosed herein is already available, such as general-purpose computers, computer programming tools and techniques, digital storage media, and communication links. A computing device or controller may include a processor, such as a microprocessor, a microcontroller, or logic circuitry. Various technologies, systems, architectures, and applications are relevant to the presently described embodiments. Examples of such technologies, systems, architectures, and applications include, but are not limited to, certain aspects of deep neural networks, image recognition, recommender systems, medical diagnosis, language processing, machine learning inference tasks, character recognition, voice detection, multi-modal machine learning models, generative AI, image processing, encoding, decoding, encryption, and the like.

A processor and other processing components may include and/or utilize a special-purpose processing device, such as application-specific integrated circuits (ASIC), programmable array logic (PAL), programmable logic array (PLA), programmable logic device (PLD), field programmable gate array (FPGA), or other customizable and/or programmable device. A computing device may include a machine-readable storage device, such as non-volatile memory, static RAM, dynamic RAM, ROM, CD-ROM, disk, tape, magnetic media, optical media, flash memory, or other machine-readable storage medium. Various aspects of certain embodiments may be implemented using hardware, software, firmware, or a combination thereof.

The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In many instances, well-known structures, materials, or operations are not shown or described in detail to avoid obscuring aspects of this disclosure.

Figure 3:
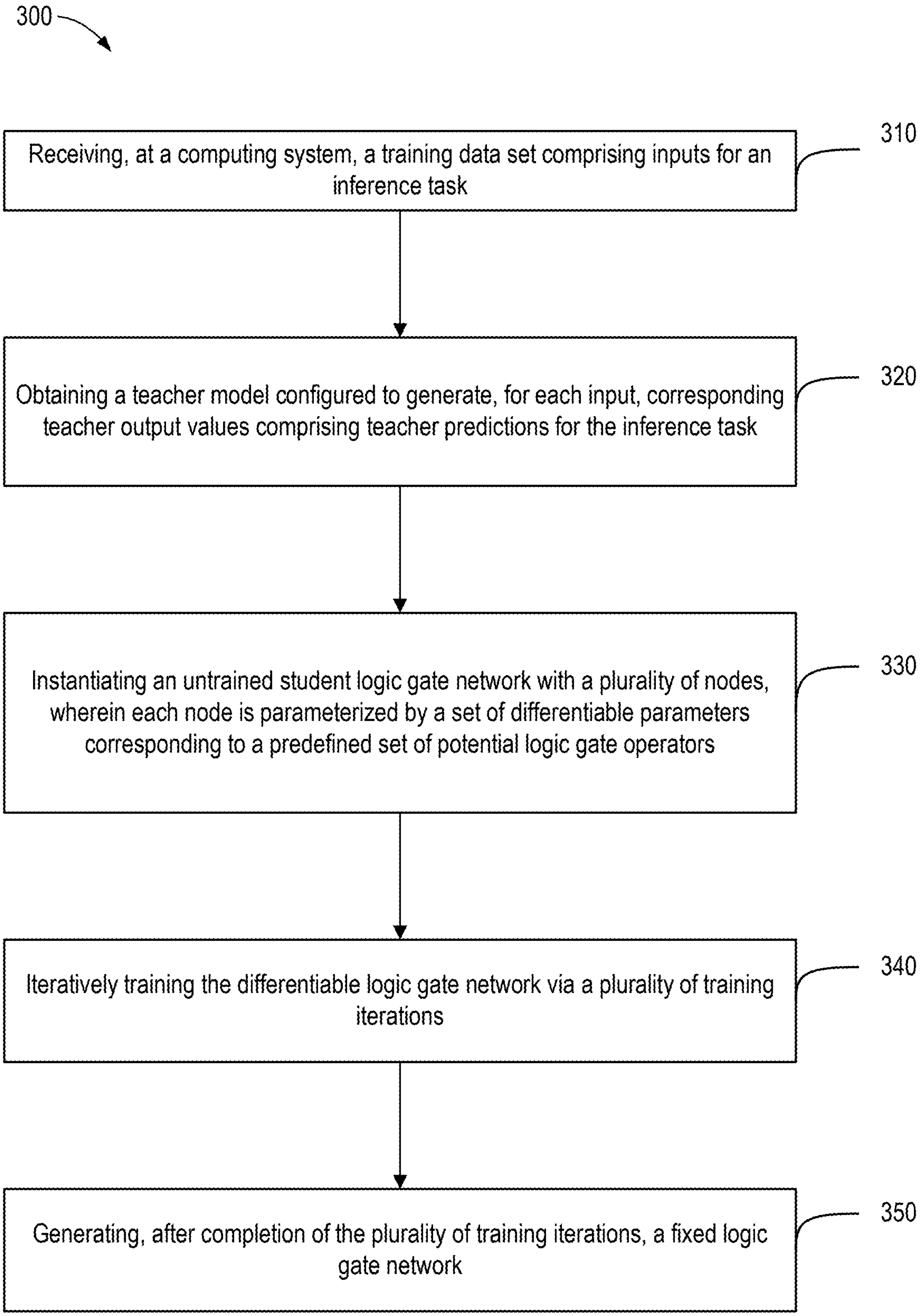
FIG. 3 illustrates an example process for training a student logic gate network using outputs produced by a teacher model, according to one embodiment.

FIG. 3 illustrates an example process 300 for training a student logic gate network using outputs produced by a teacher model, according to one embodiment. In various embodiments, the process 300 is performed by one or more computing systems comprising one or more processors and one or more memories storing instructions that, when executed, cause the process 300 to perform operations. In some embodiments, student-teacher learning is beneficial for differentiable logic gate networks because training such networks (e.g., via gradient-based methods on differentiable relaxations of discrete gate choices) can be slower and/or more computationally expensive than training conventional neural networks. Accordingly, in various embodiments, a conventionally trained "teacher" model is used to supervise a differentiable logic gate-based "student" model, thereby transferring the teacher's behavior into a logic gate network suitable for low-latency inference and/or hardware deployment.

At 310, the computing system receives a training data set comprising inputs for an inference task. In various embodiments, the "inputs" are not limited to input vectors and may comprise any suitable input representation for the inference task, including, without limitation, input vectors, input tensors, images, audio segments, sequences of tokens, embeddings, sensor measurements, and/or reinforcement-learning observations collected from an environment, optionally after preprocessing and/or encoding.

In various embodiments, the inference task comprises at least one of the following: classification, regression, multi-label prediction, ranking, anomaly detection, sequence processing, control, or reinforcement learning. In various embodiments, the systems and methods described in this disclosure may also be used for logic synthesis tasks, including, but not limited to, an inference task corresponding to exactly executing the function represented by a prespecified circuit or an inference task approximating a pre-defined function. In reinforcement learning (RL) embodiments, the input vectors may comprise state observations (e.g., observation feature vectors) collected from one or more environments. In some embodiments, the "training data set" of step 310 comprises (i) the input vectors and (ii) associated teacher output values (e.g., recorded teacher predictions), such that the training data set is a distillation data set. In other embodiments, the training data set comprises only the input vectors, and the computing system obtains the teacher outputs on-the-fly during training (e.g., by evaluating the teacher model during each training iteration, as described below).

At 320, the computing system obtains a teacher model configured to generate, for each input vector, corresponding teacher output values comprising teacher predictions for the inference task. In various embodiments, the teacher model comprises a conventionally trained machine learning model, such as an artificial neural network trained using supervised, self-supervised, imitation, or reinforcement learning. In some RL embodiments, the teacher model is trained as an RL agent using a reinforcement learning algorithm such as proximal policy optimization (PPO), after which the system records a set of input observations and corresponding teacher predictions for use as supervision.

In some embodiments, the teacher model comprises a neural network implemented with one or more layers (e.g., successive layers) that perform matrix multiplication using trainable matrix weights (including embodiments that perform at least two matrix multiplications using respective weight matrices). In such embodiments, the student logic gate network substantially lacks trainable matrix weights for performing matrix multiplications and is instead parameterized by per-node differentiable parameters for selecting among potential logic gate operators, and/or by truth-table or lookup-table parameterizations that discretize to fixed logic selections.

In some embodiments, the teacher output values comprise a probability distribution (or logits corresponding thereto), such as: (i) a class-probability distribution for classification; (ii) an action-probability distribution over a discrete action space for RL; or (iii) another categorical distribution over discrete outcomes. In other embodiments, the teacher output values comprise real-valued outputs such as value estimates (e.g., state value or action-value/Q-value), regression predictions, or intermediate representations usable for supervision.

At 330, the computing system instantiates, in memory, an untrained student logic gate network with a plurality of nodes, wherein each node is parameterized by a set of differentiable parameters corresponding to a predefined set of potential logic gate operators. In various embodiments, the student logic gate network is a differentiable logic gate network in which each node represents a learnable selection among candidate gate operators (e.g., AND, OR, NAND, NOR, XOR/XNOR, constants, inverters, pass-through/direct-connection operators, and/or other Boolean operators), and the differentiable parameters define, directly or indirectly, a probability distribution over the candidate gate operators.

In some embodiments, the differentiable parameters for a node include a vector of real-valued scores (e.g., logits) mapped to a categorical distribution over the candidate gate operators via softmax. During a differentiable forward pass, the node output may be computed as a differentiable function of the outputs of the candidate operators (e.g., a weighted sum or an expectation under a categorical distribution), thereby enabling end-to-end training with gradient-based optimization (e.g., a gradient-descent optimization). In some embodiments, the differentiable relaxation includes probabilistic logic relaxations and/or other t-norm/t-conorm relaxations. In some embodiments, the relaxed computation of a node comprises computing $w_0+x_0 \cdot w_1+x_1 \cdot w_2+x_0 \cdot x_1 \cdot w_3$, wherein $x_0$, $x_1$ are node inputs and $w_0$, $w_1$, $w_2$, $w_3$ are coefficients based on differentiable parameters.

At 340, the computing system iteratively trains the student logic gate network via a plurality of training iterations. In some embodiments, during forward propagation, each node of the student logic gate network receives one or more input activations (e.g., two input activations A and B in a two-input embodiment) derived from the batch inputs and/or from outputs of upstream nodes, and the node produces a corresponding output activation as a function of (i) the input activations to the node and (ii) current differentiable parameters for the node. In some embodiments, the current differentiable parameters define, directly or indirectly, an operator-selection distribution over the predefined set of potential logic gate operators, and the output activation is computed as a differentiable combination of relaxed operator outputs corresponding to the potential logic gate operators.

In some embodiments, each training iteration includes: selecting (or receiving) a batch of input vectors from the training data set; determining teacher output values for the batch by evaluating the teacher model using the batch; forward-propagating the batch through the student logic gate network to generate student output values; computing a loss value that quantifies a difference between the student output values and the teacher output values; and updating at least some differentiable parameters of the student logic gate network using a training optimization algorithm.

In some embodiments, the loss value comprises a divergence between distributions produced by the teacher model and the student logic gate network. For example, in RL embodiments where the teacher outputs an action-probability distribution f(x) over |a| actions and the student outputs $g_\theta(x)$, the loss may comprise a Kullback-Leibler (KL) divergence, such as:

$$\mathcal{L}(\theta) = \mathbb{E}_{x\sim X}\left[\sum_{i=1}^{|a|} f(x)_i \cdot \log\left(\frac{f(x)_i}{g_\theta(x)_i}\right)\right].$$

In other embodiments, the loss comprises cross-entropy, mean-squared error (e.g., on logits or values), or a weighted combination of multiple loss terms (e.g., a distillation loss combined with a loss relative to ground-truth labels). In some embodiments, training uses a gradient-based optimizer such as Adam. In one non-limiting example of RL distillation, the student logic gate network is trained with Adam at a learning rate of about 0.01, a batch size of about 256, and for about 5,000 training steps, while minimizing KL divergence relative to a neural network teacher. These numerical values are examples and may vary widely depending on the task, target accuracy, and computational constraints.

In some embodiments, computing the loss value comprises computing a mean-squared error and/or an L_p norm (p≥1) between (i) the teacher output values and (ii) corresponding student output values, including, by way of example, an L1 norm, an L2 norm, and/or a Huber-type norm. In various embodiments, the loss is computed on probabilities, logits, class scores, action scores, value estimates, and/or other teacher/student output representations.

In some embodiments, the system generates and/or curates the distillation dataset in various ways. For example, teacher predictions may be recorded from the beginning of teacher training, at a later point during training, and/or as a mixture of predictions recorded at different times. Additionally or alternatively, during at least a portion of training, the system may use a current version of the student logic gate network as an agent to obtain at least some input observations for which the teacher provides supervision and/or feedback. In some embodiments, the system trains a secondary teacher model on residuals (e.g., differences between teacher and student outputs) and trains the student at least in part based on outputs of the secondary teacher model.

In some embodiments, the system modifies (e.g., calibrates) teacher output values and/or student output values to improve distillation. For example, the system may apply temperature scaling or other logit scaling to control the certainty of predictions. In some embodiments, a post hoc scaling factor is applied to teacher logits to make predictions less or more certain (e.g., a factor of about 0.5 for less certain predictions, or a factor of about 2 for more certain predictions, in various example environments).

In some classification embodiments, the student logic gate network produces class scores by aggregating outputs of groups of output gates (e.g., by counting active outputs in each class group), optionally dividing by a temperature to produce logits for a softmax. In some embodiments where a teacher supervises at the class-score level, a rule-of-thumb adjustment is to increase a softmax temperature by approximately a factor of $\sqrt{2}$ (e.g., relative to a temperature used without such class-score-level teacher supervision).

In some embodiments, before forward-propagating inputs through the student logic gate network (and optionally before teacher evaluation), the system encodes real-valued input features into a binary representation. For example, the system may perform thermometer encoding in which each scalar input value is compared to a plurality of thresholds and converted into a binary vector. In some embodiments, the thresholds are based on quantiles of a data distribution. In one illustrative example, with five thresholds, an input value between the third and fourth thresholds is converted to [1,1,1,0,0].

At 350, after completing the plurality of training iterations, the computing system generates a fixed-logic gate network. In some embodiments, generating the fixed logic gate network comprises discretizing the differentiable student logic gate network by selecting, for each of at least some nodes, a single logic gate operator from the predefined set based on the learned differentiable parameters (e.g., selecting the operator having the largest probability under a learned categorical distribution). In some embodiments, probability distributions over candidate gates tend to converge toward concrete gate selections, such that discretization incurs minimal degradation relative to the differentiable form.

In various embodiments, the fixed logic gate network is stored as a circuit description (e.g., a netlist or other logical expression or sub-expression) and/or synthesized into hardware for deployment, including programmable logic (e.g., FPGA) and/or a fabricated integrated circuit (e.g., ASIC), to provide efficient inference and/or low-latency control. In some embodiments, after discretization, the system performs logic synthesis and/or simplification operations (e.g., constant propagation, elimination of redundant nodes, removal of unconnected logic), thereby improving area, power, and/or latency.

In some embodiments, after discretization and/or during logic synthesis, the system performs one or more logic-optimization transformations that reduce the size and/or depth of the discretized node network, including, without limitation, constant propagation, dead-logic elimination, elimination of unconnected logic, algebraic rewriting, common-subexpression elimination, wire removal, and inverter collapsing. For example, a node discretized to a pass-through (e.g., wire or inverter) function may be removed by rewiring its fan-out to the selected input signal. Cascaded inverters may be collapsed (e.g., two inversions eliminated), and inverters may be pushed forward/backward through adjacent logic where permitted by Boolean identities, thereby removing redundant inversions. In certain embodiments, these synthesis transformations cause a structural collapse of portions of the discretized node network (e.g., because residual initialization produces many nodes that discretize to pass-through and/or inversion functions). The synthesis transformations reduce the number of discrete operators and/or gates in the resulting hardware representation by more than 50%, by more than 75%, or by another threshold reduction relative to a pre-synthesis discretized representation, depending on the architecture, the degree of residual initialization, and the applied synthesis rules.

In various embodiments, after generating the fixed representation of the trained node network (e.g., after discretization), the computing system uses the trained node network to perform inference. For example, the system may receive an inference input sample (e.g., an input vector, input tensor, or other encoded representation), evaluate the fixed node network by propagating the inference inputs through the network topology and, for each node, computing the node output by applying the selected fixed node function (e.g., a selected operator identifier or lookup-table entry) to the node inputs, and output an inference result such as a class label, a class-score vector, a regression value, or an action for a control loop. In hardware embodiments, the fixed representation may be synthesized and deployed on a hardware platform (e.g., FPGA or ASIC) and then repeatedly evaluated at runtime to produce inference outputs with deterministic latency.

Although FIG. 3 depicts a particular ordering of steps 310-350, in various embodiments, the operations may be performed in different orders, performed in parallel, combined, subdivided, repeated, omitted, and/or supplemented with additional operations. For example, teacher outputs may be precomputed and stored before training (so teacher evaluation is not performed during each training iteration), and/or teacher evaluation may be performed on demand during training, depending on compute and storage constraints.

In various embodiments, convolution is performed by convolutional logic gate networks by applying, at each of a plurality of kernel placements within a domain, a learnable logic gate tree kernel to input activations from the receptive field. In some embodiments, each logic gate tree kernel comprises a plurality of logic gate nodes arranged in a tree topology, such that outputs of lower nodes provide inputs to higher nodes, and a root node produces a kernel output activation. In various embodiments, the disclosed convolutional logic gate networks extend the convolutional paradigm (including parameter sharing across placements) to logic gate-based computation, while providing increased expressivity relative to single-gate kernels and improved efficiency through reduced memory access and better locality.

In various embodiments, the disclosed training and discretization techniques are not limited to convolutional architectures. For example, a logic gate tree network may include one or more layers in which computation is performed by one or more logic gate trees, where each logic gate tree includes a plurality of nodes arranged in a tree topology and produces an output activation at a root node. In such embodiments, a layer may include a plurality of logic gate trees, each configured to receive a respective set of leaf input activations and to produce a respective tree output activation, such that the layer produces an output set of activations (e.g., a vector, array, or other collection of activations) usable as input to a subsequent layer and/or to an output stage.

In some embodiments, for a given logic gate tree, leaf input activations are selected from (i) inputs to the network and/or (ii) intermediate activations generated by the network (e.g., activations produced by one or more earlier layers). The selection of leaf input activations may be defined by a leaf selection mapping (also referred to as a connection mapping), which specifies, for each leaf, a source activation identifier (e.g., an index into an input feature vector, an index into an intermediate activation array, a channel identifier, a spatial position identifier, and/or combinations thereof). In some embodiments, the leaf-selection mapping is generated (e.g., pseudo-randomly or deterministically) when the logic gate tree network is instantiated and thereafter remains fixed during training, while the differentiable parameters of the tree nodes are optimized.

In some embodiments, convolution is a special case of the foregoing tree-based computation in which a logic gate tree is treated as a shared-parameter structure applied at multiple placements within a domain. However, in other embodiments, a logic gate tree is applied only once (or a limited number of times) to a selected set of leaf inputs, without translation across a domain. Accordingly, logic gate trees may serve as general-purpose compositional operators for building structured or unstructured logic gate-based networks, including networks in which tree topology (and/or leaf selection) provides an inductive bias independent of convolution.

In some embodiments, the logic gate nodes are "differentiable" during training in the sense that each node is parameterized by a set of differentiable parameters that define a (learned) operator-selection distribution over a predefined set of potential logic gate operators. In some embodiments, the predefined set includes a plurality of two-input Boolean operators and/or real-valued relaxations thereof (e.g., AND, OR, XOR, NAND, NOR, implications, constant FALSE/TRUE, pass-through "A" and "B," and inversions such as "NOT A" and "NOT B"), with node outputs computed using corresponding real-valued operator formulations during training.

In some embodiments, each node includes (or is associated with) a vector of unnormalized operator scores (e.g., 16 learned scores for 16 candidate operators), and a mapping function (e.g., softmax) converts the scores into a categorical probability distribution over the operator set. In some embodiments, a temperature parameter is applied to control the entropy of the probability distribution. In some embodiments, the node output is computed as a weighted combination (e.g., a weighted average/expectation) of the outputs of the candidate operators according to the probability distribution, thereby enabling gradient-based training of the differentiable parameters. After training, in some embodiments, the network is discretized by selecting, for at least some nodes, a single operator (e.g., the mode/highest-probability operator) to form a fixed-logic gate network suitable for efficient inference and/or circuit representation.

In some embodiments, during training, the evaluation of a logic gate tree proceeds bottom-up across the tree's layers. For example, for a first tree layer (closest to the leaf inputs), each node computes a real-valued, non-binary, relaxed differentiable output as a nonlinear differentiable function of (i) its two or more input activations and (ii) its current differentiable parameters (e.g., operator-selection parameters). Outputs of nodes of the first tree layer may provide input activations to nodes of a second tree layer. This layered evaluation may continue until a root-node output is produced. In some embodiments, the intermediate outputs remain in the real-valued domain during training (e.g., within [0,1] in probabilistic or fuzzy relaxations) and are not binarized until a discretization step is applied to generate a fixed-logic gate tree network.

Figure 4A:
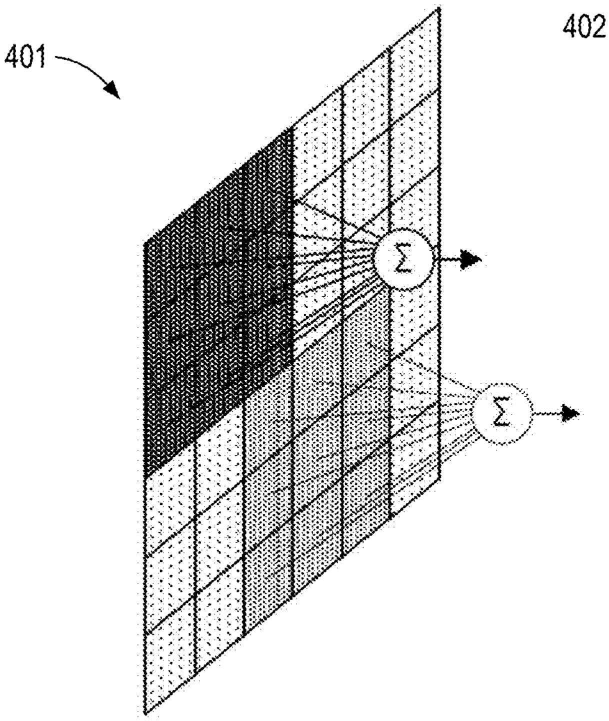
FIGS. 4A-B illustrate an example comparison between a conventional convolution and a convolution implemented using shared logic gate tree kernels, according to various embodiments.

FIG. 4A illustrates a conventional convolutional neural network (CNN) convolution operation 401. In the illustrated example, an input activation map includes activations arranged across positions in a spatial domain, and a convolution kernel is applied at multiple kernel placements (e.g., a first placement and a later placement) to produce output activations. In some embodiments, at each kernel placement, the CNN computes an output activation as a weighted sum (e.g., a dot product) of kernel weights with a receptive-field window of input activations, and the same kernel weights are shared across the plurality of kernel placements to provide translation equivariance.

Although FIG. 4A illustrates a spatial (e.g., two-dimensional) domain for clarity; in various embodiments, the "domain" over which a kernel is translated includes one-dimensional domains (e.g., time series, audio waveforms, token positions), two-dimensional domains (e.g., images), three-dimensional domains (e.g., video or volumetric data), and/or other structured domains. In some embodiments, kernel placements are determined based on one or more convolution hyperparameters, such as stride, padding, and/or dilation.

Figure 4B:
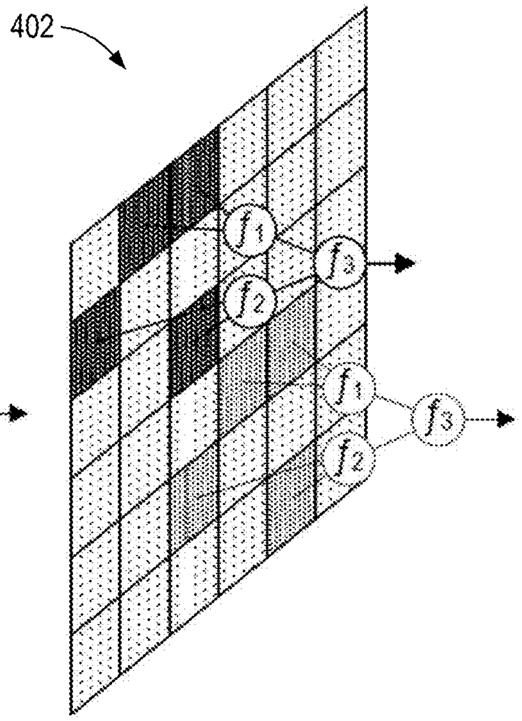

FIG. 4B illustrates a convolutional logic gate network 402 in which a convolution kernel is realized as a logic gate tree kernel, rather than as a weighted-sum kernel. In the illustrated example, the logic gate tree kernel includes a plurality of binary logic gate nodes arranged as a tree (e.g., nodes f1, f2, and f3), and the same kernel is applied across multiple kernel placements. In some embodiments, the parameterization (e.g., operator-selection parameters) of each node is shared across the plurality of kernel placements for a given kernel, in a manner analogous to weight sharing in CNNs.

In one example, where the depth d=3 in a binary-tree embodiment, the logic gate tree receives eight leaf activations a1-a8 and includes seven internal nodes. For example, four first-layer internal nodes may compute f1(a1,a2), f2 (a3,a4), f3 (a5,a6), and f4 (a7,a8). Two second-layer internal nodes may compute f5 (f1,f2) and f6 (f3,f4). A root node may compute f7 (f5,f6) to produce the tree output activation. The Depth-3 trees are one non-limiting example that can increase compositional expressivity relative to shallower trees while preserving a structured, hierarchical computation.

In some embodiments, logic gate trees include k-ary internal nodes configured to receive k inputs (k≥2), such as ternary gates (k=3) and/or other multi-input gates. In a full k-ary tree of depth d, the tree may receive k^d leaf input activations. In some embodiments, the number of internal nodes in a full k-ary tree is (k^d−1)/(k−1). In other embodiments, the tree is not full and/or not balanced, and the number of leaves and/or internal nodes may vary, while still providing a tree-structured composition of logic operations.

In some embodiments, the logic gate tree kernel is constructed as a complete binary tree of depth d, where d≥2. In such embodiments, the tree includes 2^d leaf inputs and (2^d−1) internal nodes (logic gate nodes). For example, for depth d=2, the tree may include four leaf inputs and three internal nodes (e.g., f1 and f2 at a lower level, and f3 at a higher level/root), and the kernel computation may be expressed as f3(f1(a1,a2), f2(a3,a4)) for leaf activations a1-a4.

In some embodiments, the leaf inputs (a1-a4 in the depth-2 example) are selected from a receptive-field window of the input tensor at a given kernel placement. In some embodiments, selecting the leaf inputs includes selecting, for each leaf input, both (i) an input-channel identifier and (ii) a position offset within the receptive field window. In some embodiments, the selection may be pseudo-random (e.g., to provide sparse and diverse connectivity) while remaining fixed once generated, and/or may follow alternative selection rules provided that sufficient diversity is maintained among kernels (e.g., avoiding a configuration where all kernels use only a single input).

In one example implementation, an input tensor A has shape m×h×w (m input channels, height, width), and a convolutional layer includes n logic gate tree kernels (corresponding to n output channels). In some embodiments, one or more connection-index arrays (or tensors) define which receptive-field inputs are used as leaf inputs for each kernel. For example, in a depth-2 tree implementation with four leaf inputs per kernel, a channel-index array CM and spatial-offset arrays CH and CW may each have shape n×4 and specify, for each output channel k and for each of four leaf inputs, (i) a selected input channel and (ii) a selected position within a receptive field of size $s_h \times s_w$. In some embodiments, for a given output channel k and kernel placement (i,j), the output activation A'[k,i,j] is computed by reading the four leaf activations from A using CM/CH/CW (with offsets applied relative to (i,j)) and forward-propagating those activations through the tree (e.g., through f1, f2, and f3) to produce the root output.

In some embodiments, the node parameterizations for a given kernel (e.g., the differentiable parameters controlling operator selection for f1, f2, and f3 in the depth-2 example) are shared across all placements of that kernel, whereas different kernels (i.e., different output channels) have independently learnable node parameterizations. Thus, in some embodiments, convolutional logic gate networks preserve convolutional parameter sharing (and associated equivariances) while implementing kernel computations through tree-structured compositions of logic operations.

In some embodiments, the tree topology provides increased expressivity by enabling the kernel to capture fixed spatial patterns and correlations beyond pair-wise combinations of inputs. In some embodiments, using a tree of logic gates (rather than a single gate) also improves efficiency by reducing memory accesses and improving operation locality, particularly when intermediate values produced within the tree are used locally by higher nodes rather than written to higher-latency memory. While FIG. 4B illustrates a binary tree for clarity; in various embodiments, the logic gate tree kernel is not limited to a full or complete binary tree. For example, in some embodiments, the tree may be an E-ary tree (E≥3) that includes one or more nodes configured to receive three or more input activations (e.g., ternary gates and ternary trees), is unbalanced, and/or includes nodes of mixed arity.

In some embodiments, additional connectivity constraints may be applied to improve performance and/or hardware implementability. For example, in some embodiments, the channel-selection strategy is restricted such that each tree observes leaf inputs from no more than a limited number of input channels (e.g., two input channels) to encourage within-channel spatial comparisons and to reduce routing complexity. In some embodiments, the input channels are partitioned into channel groups, and each tree selects its leaf inputs from a respective group, which may help reduce interconnect congestion in hardware implementations (e.g., by imposing grouped-convolution-like routing constraints).

Figure 5:
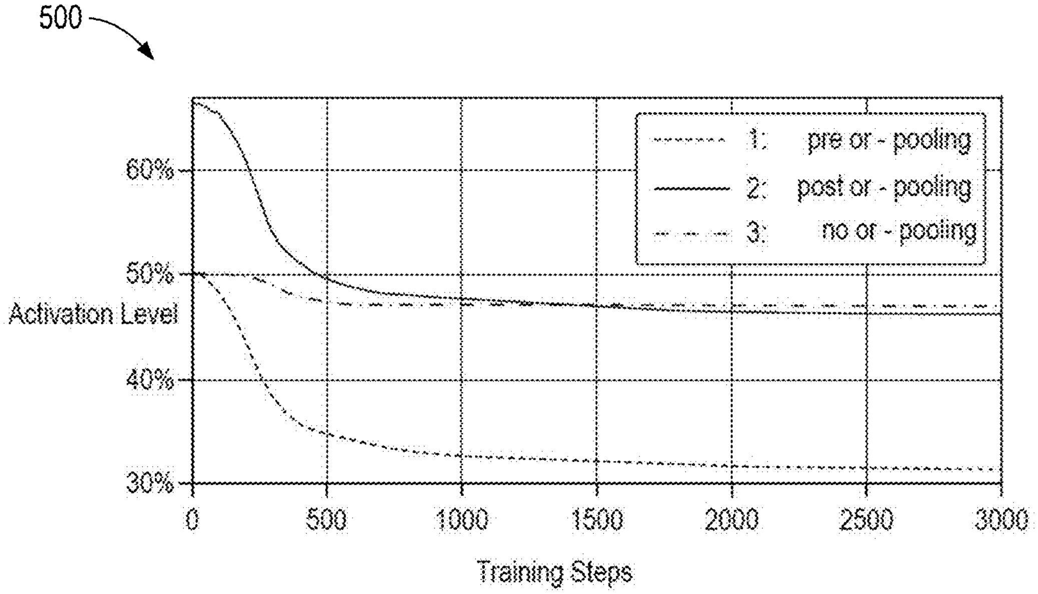
FIG. 5 illustrates an example plot of activation density for a convolutional logic gate network under different OR-pooling configurations, according to one embodiment.

FIG. 5 illustrates a plot 500 of activation density (activation level) versus training steps for an example convolutional logic gate network employing OR pooling. In the illustrated example, a first curve corresponds to "pre OR-pooling" activations, a second curve corresponds to "post OR-pooling" activations, and a third curve corresponds to a baseline configuration without OR pooling (e.g., pure stride). The illustrated behavior shows that, during training, post-OR-pooling activation levels rapidly converge toward activation levels similar to the no-pooling baseline, mitigating saturation concerns that might otherwise arise from repeated disjunction operations.

In some embodiments, a pooling operation between convolutional logic gate layers is implemented as a logical aggregation over a pooling receptive field. For example, in some embodiments, a relaxed logical OR pooling result over a pooling receptive field is computed using a maximum t-conorm relaxation, such that OR pooling over activations a and b uses $\perp$max (a,b)=max (a,b). In some embodiments, the pooling stride is set equal to the size of the pooling receptive field (e.g., non-overlapping pooling regions), thereby reducing computational cost and memory traffic. In some embodiments, AND pooling is also supported with a minimum relaxation (e.g., min as a t-norm) and may be effectively equivalent in some contexts by symmetry.

In some embodiments, pooling is implemented such that, for each pooling receptive field, the system stores (i) a pooled activation value and (ii) pooling selection data identifying which activation within the receptive field determined the pooled activation (e.g., an arg-max index for max-based OR pooling). During backpropagation, in some embodiments, gradients are propagated only through the selected activation identified by the pooling selection data, thereby reducing memory reads/writes and computation.

In some embodiments, the use of logic gate trees together with pooling enables substantial computational and memory efficiencies. For example, in some implementations, using a learnable tree of depth 2 with OR pooling, which has a 2×2 receptive field and a 2×2 stride, corresponds to an effective logic tree depth of 2+2, with 16 leaf inputs and a single output. In some embodiments, for training, intermediate values are discarded, and only the final output and selection/path information are stored, and during backward propagation, only the selected path is recomputed, thereby reducing memory accesses and reducing memory footprint (e.g., reductions of memory accesses and training-time memory footprint as described in the referenced document). In some embodiments, one or more fully-fused low-level kernels (e.g., GPU/CUDA kernels) are used to compute convolutional logic gate layers efficiently, including implementations in which a fused implementation accelerates per-gate computation relative to baseline randomly connected implementations.

In some embodiments, the system stores path-selection information (e.g., an argmax/argmin index, a child selection bit, a pointer, or other selection metadata) for a selection operation (including pooling and/or other winner-take-all or max/min-based operations) without storing a corresponding activation value. For example, during training, the system may store only a compact selection index indicating which activation (or which internal path) determined a pooled output, and the system may later recompute the corresponding activation value on demand from upstream inputs and the stored selection metadata (e.g., during backpropagation, debugging, analysis, or regeneration of intermediate signals). This reduces memory footprint and memory bandwidth relative to storing both (i) selection metadata and (ii) activation values, and is compatible with fused implementations in which intermediate values are maintained in registers and discarded after producing a downstream output.

Figure 6A:
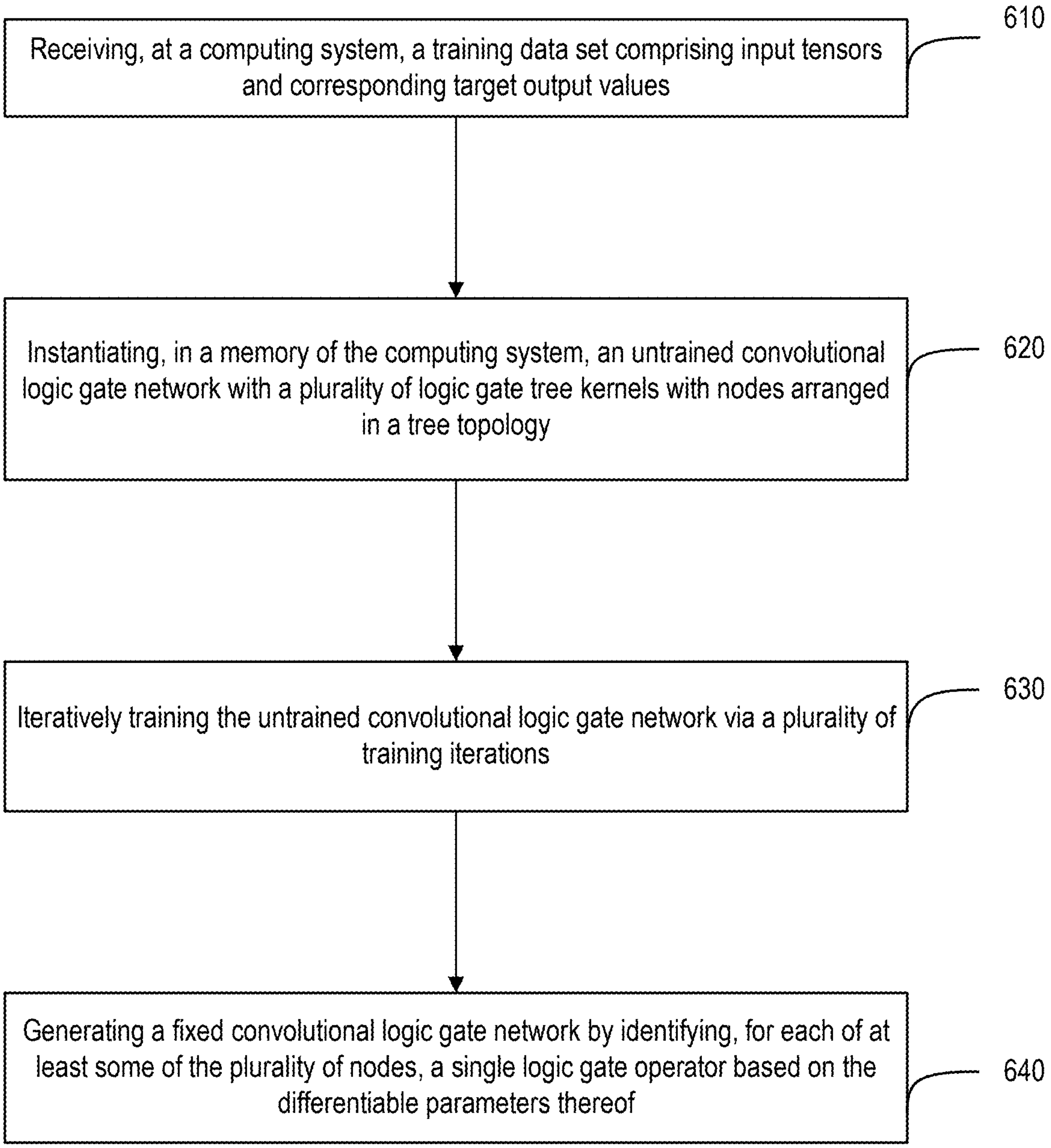
FIG. 6A illustrates an example process for training a convolutional logic gate network that applies logic gate tree kernels across multiple kernel placements, according to one embodiment.

FIG. 6A illustrates an example computer-implemented method for training a convolutional logic gate network that performs convolution via logic gate tree kernels. In the illustrated embodiment, at step 610, the system receives a training data set comprising input tensors and corresponding target output values. At step 620, the system instantiates an untrained convolutional logic gate network comprising at least one convolutional layer having a plurality of logic gate tree kernels. At step 630, the system iteratively trains the untrained convolutional logic gate network, and at step 640, the system generates a fixed convolutional logic gate network after training (e.g., by selecting discrete operators for nodes based on learned differentiable parameters).

In some embodiments of step 620, instantiating the untrained convolutional logic gate network includes generating and storing one or more connection-index arrays/tensors (e.g., CM/CH/CW) defining, for each logic gate tree kernel, which receptive-field inputs are selected as leaf inputs. In some embodiments, these connection indices are generated pseudo-randomly when the layer is instantiated and thereafter remain fixed during training and inference, such that the stored model parameters are primarily the learned node operator selections (e.g., a discrete operator ID per node in a fully discretized implementation), optionally along with one or more seeds and/or shape metadata sufficient to regenerate the fixed connectivity.

In some embodiments of step 630, each training iteration includes forward-propagating a batch of the input tensors through the network, including generating one or more intermediate tensors by convolving an input tensor with one or more logic gate tree kernels across kernel placements. In some embodiments, forward propagation of a given kernel at a given placement includes selecting leaf inputs from a receptive field window of the input tensor corresponding to the placement and forward-propagating those leaf inputs through the tree by evaluating node outputs in a bottom-up order (lower nodes to higher nodes) to produce a kernel output activation. In some embodiments, the system computes a loss based on the difference between the network output and the target outputs, and updates differentiable parameters (e.g., operator-selection parameters) using a training optimization algorithm.

In some embodiments of step 640 relating to convolutional logic gate networks, generating the fixed convolutional logic gate network includes identifying, for a plurality of nodes of a plurality of logic gate tree kernels, a single logic gate operator from the predefined set of potential operators based on learned differentiable parameters (e.g., selecting the most likely operator per node). In some embodiments, the resulting fixed network is then evaluated using Boolean logic (or other discrete logic representations), enabling fast inference. In some embodiments, additional post-training processing is performed, such as logic synthesis and simplification (e.g., eliminating trivial feedforward behavior in which a selected operator corresponds to a direct connection or an inverter).

In various embodiments, the trained/fixed convolutional logic gate network produced according to the process of FIG. 6A may be stored as a logical expression, logical sub-expression, or circuit description and deployed in software, programmable logic, and/or custom hardware. In some embodiments, the fixed nature of the discretized gate selections and the locality of tree computations facilitate efficient mapping to hardware fabrics (e.g., FPGA) and/or synthesis into an application-specific integrated circuit (ASIC) or tensor processing unit (TPU), including embodiments that leverage grouping/routing restrictions to reduce congestion.

Figure 6B:
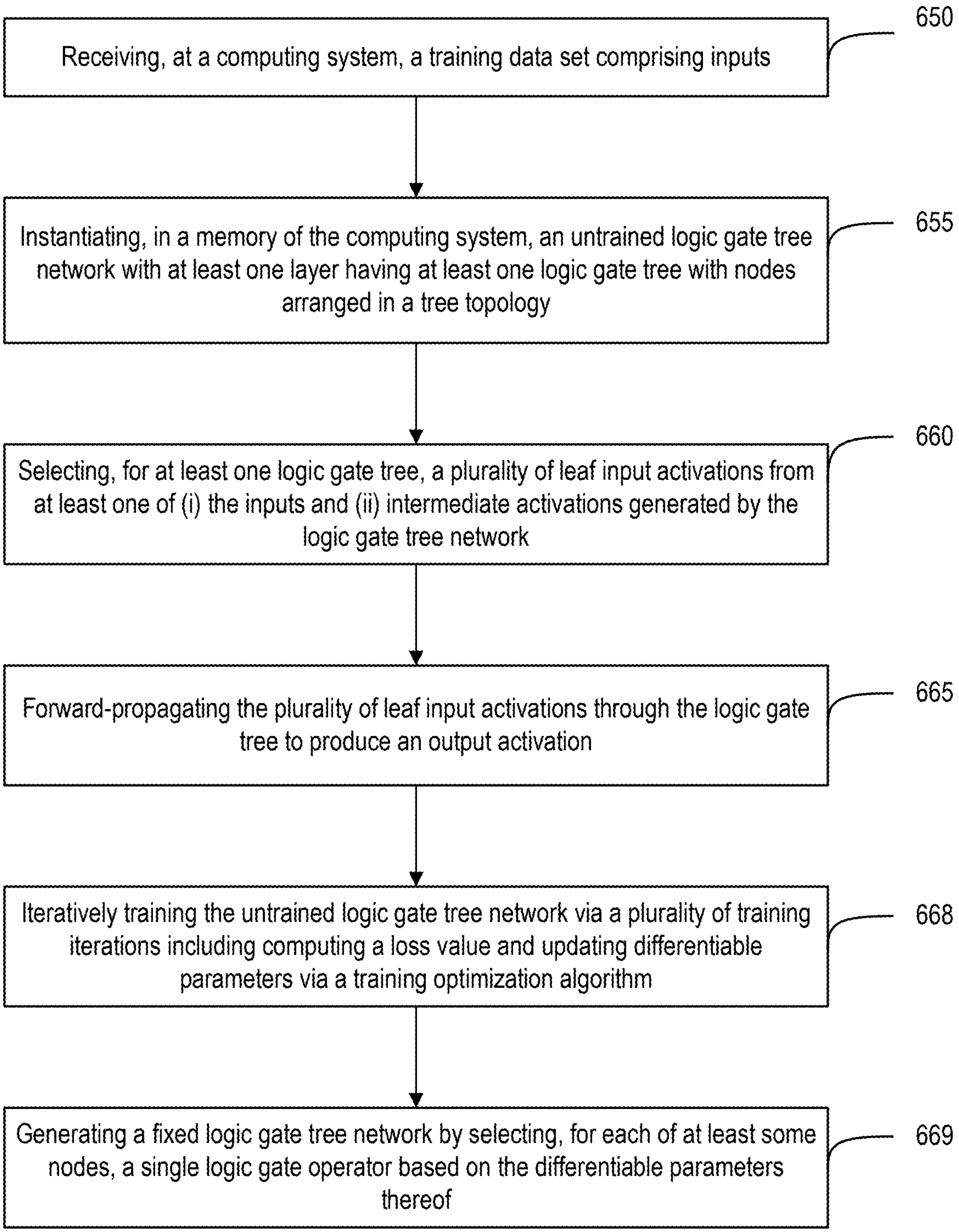
FIG. 6B illustrates an example computer-implemented method for training a logic gate tree network and generating a fixed logic gate tree network, according to one embodiment.

FIG. 6B illustrates an example computer-implemented method for training a logic gate tree network and generating a fixed logic gate tree network, according to one embodiment. At step 650, a computing system receives a training data set comprising inputs. At step 655, the computing system instantiates, in memory, an untrained logic gate tree network comprising at least one layer with at least one logic gate tree. At step 668, the system iteratively trains the untrained logic gate tree network over a plurality of training iterations. At step 669, the system generates a fixed logic gate tree network after training by selecting discrete logic gate operators for at least some nodes based on learned differentiable parameters.

In some embodiments of step 655, each logic gate tree comprises a plurality of nodes arranged in a tree topology in which outputs of lower nodes provide inputs to higher nodes, and a higher node (e.g., a root node) provides an output activation of the tree. Each node may be parameterized by a set of differentiable parameters corresponding to a predefined set of potential logic gate operators. In some embodiments, the differentiable parameters include a vector of unnormalized operator scores (e.g., logits), and the vector may be mapped (e.g., via a softmax, optionally with a temperature parameter) to an operator-selection probability distribution over the predefined set of potential logic gate operators. During training, a node output is computed as a differentiable function of the candidate operator outputs, given the current differentiable parameters, thereby enabling gradient-based optimization.

In some embodiments of steps 660-668, during forward-propagation of a batch of inputs through the logic gate tree network, the system selects a plurality of leaf input activations for at least one logic gate tree and forward-propagates the leaf input activations through the tree to produce an output activation. The leaf input activations may be selected from the batch of inputs and/or intermediate activations generated by the logic gate tree network (e.g., outputs of a prior layer or prior tree). In some embodiments, the tree is a binary tree of depth d≥2 with 2^d leaf inputs (e.g., d=3 with eight leaf inputs), although k-ary trees and/or non-binary nodes are also supported. In each training iteration, the system computes a loss value according to a training objective (e.g., supervised, teacher-student, self-supervised, or other objectives) and updates differentiable parameters for at least one node using a training optimization algorithm (e.g., gradient-based optimization).

After completion of training, at step 669, the system generates a fixed logic gate tree network by selecting, for each of at least some nodes, a single logic gate operator from the predefined set based on the differentiable parameters (e.g., selecting a highest-probability operator), thereby producing a discrete tree-structured logic model suitable for inference and/or circuit representation.

Figure 6C:
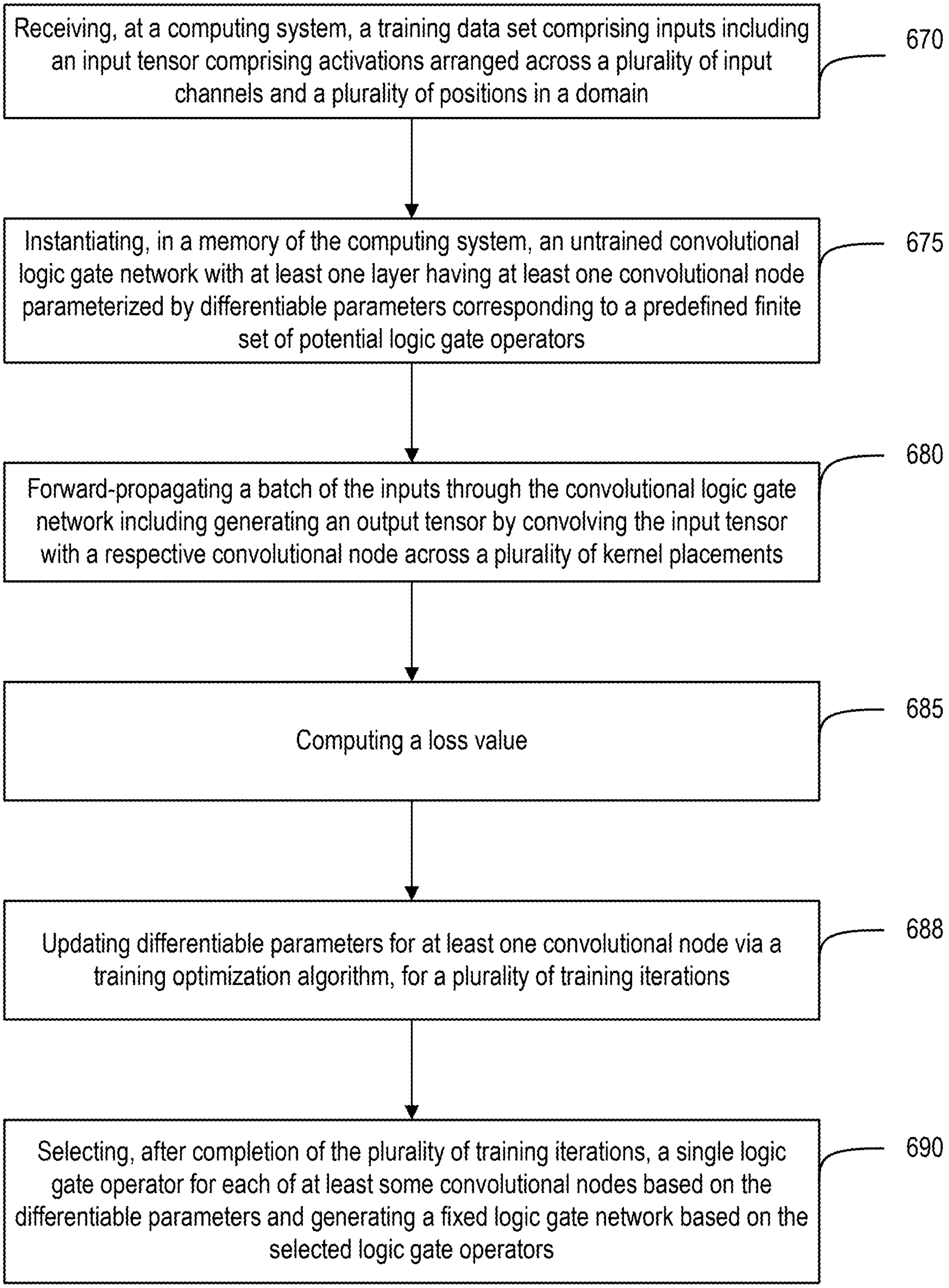
FIG. 6C illustrates an example computer-implemented method for training and generating a fixed convolutional logic gate network, according to one embodiment.

FIG. 6C illustrates an example computer-implemented method for training and generating a fixed convolutional logic gate network, according to one embodiment. At step 670, a computing system receives a training data set comprising inputs. The inputs may comprise an input tensor with activations arranged across a plurality of input channels and a plurality of positions in a domain. At step 675, the system instantiates, in memory, an untrained convolutional logic gate network comprising at least one layer having at least one convolutional node, wherein each convolutional node is parameterized by differentiable parameters corresponding to a predefined finite set of potential logic gate operators. At steps 680-688, the system iteratively trains the untrained convolutional logic gate network over a plurality of training iterations. At step 690, the system selects logic gate operators for at least some convolutional nodes and generates a fixed logic gate network based on the selected operators.

In some embodiments of steps 675 and 680, each convolutional node is a learnable operator module that is applied across a plurality of kernel placements in the domain to generate a corresponding output channel of an output tensor. During differentiable training, for a given convolutional node, the system computes a differentiable output that is a function of the inputs of the node and current differentiable parameters thereof. In some embodiments, the predefined finite set of potential logic gate operators includes Boolean operators (e.g., AND, OR, NAND, NOR, XOR), constant operators, inverter operators, pass-through operators, and/or entries of a lookup table with two or more inputs. In some embodiments, the differentiable parameters comprise operator selection scores mapped (e.g., via a softmax, optionally with temperature) to an operator selection distribution that determines how candidate operator outputs are combined during training.

In some embodiments of step 680, forward propagating includes generating the output tensor by, for each of a plurality of output channels, convolving the input tensor with a respective convolutional node across a plurality of kernel placements in the domain. For example, at each kernel placement, inputs to a convolutional node may be selected from a receptive field of the input tensor (e.g., by selecting one or more channel identifiers and one or more position offsets within the receptive field), and the convolutional node produces a placement-specific output activation. In some embodiments, a given convolutional node reuses the same differentiable parameters across its plurality of kernel placements. The domain may have one spatial dimension or two or more spatial dimensions (e.g., images), and the plurality of kernel placements may be determined by stride, padding, dilation, and/or other translation rules. At step 685, the system computes a loss value for the training objective. At step 688, the system updates differentiable parameters for at least one convolutional node using a training optimization algorithm (e.g., gradient-based optimization), repeating across the plurality of training iterations.

In some embodiments of step 690, after completing the plurality of training iterations, the system selects, for each of at least some convolutional nodes, a single logic gate operator from the predefined finite set based on the differentiable parameters, and generates a fixed logic gate network using the selected operators. In some embodiments, generating the fixed logic gate network includes generating a circuit representation in which multiple kernel placements are unrolled in hardware (i.e., replicated gate instances for placements) and/or are time-multiplexed such that a single logic gate instance is reused across multiple kernel placements.

In some embodiments, time multiplexing is facilitated by flip-flops in the circuit, and in two-dimensional domains, one dimension may be unrolled while the other dimension is time multiplexed. In some embodiments, the system applies a logic synthesis process to the fixed logic gate network (e.g., constant propagation, wire removal, wire collapse, inverter collapse, etc.). In some embodiments, synthesis may reduce the number of logic gate operators by more than 50% or more than 75%. In some embodiments, a logical expression of the fixed logic gate network is implemented in an application-specific integrated circuit (ASIC) and/or other logic hardware.

Figure 7:
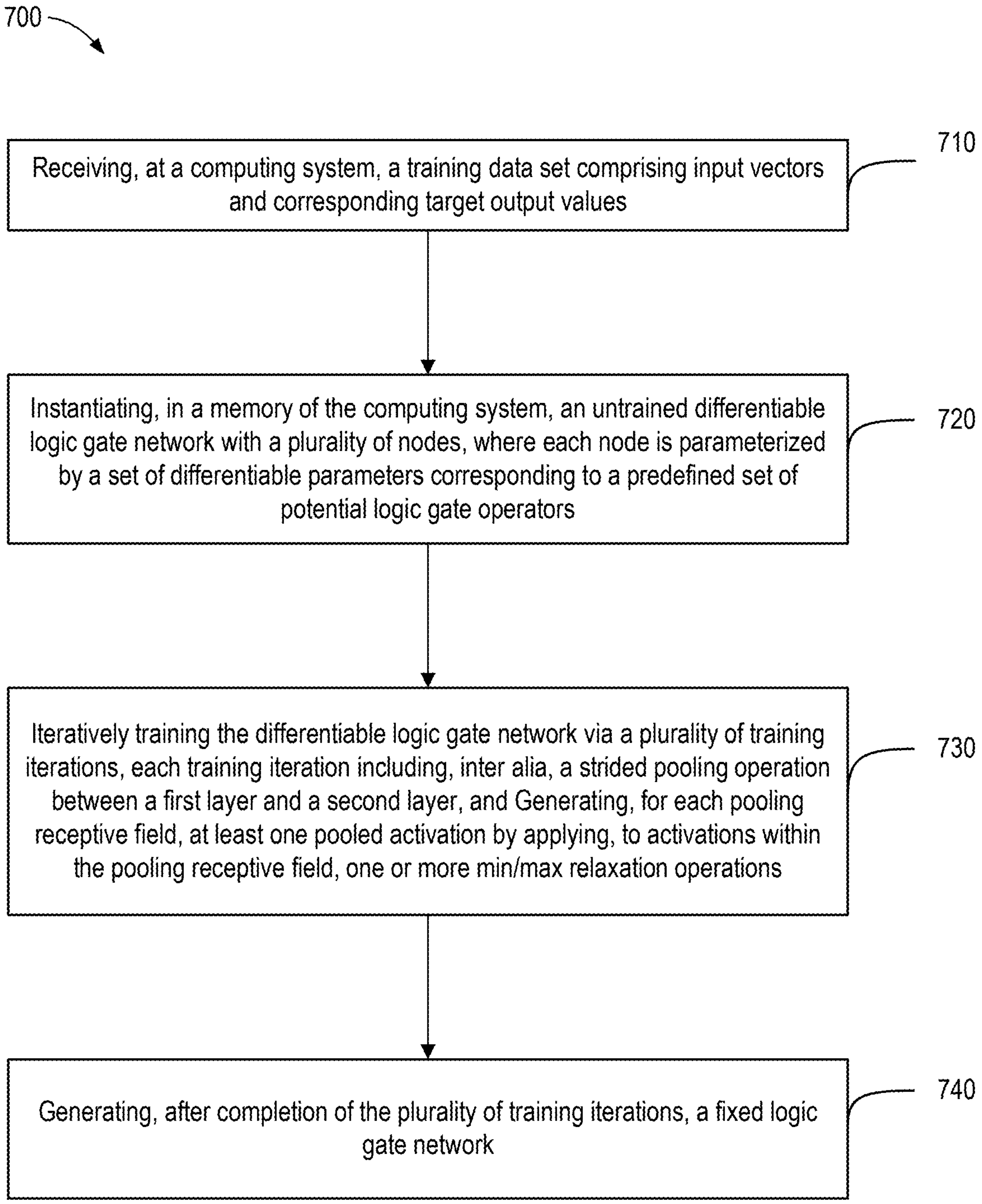
FIG. 7 illustrates an example process for training a differentiable logic gate network that includes a strided pooling operation with backpropagation through selected pooling activations, according to one embodiment.

FIG. 7 illustrates an example process 700 for training a differentiable logic gate network that includes a strided pooling operation with backpropagation through selected pooling activations, according to one embodiment. The pooling operation may be implemented as a strided pooling operation in which, for each pooling receptive field, at least one pooled activation is generated by applying one or more min/max relaxation operations to activations within the pooling receptive field, and thereafter generating a corresponding fixed (e.g., non-differentiable) logic gate network. In various embodiments, the method 700 is performed by a computing system comprising one or more processors and a memory that stores instructions that, when executed, cause the operations described herein to be performed.

In various embodiments, the method 700 is used to train a logic gate network for a machine learning inference task (e.g., classification, regression, control, or other tasks) and/or to produce a fixed logic implementation suitable for deployment on digital logic hardware (e.g., FPGA and/or ASIC). In some embodiments, training of a differentiable logic gate network provides an approach for logic synthesis by learning (via gradient-based optimization) discrete logic gate selections that can later be discretized for deployment.

At step 710, the computing system receives a training data set comprising input vectors (or, in some embodiments, input tensors, feature vectors, or other structured input representations) and corresponding target output values. The target output values may comprise, for example, ground-truth labels, regression targets, control targets, class scores, logits, probability distributions, or other supervisory targets suitable for the inference task.

In some embodiments, the training data set (or at least the "target output values" portion thereof) is generated using a teacher model in a student-teacher (distillation) framework. For example, a neural network teacher may be trained using a conventional training approach (including, in reinforcement learning examples, training with a reinforcement learning algorithm such as PPO), and after training, the system records a data set of inputs (e.g., observations) and corresponding teacher outputs (e.g., predictions). The differentiable logic gate network is then trained as a student model to match or approximate the teacher's outputs (e.g., by minimizing a divergence between the student outputs and teacher outputs).

In some embodiments of student-teacher training, the system trains the differentiable logic gate network using a loss that penalizes deviations from the teacher's predicted distribution, such as a Kullback-Leibler divergence between the student and teacher output distributions over actions/classes/outputs. In some embodiments, the teacher outputs are collected (i) from the start of teacher training, (ii) starting at a later time, and/or (iii) as a mixture across time. In some embodiments, the system uses the current logic gate network as an agent to obtain input observations, uses a teacher model for feedback, and/or trains a secondary teacher agent on residuals.

In some embodiments, the received input vectors comprise real-valued or multi-bit values that are encoded into a binary representation prior to processing by the logic gate network. For example, the system may use thermometer encoding with thresholds derived from quantiles of a data distribution, thereby producing an input bit-vector representation for each input value.

At step 720, the computing system instantiates, in memory, an untrained differentiable logic gate network with a plurality of nodes arranged in a plurality of layers, where each node is parameterized by a set of differentiable parameters corresponding to a predefined set of potential logic gate operators. In some embodiments, each node receives two inputs from a previous layer and produces an output. In some embodiments, connections between nodes are randomly initialized and remain fixed during training, while differentiable parameters are optimized during training to learn which operator is selected at each node.

In some embodiments of FIG. 7, the instantiated node network includes a first set of nodes and a second set of nodes. In some embodiments, each node of the first set is parameterized by differentiable parameters associated with a respective predefined set of potential logic gate operators, and outputs of the first-set nodes are computed using the first relaxation during training. In some embodiments, each node in the second set corresponds to a predefined logic gate operator, and the outputs of the second-set nodes are computed using the second relaxation during training. In some embodiments, one or more pooling-stage nodes are included in the second set of nodes and provide structural inductive bias in the node network by defining fixed or predefined aggregation behavior, while other nodes remain learnable through the first relaxation.

In some embodiments, the second relaxation is used for at least one temporal connection in a sequential logic gate network. In some embodiments, a temporal connection is implemented using at least one of a flip-flop, a latch, a delay element, a register, or another circuit element configured to convey information from a previous cycle to a current cycle. In some embodiments, the temporal connection corresponds to a predefined logic gate operator and is included in the second set of nodes, so that the temporal connection is not learned through the first relaxation used for the first set of nodes. In some embodiments, use of the second relaxation at the temporal connection imposes structural inductive bias by favoring cycle-to-cycle state propagation and temporal dependency structure in the sequential logic gate network.

In some embodiments, the differentiable parameters of a node parameterize a probability distribution over the potential logic gate operators (e.g., via a softmax or other normalized mapping), and a differentiable node output is computed as a function (e.g., an expectation or weighted combination) of the outputs that would be produced by the respective potential operators under the current distribution. In some embodiments, logic gates are relaxed to real-valued operations to enable end-to-end differentiability, and training with gradient-based optimization typically converges to concrete logic gate choices that are later discretized.

While the disclosed pooling features of FIG. 7 utilize min/max relaxations, in some embodiments, other relaxations may additionally or alternatively be used for differentiable logic, including (by way of example) t-norm and/or t-conorm families such as Hamacher and/or Einstein relaxations and/or minimum/maximum t-norms or t-conorms.

At step 730, the computing system iteratively trains the differentiable logic gate network via a plurality of training iterations. Each training iteration includes, among other steps, a forward-propagation step in which a batch of input vectors is passed through the differentiable logic gate network to generate the network's output. During forward propagation, for each node of at least one learnable layer, a differentiable node output is computed as a function of outputs of the potential logic gate operators according to the current differentiable parameters of that node.

In the illustrated embodiment, step 730 further includes performing a strided pooling operation between a first layer and a second layer. More generally, in various embodiments, the strided pooling operation is performed between any two layers in a multi-layer network architecture, and is not limited to the first two layers of the overall network. The strided pooling operation defines pooling receptive fields (e.g., spatial and/or channel-wise neighborhoods) with a given size, and produces pooled outputs from activations within each receptive field.

For each pooling receptive field, the system generates at least one pooled activation by applying one or more min/max relaxation operations to activations within the pooling receptive field. In some embodiments, the pooling operation is a logic-motivated pooling operation, such as an OR-pooling operation implemented as a disjunction over activations in the receptive field. For example, instead of using a probabilistic relaxation of a logical OR, the pooling operation may use a maximum t-conorm relaxation in which the pooled activation equals the maximum activation within the receptive field (i.e., max pooling as an OR-relaxation).

In some embodiments, the strided pooling operation is configured to have a stride equal to the receptive field size, so receptive fields are non-overlapping. This configuration offers several computational advantages, including reduced computation relative to certain probabilistic relaxations, reduced storage (e.g., storing only the pooled activation and its selection index), and simplified backpropagation, in which gradients are propagated only along the selected path.

In some embodiments, the computing system stores pooling selection data for each pooling receptive field. The pooling selection data may identify at least one activation that determines the pooled activation (e.g., an argmax index for max pooling). In some embodiments, the pooling selection data includes one or more indices that identify a channel selection and/or a spatial position within the receptive field. For example, selection data may include (i) an index identifying which input channel is selected and (ii) indices identifying a location inside a receptive field of size $s_h \times s_w$.

In some embodiments, for backpropagation through at least one node in the second set of nodes that uses the second relaxation, the computing system stores only path-selection information for routing a gradient, without storing the node's activation value. In some embodiments, at least two nodes of the first set are connected to one node of the second set, the node of the second set receives outputs of the at least two nodes of the first set, and during backpropagation a gradient is routed through only one path of the node of the second set, such that the gradient is not backpropagated through all of the at least two nodes of the first set. In some embodiments, path-selection-only storage reduces memory consumption during training relative to an implementation that uses the first relaxation for all nodes.

During training, the system may compute a loss that quantifies the difference between the network's output and the corresponding target values, and update the differentiable parameters using an optimization algorithm (e.g., Adam). In some embodiments, the system may compute a loss that does not rely on a supervised target value. This may be, for example, used in self-supervised or unsupervised learning scenarios. In some embodiments, for classification tasks, class scores may be computed by aggregating outputs (e.g., by counting the number of active outputs for each class), scaling them with a temperature, and applying a softmax cross-entropy loss. In some embodiments, the temperature used for loss computation is selected based on model characteristics (e.g., number of outputs), and in a student-teacher setting, a temperature adjustment may be applied when teacher supervision is provided at a class score level, e.g., increasing the softmax temperature by a factor related to $\sqrt{2}$ in certain examples.

In some embodiments, the "target output values" may correspond to teacher predictions, and the loss may include (or consist of) a divergence between student and teacher outputs (e.g., KL divergence). In reinforcement learning-derived embodiments, the teacher model may have been trained using a reinforcement learning algorithm such as PPO, after which the system records inputs (observations) and corresponding teacher predictions for use in training the differentiable logic gate network as a student.

In some embodiments, backpropagation through the strided pooling operation propagates gradients only through the activation(s) identified by the pooling selection data (e.g., only through the maximum activation for max pooling). This behavior follows from storing the pooled activation (or its selection) and backpropagating through the selected activation path, thereby reducing memory usage and computation during training.

In some embodiments, OR-pooling may be expected to increase the prevalence of high activations (e.g., values tending toward logical "1"). However, in certain embodiments, training may implicitly adjust pre-pooling activations such that post-pooling activations do not saturate in a problematic manner, without requiring explicit regularization. Furthermore, in addition to OR-pooling via max relaxation, AND-pooling may be implemented using a minimum relaxation (e.g., a minimum t-norm) and may be effectively equivalent in some architectures due to symmetry.

In some embodiments, including those in which the node network is arranged in a plurality of layers, forward propagation of inputs through the node network may include using input activations from nodes that are differentiable outputs of an earlier layer. For example, forward propagation may include, for each node of a first layer, computing a real-valued non-binary differentiable output that is a real-valued non-binarizing non-linear differentiable function of (i) input activations to the node and (ii) current differentiable parameters of the respective node. Forward propagation may include, for each node of a second layer, computing a real-valued non-binary differentiable output that is a real-valued non-binarizing non-linear differentiable function of the (i) input activations to the node (at least some of which are the real-valued non-binary differentiable outputs of the first layer) and (ii) current differentiable parameters of the respective node.

In another example, for each node of the first layer, the system may compute a real-valued non-binary relaxed differentiable output that is a real-valued non-binarizing relaxed differentiable function of the real-valued non-binary relaxed differentiable outputs of the potential logic gate operators of the respective node according to a non-linear real-valued non-binarizing relaxed differentiable function of current differentiable parameters thereof. The system may also compute, for each node of the second layer, a real-valued non-binary relaxed differentiable output that is a real-valued non-binarizing relaxed differentiable function of the real-valued non-binary relaxed differentiable outputs of the potential logic gate operators of the respective node, where some nodes are real-valued non-binarizing relaxed differentiable functions of one or more inputs, and where each input is a real-valued non-binary relaxed differentiable output of the first layer, according to a non-linear real-valued non-binarizing relaxed differentiable function of current differentiable parameters thereof.

At step 740, after completing the plurality of training iterations, the computing system generates a fixed-logic gate network. In some embodiments, generating the fixed logic gate network comprises discretizing the differentiable logic gate network by identifying, for at least some nodes (and in some embodiments, for a plurality of nodes), a single logic gate operator from the set of potential logic gate operators based on the trained differentiable parameters. For example, the system may select, for each node, the logic gate operator having the largest probability under the learned distribution. In some embodiments, this discretization incurs only minimal accuracy loss relative to the differentiable network and yields a hard-logic gate network suitable for hardware deployment.

In various embodiments, the fixed logic gate network includes a pooling stage corresponding to the strided pooling operation described above. In such embodiments, the pooling stage may be implemented as fixed logic that computes max-based OR pooling (via maximum t-conorm relaxation) and/or min-based AND pooling (via minimum t-norm relaxation). In some embodiments, because stride equals receptive field size, the pooling stage may be implemented efficiently by computing the max (or min) over each receptive field and optionally retaining a selection index (or other selection data) for training-time gradient routing and/or debugging/analysis.

Although FIG. 7 illustrates the operations in a particular order, in various embodiments, the order may be modified, certain operations may be performed in parallel, and/or one or more operations may be repeated or omitted, consistent with the intended functionality. For example, in student-teacher embodiments, teacher prediction generation and dataset construction may be performed either prior to instantiating the student network or iteratively during training, and in pooling embodiments, OR-pooling and AND-pooling may be selectively applied at different stages of the network architecture.

In some embodiments, the particular first relaxation and/or second relaxation used during training need not remain explicitly present in a resulting fixed logic gate network, FPGA implementation, or ASIC implementation. For example, during training a pooling-stage node may generate pooled activation outputs using a max-based and/or min-based relaxation, while after discretization and generation of a fixed logic gate network the corresponding deployed pooling stage may be implemented as a fixed logical expression or other fixed logic circuitry that generates pooled outputs without preserving the training-time differentiable relaxation machinery as such. Thus, in some embodiments, training-time relaxations are used to facilitate training and/or generation of a fixed network, while deployed hardware implements the resulting fixed logic behavior.

Figure 8A:
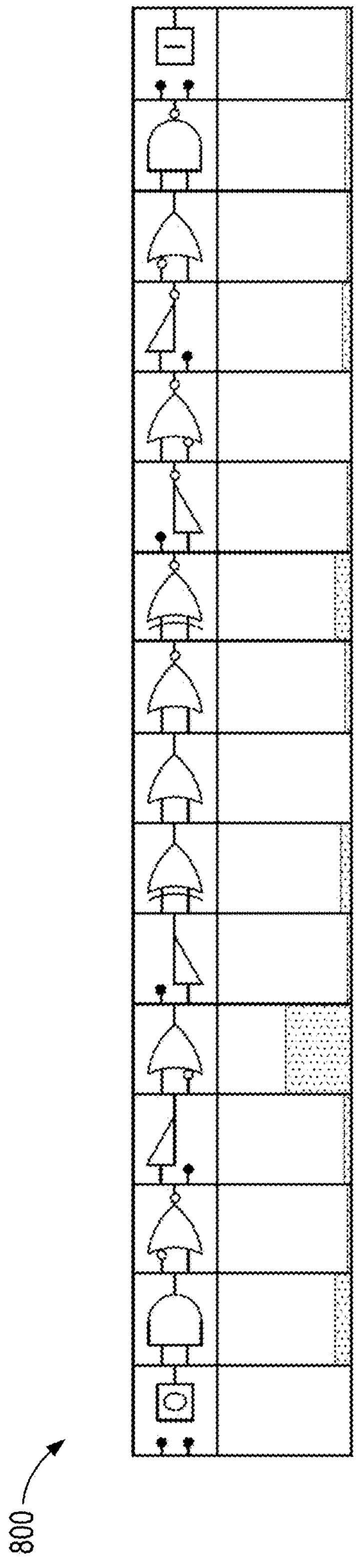
FIGS. 8A-B illustrate a comparison between Gaussian and residual initialization for a differentiable logic gate network, according to one embodiment.
Figure 8B:
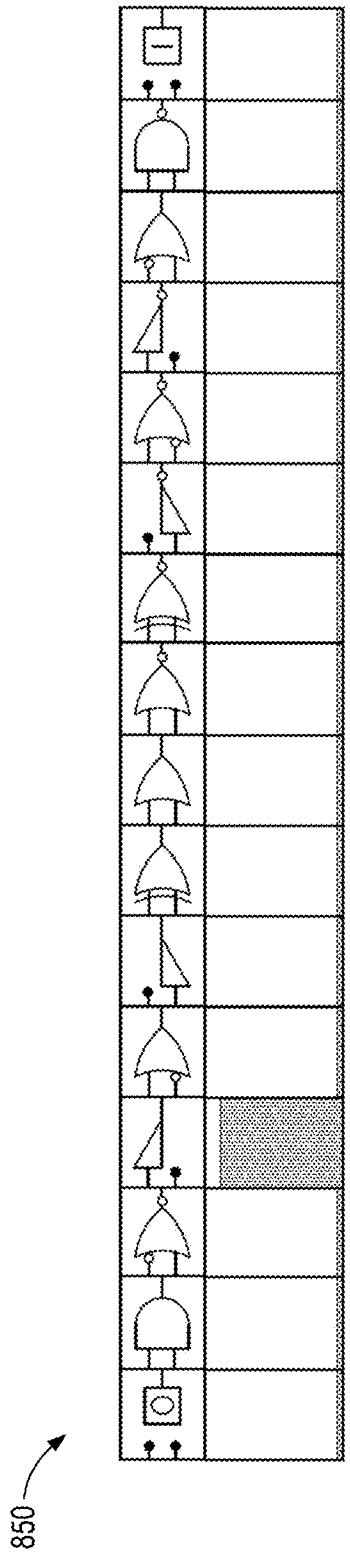

FIGS. 8A and 8B illustrate example operator-selection probability distributions 800 and 850, respectively, for a node of a differentiable logic gate network at initialization, comparing (i) a conventional random initialization and (ii) a "residual initialization" that biases the node toward a feedforward (wire-like) behavior. FIGS. 8A and 8B are illustrated as rows of candidate logic gate operators (shown as logic gate symbols), each corresponding to a respective entry in a predefined set of logic gate operators for the node. In the illustrated example, the predefined set includes a plurality of two-input logic operators, including constant operators (e.g., constant 0 and constant 1), Boolean-combination operators (e.g., AND, OR, XOR, NAND, NOR, etc.), and feedforward logic gate operators (e.g., direct-connection and inverter forms).

In some embodiments, each node in the differentiable logic gate network is parameterized by a set of differentiable parameters corresponding to the predefined set of logic gate operators for that node. For example, the node may be parameterized by a vector of real-valued scores (sometimes referred to as "logits" or "unnormalized scores"), where each score corresponds to a respective candidate logic gate operator. The differentiable parameters may be mapped to an operator-selection probability distribution over the predefined set of logic gate operators using a softmax operation, thereby producing a categorical probability distribution with non-negative entries that sum to 1. Various embodiments include alternative functions mapping from differentiable parameters to per-operator probabilities, including but not limited to computations wherein the probabilities are not computed, and instead utilize a simplified computation that implicitly uses the probabilities but that does not explicitly compute the probabilities (e.g., when the operator probability is an intermediate stage between two previously known computations that may be unified). During differentiable training, the node output may be computed as a differentiable combination (e.g., a weighted sum) of the outputs of the candidate logic gate operators, with weights determined by the operator-selection probability distribution.

In some embodiments, each candidate logic gate operator is evaluated using a differentiable (real-valued) relaxation of a corresponding Boolean truth-table behavior. For example, rather than operating exclusively on hard binary activations, the differentiable logic gate network may propagate activations in a continuous range (e.g., in [0, 1]) and compute, for each candidate logic gate operator, a relaxed operator output based on the node inputs. The node output may then be computed as the expected value (or another differentiable aggregation) of the candidate operator outputs under the operator-selection probability distribution defined by the node's differentiable parameters.

FIG. 8A illustrates an example initialization 800 in which the differentiable parameters (e.g., the logits corresponding to candidate logic gate operators) are initialized as random draws from a distribution (e.g., a Gaussian distribution). In such an initialization, applying softmax to the randomly initialized parameters can yield a comparatively "washed out" operator-selection probability distribution, with probability mass spread across many candidate logic gate operators, with no single operator strongly preferred. In FIG. 8A, this is visually represented by multiple candidate logic gate operators having non-trivial assigned probability (shown by non-zero bar heights beneath multiple gate symbols).

In some embodiments, washed-out operator-selection probability distributions can cause node outputs (and, in deeper networks, layer activations) to become "washed out" as well. For example, expected activations may quickly converge toward intermediate values (e.g., toward approximately 0.5) as depth increases, thereby degrading information flow through the network at initialization. In addition, such washed-out activations can contribute to vanishing gradients in deeper differentiable logic gate networks. For example, with Gaussian initialization, the gradient norm may decay by a substantial factor (e.g., by approximately 0.1-0.2) at each logic gate during backpropagation through an initialized network, which can exponentially slow training as network depth increases.

In conventional neural networks (e.g., convolutional neural networks), residual connections are commonly used to mitigate vanishing gradients and information loss in deep architectures by adding the block's input to its output. However, in pure logic gate-based computation, direct additive residual connections are generally not available and/or may be undesirable, because addition is not a native Boolean operation, and implementing addition may require additional circuitry and/or additional nodes dedicated to performing such additions.

FIG. 8B illustrates an example "residual initialization" 850 for a node of a differentiable logic gate network. In residual initialization, the differentiable parameters of the node are initialized such that the initial operator-selection probability distribution assigns the greatest (or highest) probability to a feedforward logic gate operator, relative to probabilities assigned to other candidate logic gate operators in the predefined set. In FIG. 8B, this is visually represented by a dominant probability mass concentrated on a single candidate operator (shown by a much larger bar height beneath a feedforward-type gate symbol), with little to no probability mass assigned to other operators at initialization.

As used herein, a "feedforward logic gate operator" includes an operator that provides direct-connection behavior (wire-like behavior) and/or inversion behavior for a node input, without performing a Boolean combination of two inputs. For example, in various embodiments, the feedforward logic gate operator comprises one of: (i) a direct-connection operator configured to output a first node input (wire-first-input), (ii) a direct-connection operator configured to output a second node input (wire-second-input), (iii) an inverter operator configured to output an inverse of the first node input (inverter-first-input), or (iv) an inverter operator configured to output an inverse of the second node input (inverter-second-input). In some embodiments, selecting "A" (the first input) as a canonical feedforward choice is functionally interchangeable with selecting "B" (the second input), and is often also interchangeable (e.g., by symmetry) with selecting inverters "1-A" or "1-B."

As used herein, "learning a differentiable logic gate" (and, more generally, learning a trainable multi-input node that is discretizable to a discrete operation) encompasses learning and/or identifying a discrete node function that may be represented as lookup-table ("LUT") contents (i.e., a truth table). For a node having k discrete (e.g., binary) inputs, a discretized form of the node may be fully specified by a LUT having 2^k entries, with each LUT entry defining an output value for a respective input pattern of the k inputs. In some embodiments, the LUT contents are represented as a vector T∈{0,1} {2^k}, where T[i] denotes the output associated with input-pattern index i. In one non-limiting indexing convention for binary inputs $x_0, x_1, \ldots, x_{\{k-1\}} \in \{0,1\}$ with a corresponding index and discretized node output, The number of distinct Boolean functions of k binary inputs is 2^{2^k}. Accordingly, learning a k-input gate/node may be viewed equivalently as: (i) learning the 2^k LUT entries (the truth-table contents) that define the node's discrete mapping, and/or (ii) selecting one LUT-contents vector from among 2^{2^k} possible LUT contents vectors (i.e., selecting one of 2^{2^k} candidate discrete node functions). Thus, in embodiments where a node is trained in a "trainable form" (e.g., by maintaining real-valued parameters that are later discretized), "learning a differentiable logic gate" includes learning parameters that, upon discretization, determine the node's LUT contents, regardless of whether the trainable form is implemented as (a) a selection mechanism over a library of candidate discrete functions (e.g., a probability distribution over candidate truth tables), or (b) a direct parameterization of the truth table itself (e.g., real-valued parameters corresponding to respective truth-table entries that are discretized entry-wise).

By way of a non-limiting example, for k=4, the node has 2^4=16 possible input patterns and can therefore be specified by a 16-bit LUT contents vector T∈{0,1} {16}. The total number of possible discrete node functions in this case is 2^{2^4}=2^{16}=65,536, corresponding to all possible 16-bit LUT-contents vectors. Thus, learning a four-input differentiable logic gate (or other trainable four-input discretizable node) may correspond to learning and/or identifying the 16 LUT entries that define the node's discretized operation, or equivalently selecting one 16-bit LUT-contents vector from among 65,536 possible LUT-contents vectors. In the special case k=2, the LUT has 2^2=4 entries, and there are 2^{2^2}=16 possible discrete functions, corresponding to the sixteen two-input Boolean functions (e.g., as described herein, including in conjunction with FIG. 26 below).

In some embodiments, residual initialization is implemented by initializing a parameter (or logit) corresponding to a selected feedforward operator to be larger than those of other parameters, so that an operator-selection mapping (e.g., a softmax) assigns a substantially higher selection probability to the selected feedforward operator than to any other candidate operator. For example, in one non-limiting implementation, the probability for a wire operator (e.g., "A") is initialized to approximately 90% while other candidate operators share the remaining probability mass (e.g., about 0.67% each when sixteen candidate operators are used). More generally, in embodiments that use 2^{2^k} parameters prior to a softmax to select among 2^{2^k} candidate Boolean functions of k inputs, the residual initialization scheme may be implemented by setting all parameters to 0, except the parameter which corresponds to the gate choice "wire A" (or equivalently "wire B" etc.), which may be set to a value larger than 0, e.g., to 5. Alternatively, the values may be perturbed with random noise, and, optionally, only a subset of trainable nodes (or differentiable gates) may be initialized using residual initialization.

However, when using 2^k parameters, which are each mapped into the [0,1] range (e.g., a truth-table parameterization in which a k-input node is represented by 2^k trainable values corresponding to respective input patterns), the foregoing softmax-based residual initialization scheme does not apply. Instead, residual initialization may be implemented using a parameter vector that leads, upon discretization, to "wire A" (or equivalently "wire B", etc.). For example, in the case of k=2 and 2^k=4, the system may use [−σ, −σ, σ, σ] ^T for some σ>0 to implement "wire A". Equivalently, to implement "wire B" the system may use [−σ, σ, −σ, σ] ^T for some σ>0.

Generally, for arbitrary k, the system may initialize the vector to [(1 if x//e % 2 else−1)·σ for i in range (2k)] ^T** (where, in this expression, x corresponds to the index i) for some σ>0, where e is a power of two specifying the initial wire choice. Inverters during initialization can be obtained analogously. Again, the initialization may be randomly perturbed, and, optionally, only a subset of trainable nodes (or differentiable gates) may be initialized using residual initialization. The residual initialization scheme typically accelerates training (in terms of the number of steps), improves stability, and yields better models.

Residual initialization can provide a residual-connection behavior in a differentiable logic gate network without hard-wiring a residual connection or adding additional logic gate nodes dedicated to implementing residual connections. In practice, initializing nodes to be primarily feedforward (wire-like) at the beginning of training can preserve information flow through deeper layers of the network and reduce gradient decay. As training progresses, nodes that benefit from performing non-feedforward logic operations may learn to shift probability mass away from the initial feedforward operator toward other candidate logic operators (e.g., AND, OR, XOR). Thus, residual initialization may serve as a differentiable analogue of residual connections while remaining compatible with logic gate-based computation and subsequent discretization into a fixed-logic gate network.

In some embodiments, structural inductive bias is additionally or alternatively imposed using a predefined gate configured to combine an activation from one layer of a node network with a residual activation from a different layer of the node network. In some embodiments, the predefined gate is included in the second set of nodes and uses the second relaxation rather than the first relaxation used for learnable nodes. In some embodiments, the predefined gate is repeated multiple times within the node network to provide multiple structural inductive-bias gates for a residual-activation combination. In some embodiments, the combination of activation and residual activation is performed without requiring the combination gate itself to be learned via differentiable operator selection.

In some embodiments, residual initialization enables efficient and effective training of deeper differentiable logic gate networks (e.g., beyond six layers) by addressing both the loss of information in washed-out activations and the vanishing-gradient behavior in washed-out operator-selection distributions at initialization. In some embodiments, the "strength" of residual initialization (i.e., the degree to which the probability distribution is biased toward the feedforward operator) is controlled by a hyperparameter corresponding to the relative magnitude of the feedforward operator's initial logit compared to other logits. For example, in one non-limiting implementation, a hyperparameter (e.g., z3) controls the strength of residual initialization. In some experiments, performance is observed to be satisfactory when such a hyperparameter is at or above a threshold (e.g., z3≥2), and in deeper or larger models, larger values (e.g., about 5) may be favorable (for example, because smaller values may be insufficient to support training in deeper architectures).

In some embodiments, residual initialization also biases trained models toward utilizing feedforward gate choices in portions of the network where a feedforward behavior is sufficient, which can be advantageous for hardware implementations. For example, feedforward gates may be implemented as wires (or wire-like interconnects), thereby potentially reducing transistor count and chip area in a synthesized hardware realization (e.g., FPGA or ASIC), particularly after logic synthesis and simplification to eliminate trivial feedforward nodes or otherwise simplify the learned circuit structure.

As used herein, a multi-input node (e.g., a two-input node) is "residualizable" when its trainable form supports discretization to either: (i) a multi-input operation that functionally depends on at least two of the node inputs (or at least two non-constant node inputs), or (ii) a residual operation that functionally depends on only a single one of the node inputs, such as an identity/pass-through of a selected input or an inverter of a selected input. A node is referred to as a "residual node" when, in a discretized form of the node network (e.g., after applying a discretization rule that selects a fixed per-node operation), the node implements a residual operation. In various embodiments, residual initialization comprises selecting residual operations for a plurality of residualizable nodes (e.g., for more than half of the residualizable nodes in one or more layers, and in non-limiting examples for about 70%, about 90%, or substantially all such nodes), thereby providing residual signal paths through the untrained network while still permitting training to transition selected nodes to multi-input operations. In some embodiments, the trainable parameters that define the trainable forms are updated using a gradient-based optimization algorithm and/or a gradient-approximating optimization algorithm, such as by using exact gradients, surrogate gradients, straight-through estimators, stochastic perturbation methods, finite-difference estimates, and/or other comparable approaches.

As used herein, a discretized node function "functionally depends" on a particular input when varying that input (while holding other non-constant inputs fixed) can change the node output for at least one setting of the other inputs. In some embodiments, functional dependence is evaluated after applying logic-synthesis simplifications such as constant propagation. Constant propagation is a transformation in which known-constant values (e.g., inputs fixed to logical 0 or logical 1) are propagated through downstream logic to simplify node functions (for example, simplifying TRUE AND D to D, and simplifying TRUE XOR D to NOT D). In this context, a "non-constant" input refers to an input that is not provably constant after constant propagation and any associated simplification. Accordingly, a node may be characterized as residual when, after constant propagation, its output depends on only a single non-constant input (even if the node originally received two inputs and was configurable to a multi-input operation).

For example, consider a node network including nodes C and E, where node C has inputs A and B and node E has inputs C and D. In one embodiment, node C is residualizable and is discretized (or residually initialized) to a residual operation C=C (A,B)=A (or C=C (A,B)=NOT A), such that C depends on only one of its inputs. If, due to upstream simplification, C is thereafter determined to be constant (e.g., C=C (A,B)=TRUE), then a downstream node E may also be residual after constant propagation even when E is configured with a two-input operation. For example, if E is configured as E=E (C,D)=C AND D, constant propagation yields E=TRUE AND D=D; and if E is configured as E=E (C,D)=C XOR D, constant propagation yields E=TRUE XOR D=NOT D. Similarly, if X is a constant TRUE and a node output is Y=X XOR A, then constant propagation yields Y=NOT A, and Y is still characterized as residual because it functionally depends on only a single non-constant input A. In various embodiments, the constant nodes that, via constant propagation, induce a residual gate may be counted among the residual gates when determining the proportion of residual gates among a node network, since they, jointly with a respective downstream gate, create a residual function.

Figure 9A:
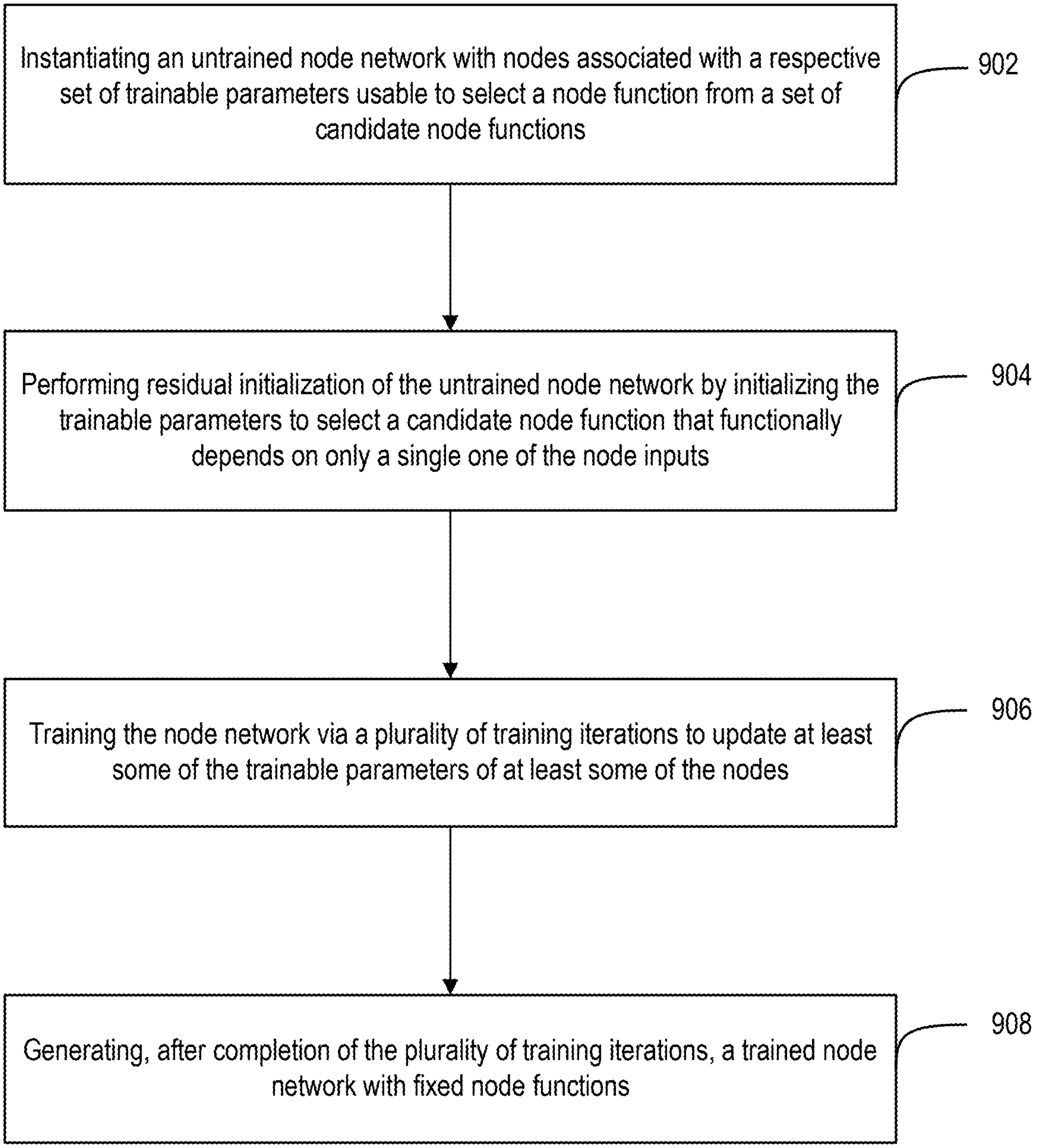
FIG. 9A illustrates an example process for performing residual initialization, according to one embodiment.

FIG. 9A illustrates an example process for performing residual initialization, according to one embodiment. In some embodiments, the operations of FIG. 9A are performed by a computing system comprising one or more processors and memory storing instructions that cause the computing system to perform the operations described herein. At step 902, the computing system instantiates an untrained node network with nodes associated with a respective set of trainable parameters. The trainable parameters are used to select a node function for at least some of the nodes from a set of candidate node functions, including, in some embodiments without limitation, candidate node functions that depend on at least two of the node inputs.

At step 904, the computing system performs a residual initialization of the untrained differentiable logic gate network by initializing or setting the trainable parameters to select a candidate node function that functionally depends on only a single one of the node inputs. In some embodiments, residual initialization includes initializing the differentiable parameters of at least a plurality of nodes such that an initial operator-selection probability distribution assigns a highest probability to a feedforward logic gate operator (i.e., a candidate node function that functionally depends on only a single one of the node inputs).

In step 906, the computing system iteratively trains the differentiable logic gate network via a plurality of training iterations. In some embodiments, each training iteration includes forward-propagating a batch of inputs through the differentiable logic gate network to generate a training output. During forward propagation, the computing system computes, for each node, a differentiable node output as a function of outputs of the potential logic gate operators of that node. In some embodiments, the computing system computes a loss value that quantifies the difference between the training output and the corresponding target output values, and updates the differentiable parameters using a training optimization algorithm (e.g., a gradient-based method such as Adam).

At step 908, after completing the plurality of training iterations, the computing system generates a trained node network with, for example, fixed node functions. In some embodiments, generating the fixed logic gate network includes discretizing the differentiable logic gate network by selecting, for each of at least some nodes, a single logic gate operator from the predefined set of potential logic gate operators based on the node's trained differentiable parameters. In some embodiments, the fixed logic gate network is representable as a circuit description (e.g., a netlist, a hardware-description-language representation, or other circuit data) and may be synthesized to hardware, including implementation in programmable logic (e.g., an FPGA) and/or fabrication as an application-specific integrated circuit (ASIC). In some embodiments, logic synthesis and optimization are applied to simplify the fixed logic gate network, including eliminating trivial feedforward nodes, constant-output nodes, and/or unconnected nodes, and further including implementing feedforward nodes as wires that omit transistor-based logic gates where applicable.

Figure 9B:
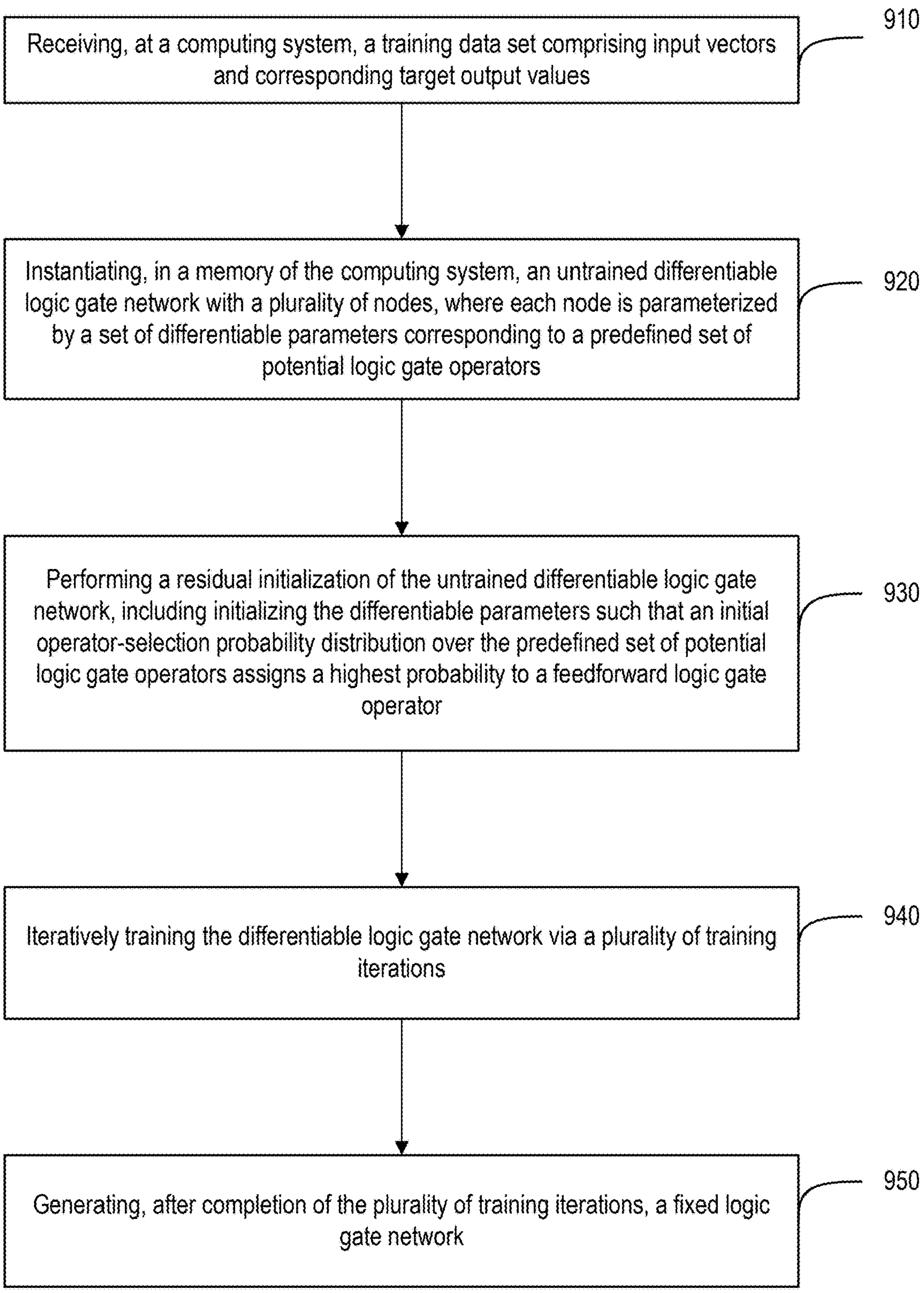
FIG. 9B illustrates an example process for performing residual initialization by biasing gate-operator selection toward feedforward behavior prior to training, according to one embodiment.

FIG. 9B is a flow diagram illustrating an example process for training a differentiable logic gate network using residual initialization and generating a fixed logic gate network after training. In some embodiments, the operations of FIG. 9B are performed by a computing system comprising one or more processors and memory storing instructions that cause the computing system to perform the operations described herein.

At step 910, the computing system receives a training data set comprising input vectors and corresponding target output values. The training dataset may correspond to an inference task such as classification, regression, reinforcement learning policy inference, or other machine learning inference tasks. In some embodiments, the training data set is stored in memory and accessed in batches for iterative training.

At step 920, the computing system instantiates, in memory, an untrained differentiable logic gate network having a plurality of nodes. In some embodiments, the nodes are arranged in a plurality of layers. Each node is parameterized by a respective set of differentiable parameters corresponding to a predefined set of potential logic gate operators for that node. In some embodiments, each node has exactly two inputs and produces a single output activation, although other node arities are possible. In some embodiments, each node is parameterized by a vector of real-valued scores, which are mapped via softmax to an operator-selection probability distribution over the predefined set of logic gate operators.

At step 930, the computing system performs a residual initialization of the untrained differentiable logic gate network. In some embodiments, residual initialization includes initializing the differentiable parameters of at least a plurality of nodes such that an initial operator-selection probability distribution assigns a highest probability to a feedforward logic gate operator. In some embodiments, substantially all nodes in one or more layers, blocks, or stages are initialized with residual. In some embodiments, a subset of nodes is residual-initialized, for example, nodes in deeper layers, nodes within a convolutional block, and/or nodes in an output head, to improve initial information flow and gradient propagation through portions of the network most susceptible to vanishing gradients.

In some embodiments of step 930, residual initialization is implemented by selecting, for a given node, a feedforward operator (e.g., wire-first-input, wire-second-input, inverter-first-input, or inverter-second-input) and initializing the node's differentiable parameters to bias the operator-selection probability distribution toward that selected feedforward operator. In some embodiments, the bias assigns approximately 0.85 to 0.95 probability to the selected feedforward operator, while distributing the remaining probability mass substantially uniformly across the remaining candidate operators. In one non-limiting example using sixteen candidate operators, the selected feedforward operator is assigned to have approximately 0.9 probability while each of the other candidate operators is assigned approximately 0.0067 probability.

In some embodiments, the residual initialization of step 930 is performed using any of the foregoing parameterizations. For example, in embodiments where a node selects among candidate functions using a softmax over 2^{2^k} parameters, the system may bias the corresponding feedforward ("wire") parameter as described above, and in embodiments where a node is parameterized by a 2^k-entry vector, the system may initialize the vector to a pattern that discretizes to a selected wire or inverter function (e.g., "wire A," "wire B," "NOT A," or "NOT B")."

At step 940, the computing system iteratively trains the differentiable logic gate network via a plurality of training iterations. In some embodiments, each training iteration includes forward-propagating a batch of inputs through the differentiable logic gate network to generate a training output. During forward propagation, the computing system computes, for each node, a differentiable node output as a function of outputs of the potential logic gate operators of that node, weighted according to the operator-selection probability distribution defined by the node's current differentiable parameters. In some embodiments, the computing system computes a loss value that quantifies the difference between the training output and the corresponding target output values, and updates the differentiable parameters using a training optimization algorithm (e.g., a gradient-based method such as Adam). As training proceeds, the computing system may update differentiable parameters such that, for at least some nodes, a non-feedforward logic gate operator becomes more probable than the feedforward logic gate operator originally emphasized by residual initialization, thereby enabling the network to learn non-trivial logic operations where beneficial.

At step 950, after completing the plurality of training iterations, the computing system generates a fixed-logic gate network. In some embodiments, generating the fixed logic gate network includes discretizing the differentiable logic gate network by selecting, for each of at least some nodes, a single logic gate operator from the predefined set of potential logic gate operators based on the node's trained differentiable parameters (e.g., selecting the operator having the highest probability in the operator-selection probability distribution). In some embodiments, the fixed logic gate network is representable as a circuit description (e.g., a netlist, a hardware-description-language representation, or other circuit data) and may be synthesized to hardware, including implementation in programmable logic (e.g., an FPGA) and/or fabrication as an application-specific integrated circuit (ASIC). In some embodiments, logic synthesis and optimization are applied to simplify the fixed logic gate network, including eliminating trivial feedforward nodes, constant-output nodes, and/or unconnected nodes, and further including implementing feedforward nodes as wires that omit transistor-based logic gates where applicable.

Although FIGS. 9A and 9B illustrates particular sequences of operations, it will be understood that, in various embodiments, the depicted operations may be performed in different orders, may be combined, and/or may be supplemented with additional operations. For example, residual initialization (step 930) may be applied selectively to particular layers or blocks, may use different feedforward operators for different nodes, and/or may be configured with different initialization strengths for different portions of the differentiable logic gate network to match desired training dynamics and deployment constraints.

Figure 10:
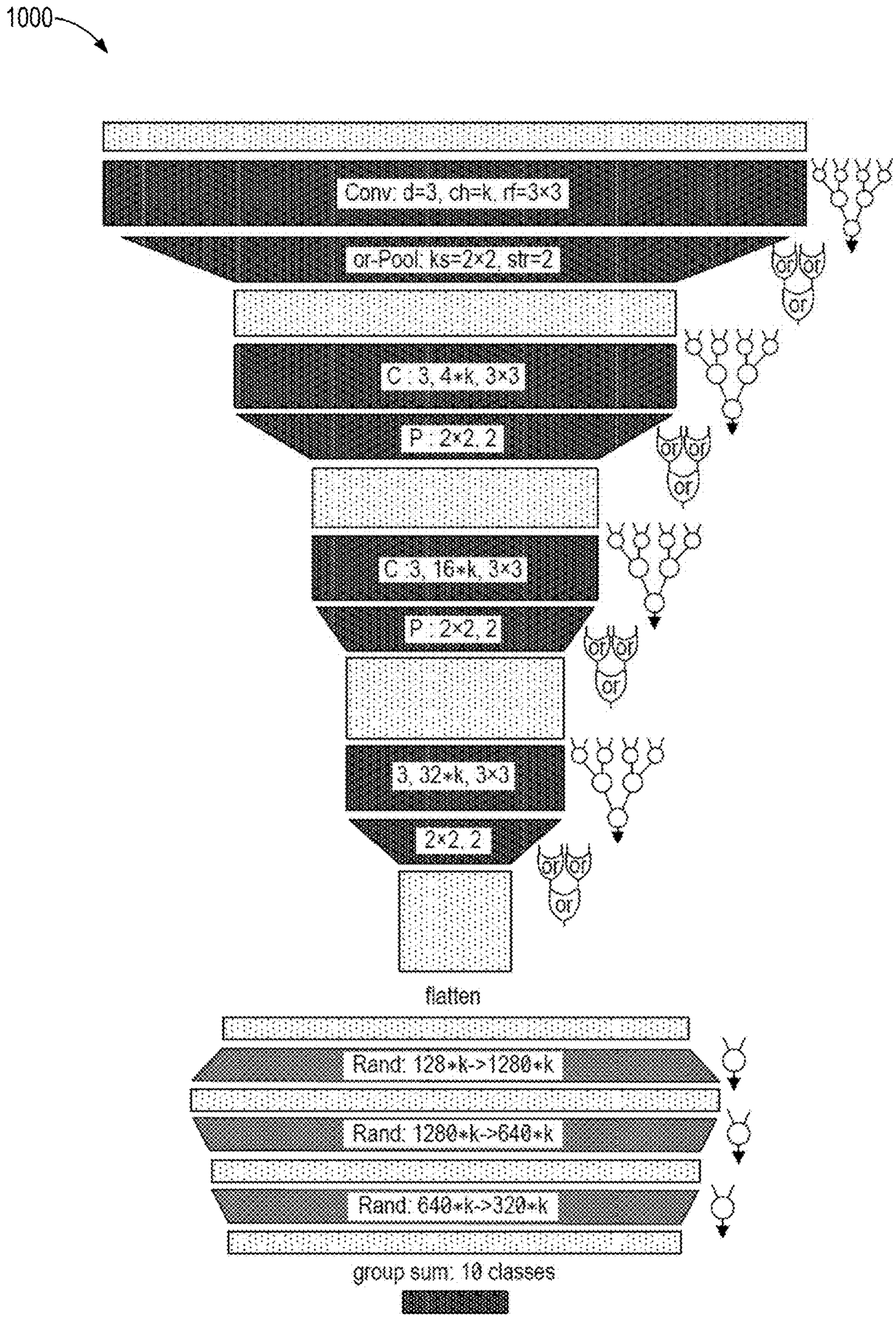
FIG. 10 illustrates an example convolutional logic gate network architecture including logic gate tree convolutional blocks, OR-pooling blocks, and a classification head, according to one embodiment.

FIG. 10 illustrates an example convolutional logic gate network architecture 1000 (also referred to herein as a LogicTreeNet architecture) that is configured to perform an inference task (e.g., image classification) using logic gate-based computation. In various embodiments, the architecture 1000 includes a plurality of convolutional logic gate-tree blocks ("Conv" blocks) and corresponding pooling blocks, followed by a classification head comprising one or more randomly connected differentiable logic layers ("Rand" layers) and a GroupSum output stage. In some embodiments, the architecture 1000 follows a pattern similar to conventional convolutional architectures by applying convolutional blocks with pooling at the end of each block, where each block reduces spatial resolution (e.g., by a factor of 2×2) while increasing the number of channels, until a target spatial resolution (e.g., 2×2) is reached. Thereafter, the architecture 1000 applies a classification head and produces class scores (or other outputs) using a group aggregation operation.

In the illustrated example, the architecture 1000 is defined by a hyperparameter k that controls the network width (e.g., the number of kernels and/or channels across one or more stages). In some embodiments, k may be selected from a set of discrete model scales (e.g., S, M, B, L, G) that correspond to different width values, such that smaller k values yield smaller, faster models, and larger k values yield larger, more accurate models.

Each Conv block of FIG. 10 is configured to perform a convolution-like operation in which an input activation tensor is convolved with one or more learnable logic gate trees, thereby producing one or more output channels. In various embodiments, each convolution kernel is implemented as a logic gate tree (e.g., a complete binary tree) of depth d, where the internal nodes of the tree comprise logic gate operators and the leaves are selected from the receptive field of the input activation tensor. For example, in some embodiments, a kernel with depth d comprises (2^d−1) internal logic gate nodes and receives 2^d leaf inputs from the receptive field, so that the kernel computes a tree-structured composition of logic operations.

In some embodiments, leaf inputs to each logic gate tree are selected from a predefined receptive field of size and across one or more input channels. In some embodiments, the selection of leaf inputs is determined by one or more connection-index tensors that specify: (i) which input channel is selected for each leaf input and (ii) a spatial offset within the receptive field for each leaf input. In some embodiments, the connection indices are randomly initialized (e.g., pseudo-randomly) and may remain fixed during training while the logic gate operator choices in the tree are learned.

As illustrated, the Conv blocks may use a receptive field size of 3×3 ("rf=3×3") and a tree depth of d=3 (e.g., "Conv: d=3, ch=k, rf=3×3" for the first block), although other receptive field sizes and tree depths may be used. In some embodiments, each output channel corresponds to a distinct tree kernel, and the set of tree kernels in a block defines the number of output channels for that block. In the illustrated example architecture 1000, the first Conv block uses k kernels (channels), the second uses 4k kernels, the third uses 16k kernels, and the fourth uses 32k kernels.

In various embodiments, convolutional parameter sharing is achieved by reusing the same kernel (i.e., the same learnable operator-parameterizations of the tree nodes) across multiple spatial placements (i.e., across different (i, j) locations), similar to how CNN weights are shared across spatial locations. In some embodiments, for each output channel (tree kernel), the logic gates (or their differentiable/relaxed forms) are chosen and parameterized independently, but all placements of that kernel share those parameters.

FIG. 10 further illustrates pooling blocks coupled after one or more Conv blocks. In various embodiments, the pooling blocks are configured to perform a logical pooling operation over receptive fields, such as logical OR pooling, which aggregates activations within a pooling receptive field. In some embodiments, pooling may be implemented as a relaxed Boolean aggregation using a t-conorm or t-norm formulation; for example, logical OR pooling may be implemented using a maximum t-conorm relaxation such that, for a pooling receptive field, the pooled activation equals the maximum activation within the receptive field (i.e., max pooling as an OR relaxation).

In some embodiments, the pooling operation is configured as strided pooling, in which the stride equals the size of the pooling receptive field (e.g., a 2×2 kernel with a stride of 2), thereby defining non-overlapping pooling regions. This configuration provides computational and memory advantages: the system may store only the pooled activation and a selection index (or other selection data) indicating which activation was selected as the maximum, and during training, it may backpropagate gradients only through the selected activation(s).

In the illustrated example, each pooling block is shown with a pooling kernel size of 2×2 and a stride of 2 (e.g., "or-Pool: ks=2×2, str=2" for the first pooling block, and "P: 2×2, 2" for subsequent pooling blocks). Consistent with the above, in some embodiments, each pooling block performs logical OR pooling with a kernel size of 2×2 and a stride of 2. In one illustrative embodiment for an image-classification task (e.g., CIFAR-10), FIG. 10 shows an architecture 1000 comprising four convolutional blocks, followed by three randomly connected logic layers and a GroupSum output stage.

In some embodiments, the Conv blocks and Rand layers comprise learnable (differentiable) logic gate nodes, while the pooling layers are fixed (non-learnable) logical aggregation layers. In some embodiments, during training, the learnable logic gate nodes are implemented as probabilistic (or other differentiable) relaxations of logic gates, where each learnable node is parameterized by a softmax distribution over a set of candidate logic operators, and the node output is computed from the learned distribution. In contrast, in some embodiments, the pooling layers are implemented using fixed logical OR operations (or their continuous max t-conorm relaxations) rather than learned gate choices.

In some embodiments, the pooling blocks of FIG. 10 comprise repeating structural inductive-bias gates arranged at multiple locations within the node network. For example, where a plurality of pooling blocks are interleaved with convolutional logic gate-tree blocks, the pooling-stage nodes may form part of the second set of nodes and may use the second relaxation rather than the first relaxation used for learnable logic gate-tree nodes. In some embodiments, the repeated placement of the pooling blocks at multiple stages of the architecture imposes a spatial structural inductive bias on the node network, including a bias toward local receptive-field aggregation and spatial downsampling in a convolutional logic gate network.

In some embodiments, training of the architecture 1000 is implemented using fused compute kernels that fuse evaluation of a logic gate tree (per kernel placement) together with pooling, thereby reducing memory traffic. For example, in an embodiment with tree depth d=3 and 2×2 OR pooling, the system may evaluate four tree placements corresponding to a 2×2 pooling region, then apply a maximum t-conorm pooling operation to produce a single pooled output. In such embodiments, intermediate values (e.g., intermediate tree node outputs and/or intermediate pre-pooling outputs) may be held in registers or local storage and need not be written to memory, and the system may write only the pooled output value and an index of the pooling operation to memory, thereby reducing memory writes and overall training memory footprint. During a backward pass, the system may recompute only selected intermediate values corresponding to the selected pooling path, as needed, to propagate gradients.

In some embodiments, after the convolutional and pooling stages, the architecture 1000 includes a classification head comprising multiple regular, differentiable logic layers (Rand layers) followed by a GroupSum stage. In some embodiments, the Rand layers are "randomly connected" layers in which connectivity between nodes may be randomly constructed and held fixed, while the per-node operator choices are learned. In some embodiments, the GroupSum stage partitions output nodes into groups (e.g., 10 groups corresponding to 10 classes) and computes, for each group, a class score by aggregating (e.g., summing) the outputs of nodes in that group. In some embodiments, the resulting class scores may be used to compute a prediction (e.g., via an argmax over class scores). In hardware-oriented embodiments, the aggregation may be implemented using adders realized as logic gates to efficiently accumulate output bits into an integer score per class.

Although FIG. 10 illustrates a particular example architecture 1000, the illustrated configuration is non-limiting. For example, in various embodiments: (i) the number of convolutional blocks may be greater than or less than four; (ii) receptive field sizes may differ across blocks (e.g., 5×5 in an initial block for certain datasets); (iii) tree depth d may vary by block; (iv) pooling may be applied at some blocks but not others; (v) pooling may be OR pooling (max t-conorm), AND pooling (min t-norm), or a mixture; and/or (vi) the classification head may include additional or fewer Rand layers, different layer widths, and/or different output aggregation strategies.

Additionally, in some embodiments, one or more connectivity restrictions may be applied for convolutional tree inputs to improve performance and/or hardware routing; for example, selection of input channels (CM) for each tree may be restricted such that each tree observes only a limited number of channels (e.g., two channels) to enforce spatial comparisons within a channel and/or to reduce routing congestion in hardware implementations, although such restrictions are optional and the method is not limited thereto.

Figure 11:
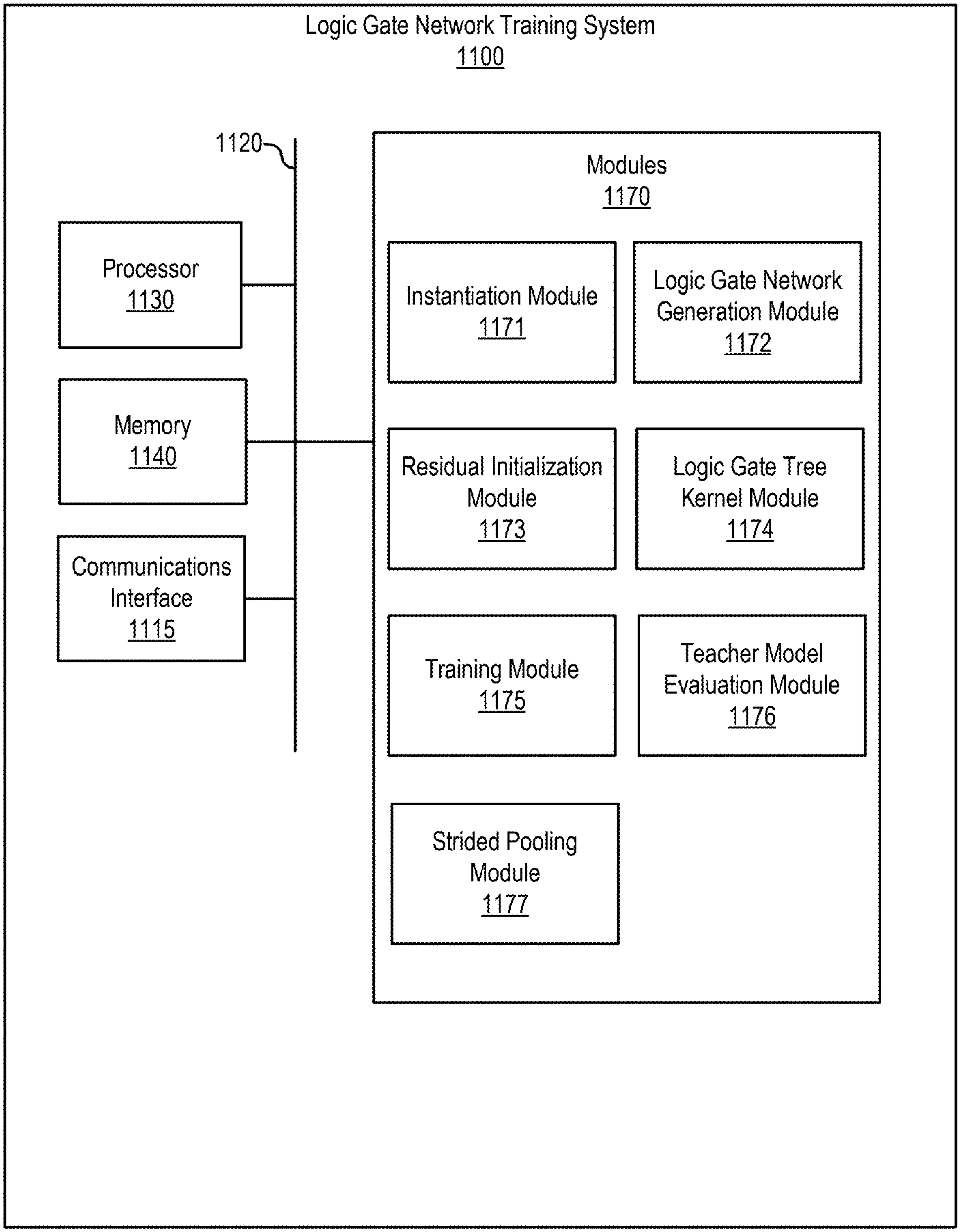
FIG. 11 illustrates an example computing system architecture for instantiating, training, and discretizing logic gate networks, according to one embodiment.

FIG. 11 illustrates an example logic gate network training system 1100 for instantiating, training, and generating (e.g., discretizing) logic gate networks for machine-learning inference tasks, according to one embodiment. In various embodiments, the logic gate network training system 1100 implements and/or orchestrates one or more of the processes described herein, including (by way of example) the student-teacher training process of FIG. 3, the convolutional and logic gate tree training processes of FIG. 6A-C, the pooling-enabled training process of FIG. 7, and/or the residual initialization process of FIG. 9A.

In the illustrated embodiment, the logic gate network training system 1100 includes one or more processors 1130, a memory 1140, and a communications interface 1115. In some embodiments, the processor(s) 1130 include one or more general-purpose processors (e.g., CPUs), one or more parallel processors (e.g., GPUs), one or more accelerators (e.g., TPUs/NPUs), and/or programmable logic or custom logic usable to accelerate training or inference-related operations. The memory 1140 may include one or more non-transitory computer-readable media, such as RAM, ROM, flash memory, solid-state storage, and/or other persistent or non-persistent storage. The memory 1140 may store, among other things, training data sets, distillation data sets, input tensors, intermediate activations, pooling selection data, connection-index arrays, differentiable parameters (e.g., logits or other unnormalized scores), derived probability distributions (e.g., softmax probabilities, sigmoid probabilities, input-conditional output probabilities), gradients, learned operator selections, and fixed-network representations such as netlists and/or hardware description language (HDL) representations.

In the illustrated embodiment, the processor 1130, memory 1140, communications interface 1115, and one or more modules 1170 are communicatively coupled via one or more interconnects 1120. The interconnect 1120 may include one or more buses (e.g., a system bus), crossbars, network-on-chip interconnects, shared memory fabrics, point-to-point links, and/or other communication mechanisms that allow transfer of instructions and data among the depicted components. The communications interface 1115 may include one or more wired or wireless network interfaces (e.g., Ethernet, Wi-Fi, PCIe, or other interfaces) usable to receive training data, send trained model artifacts, access remote compute resources, access a remote teacher model service, and/or communicate with downstream synthesis or hardware deployment toolchains.

The modules 1170 are representative functional blocks and may be implemented in hardware, software, firmware, or any combination thereof. In some embodiments, one or more of the modules 1170 are implemented as instructions stored in memory 1140 and executed by one or more processors 1130. Additionally or alternatively, one or more of the modules 1170 are implemented using dedicated circuitry, accelerators, programmable logic, and/or custom logic. The boundaries between the modules 1170 are illustrative and non-limiting; in various embodiments, operations described as being performed by a particular module may be performed by a different module, combined with another module, subdivided into sub-modules, and/or distributed across multiple devices (e.g., a training system and a deployment device), without departing from the scope of the present disclosure.

The instantiation module 1171 is configured to instantiate untrained differentiable logic gate networks in memory 1140. In some embodiments, instantiation includes allocating data structures that represent a network topology (e.g., layers, trees, directed acyclic graphs, and/or other topologies), allocating and initializing differentiable parameters for nodes, and configuring operator sets for nodes (e.g., specifying the predefined set of potential logic gate operators available at each node).

In some embodiments, the instantiation module 1171 instantiates a differentiable logic gate network having a plurality of nodes arranged in a plurality of layers, where each node is parameterized by differentiable parameters corresponding to a predefined set of potential logic gate operators (e.g., including AND, OR, XOR, NAND, NOR, constants, inverters, and/or direct-connection operators). In some embodiments, the instantiation module 1171 further configures a differentiable relaxation used for training (e.g., probabilistic relaxations and/or min/max relaxations, and/or other relaxations described herein), thereby enabling gradient-based optimization.

In convolutional embodiments, the instantiation module 1171 may instantiate one or more convolutional layers in which each convolution kernel is represented as a logic gate tree kernel, and may configure architectural hyperparameters such as tree depth, number of kernels (output channels), receptive field sizes, stride/padding/dilation settings, and/or channel grouping parameters.

In pooling embodiments, the instantiation module 1171 may configure one or more pooling layers or pooling stages (including strided pooling stages), define pooling receptive fields (e.g., pooling window sizes), and allocate memory for pooling selection data (e.g., argmax/argmin indices or other selection metadata) used for training-time backpropagation.

The logic gate network generation module 1172 is configured to generate and/or define an initial (untrained) logic gate network structure and associated connectivity. In various embodiments, this includes generating a randomly connected logic gate network, generating a structured logic gate network (e.g., including convolutional blocks), and/or generating auxiliary data structures that define connectivity patterns.

For example, in some embodiments, the logic gate network generation module 1172 generates connection patterns between nodes of adjacent layers and stores connection identifiers in one or more arrays (e.g., connection-index arrays), which may then be reused during forward propagation to determine which prior-layer outputs feed each node. In convolutional embodiments, the logic gate network generation module 1172 may cooperate with the logic gate tree kernel module 1174 to define, for each kernel, a mapping from receptive-field positions and input channels to tree leaves, thereby enabling consistent parameter sharing across kernel placements.

In some embodiments, the logic gate network generation module 1172 generates multiple candidate network configurations (e.g., different random seeds, different tree structures, different operator sets, different pooling placements) and provides such configurations to the training module 1175 for training and evaluation (e.g., for architecture search, ablation studies, or model selection).

The residual initialization module 1173 is configured to perform residual initialization of a differentiable logic gate network prior to training. In some embodiments, residual initialization includes initializing differentiable parameters for at least a plurality of nodes such that an initial operator-selection probability distribution over the predefined set of potential logic gate operators assigns a highest (or greatest) probability to a feedforward logic gate operator, relative to probabilities assigned to other potential logic gate operators.

In various embodiments, the residual initialization module 1173 configures feedforward behavior without hard-wiring residual connections and without adding logic gate nodes dedicated to implementing them. In some embodiments, residual initialization is applied to substantially all learnable nodes in a network. In other embodiments, residual initialization is applied selectively (e.g., to deeper layers, specific blocks, or specific stages) to improve early signal flow and gradient propagation where vanishing gradients are more likely.

In some embodiments, the residual initialization module 1173 selects, for a node, a feedforward operator that comprises one of: (i) a direct-connection operator that outputs a first node input, (ii) a direct-connection operator that outputs a second node input, (iii) an inverter operator that outputs an inverse of the first node input, or (iv) an inverter operator that outputs an inverse of the second node input. In some embodiments, residual initialization is implemented by setting initial differentiable parameters such that (i) a feedforward operator has an initial selection probability in a range such as approximately 0.85 to 0.95 and (ii) remaining probability mass is distributed across other operators (e.g., substantially uniformly), while still enabling training to shift probability mass toward non-feedforward operators where beneficial.

In some embodiments, the residual initialization module 1173 supports multiple trainable representations of node operations. For example, the module may residual-initialize (i) a categorical operator-selection representation (e.g., softmax over $2^{2^k}$ parameters for k-input Boolean functions) by disproportionately biasing a feedforward choice such as a wire function, and/or (ii) a truth-table representation (e.g., $2^k$ parameters mapped into [0,1]) by initializing the truth-table parameter vector so that discretization yields a wire or inverter function as an initial per-node operation.

The logic gate tree kernel module 1174 is configured to implement convolutional logic gate networks in which convolution kernels are represented as logic gate trees (e.g., binary trees or E-ary trees). In some embodiments, the logic gate tree kernel module 1174 generates and/or stores, for each logic gate tree kernel, (i) a tree topology defining how outputs of lower nodes feed higher nodes and (ii) a leaf-selection mapping that defines how a receptive field of an input tensor is mapped to the leaves of the tree.

In some embodiments, during forward propagation, the logic gate tree kernel module 1174 performs a convolution over an input tensor by iterating over a set of kernel placements in a domain (e.g., positions in a 2D grid) and, for each placement, selecting a set of leaf input activations from the receptive field and forward-propagating the leaf activations through the logic gate tree kernel to produce a kernel output activation. In some embodiments, differentiable parameters for nodes of a given logic gate tree kernel are shared among multiple placements, thereby implementing convolutional parameter sharing and spatial equivariance.

In some embodiments, the logic gate tree kernel module 1174 supports binary trees of depth d, where the number of leaves is $2^a$, and/or supports non-binary (E-ary) nodes configured to receive three or more inputs. In some embodiments, the module stores and reuses connection-index arrays that define, for each leaf, an input-channel identifier and a position offset within the receptive field. In some embodiments, these arrays are generated pseudo-randomly at instantiation and thereafter held fixed across training, thereby enabling training to focus on learning operator selections and/or operator blending parameters.

The training module 1175 is configured to train differentiable logic gate networks using one or more training data sets. In various embodiments, training includes iterative training over a plurality of training iterations, where each training iteration includes forward propagation of inputs through the differentiable logic gate network, computation of a loss value, and updating differentiable parameters using a training optimization algorithm.

In some embodiments, during forward propagation, the training module 1175 computes node outputs using differentiable combinations of candidate logic operator outputs. For example, in some embodiments, each node has differentiable parameters that define (directly or indirectly) a categorical distribution over candidate logic gate operators. The training module 1175 may map differentiable parameters to a probability distribution using a softmax operation (optionally with a temperature parameter), and compute a differentiable node output as a weighted combination of the candidate operator outputs according to the probability distribution.

In some embodiments, the training module 1175 computes a loss value based on differences between network outputs and target output values (e.g., cross-entropy for classification, mean-squared error for regression, divergence-based objectives for distillation, and/or composite objectives that combine multiple loss terms). The training module 1175 may then compute gradients (e.g., by backpropagation through differentiable relaxations and through pooling operations) and update differentiable parameters using one or more optimizers (e.g., stochastic gradient descent, Adam, or other gradient-based optimization techniques).

In some embodiments, the training module 1175 coordinates with the residual initialization module 1173 (e.g., by invoking residual initialization prior to a first training iteration) and coordinates with the logic gate tree kernel module 1174 and strided pooling module 1177 during forward propagation and backpropagation in architectures that include convolutional logic gate trees and pooling blocks.

The teacher model evaluation module 1176 is configured to obtain and evaluate a teacher model for student-teacher training (distillation) embodiments. In some embodiments, the teacher model is a conventionally trained neural network (including a policy/value model for reinforcement learning), and the teacher model evaluation module 1176 evaluates the teacher model on input vectors (or input tensors) to generate teacher output values such as logits, probabilities, class distributions, action distributions, value estimates, and/or other supervision signals.

In some embodiments, the teacher model evaluation module 1176 supports multiple teacher-supervision workflows. For example, the module may (i) generate teacher outputs on-the-fly during student training (e.g., per training iteration or per batch) or (ii) precompute teacher outputs and store them in memory 1140 as a distillation data set. In some embodiments, the module applies calibration or scaling operations to teacher outputs, such as temperature scaling or logit scaling, to adjust supervision entropy and improve distillation behavior.

In some embodiments, the teacher model evaluation module 1176 obtains teacher models and/or teacher output values via the communications interface 1115 (e.g., from a remote server, a cloud service, or a distributed training environment). In other embodiments, teacher evaluation is performed locally on the same computing device that trains the student model.

The strided pooling module 1177 is configured to implement pooling operations in differentiable logic gate networks, including strided pooling operations (SPooling) that utilize min/max relaxation operations compatible with logic gate computation. In some embodiments, the strided pooling module 1177 defines pooling receptive fields (e.g., pooling windows in a spatial domain and/or across channels) and generates pooled activations by applying one or more min/max operations to activations within each receptive field.

In some embodiments, OR-pooling is implemented via a maximum operation corresponding to a maximum t-conorm relaxation of logical OR, and/or AND-pooling is implemented via a minimum operation corresponding to a minimum t-norm relaxation of logical AND. In some embodiments, the stride of the pooling operation equals the receptive field size (e.g., non-overlapping receptive fields), thereby reducing compute and memory traffic relative to pooling implementations that require overlapping windows and/or storing intermediate values for all window positions.

In some embodiments, the strided pooling module 1177 stores pooling selection data for each pooling receptive field (e.g., an index identifying the max-selected activation for OR-pooling and/or an index identifying the min-selected activation for AND-pooling). During backpropagation, the strided pooling module 1177 uses the stored pooling selection data to propagate gradients through the selected activation(s) (e.g., only through the max-selected activation for max pooling), which can reduce training-time computation and memory bandwidth. In some embodiments, the strided pooling module 1177 may be used as part of a convolutional logic gate tree network, including architectures in which pooling blocks are interleaved with tree-kernel convolutional blocks and/or classification heads.

In various embodiments, not all modules 1170 are used in every configuration. For example, teacher model evaluation module 1176 may be omitted in embodiments that train directly from ground-truth labels rather than teacher supervision; logic gate tree kernel module 1174 may be omitted in embodiments that use non-convolutional random connectivity; and strided pooling module 1177 may be omitted in embodiments that do not include pooling layers. Similarly, residual initialization module 1173 may be used alone or in combination with convolutional logic gate trees, pooling, and/or student-teacher training. Thus, FIG. 11 is intended to illustrate an example system architecture that supports multiple aspects of the present disclosure, including the four claim sets described herein, and is not intended to imply that all depicted modules must be present or utilized in all embodiments.

FIG. 12 illustrates an example results table 1200 comparing accuracy and gate counts for CIFAR-10 across logic gate network models and baseline models, according to one embodiment. As illustrated, the table 1200 provides a comparative performance summary for logic gate-based machine learning models on an inference task (e.g., image classification on CIFAR-10), in which each row identifies a respective model (or model configuration), and corresponding columns report (i) an accuracy metric ("Acc.") and (ii) a logic gate complexity metric ("#Gates"). In some embodiments, the "#Gates" metric represents a number of logic gates and/or binary logic operations in a discretized (fixed) logic gate network implementation, and is usable as a proxy for hardware cost and efficiency, including, for example, transistor count and chip area for an ASIC implementation and/or resource utilization on an FPGA implementation. In the illustrated example, the table 1200 includes results for various baseline models. The table 1200 further includes multiple example embodiments of convolutional logic gate-tree networks ("LogicTreeNet") scaled to different sizes. As illustrated, the LogicTreeNet architectures may be scaled to reach targeted accuracy levels while providing substantial reductions in logic gate count relative to other approaches at comparable accuracy levels, thereby enabling more efficient deployment of the trained inference model as logic circuitry (e.g., reduced area and/or improved performance and power efficiency on ASICs and/or FPGAs).

FIG. 13 provides an example comparative results table 1300 for a representative image-classification task (e.g., CIFAR-10) that is included to demonstrate that a trained, discretized logic gate-based model can be realized as a fixed logic circuit and evaluated with extremely low inference latency on a field-programmable gate array (FPGA), while achieving competitive predictive performance relative to prior approaches. FIG. 13 shows that, once the differentiable training process has selected concrete logic operators and the model has been discretized into a fixed logic gate network, the resulting implementation can shift the practical performance bottleneck away from conventional weightfetch and arithmetic costs and toward I/O transfer considerations, thereby enabling orders-of-magnitude improvements in throughput and/or latency for inference workloads. FIG. 13 further supports the proposition that additional acceleration (and/or power reduction) may be achievable through fixed-silicon implementations (e.g., application-specific integrated circuits), because the trained model is representable as a circuit description suitable for synthesis and hardware realization.

FIG. 14A provides an example results table 1400 for a representative handwritten-digit classification task (e.g., MNIST) to illustrate the intended "accuracy-per-logic-cost" and "accuracy-per-latency" benefits of the disclosed logic gate-tree-based architectures and training techniques. As illustrated, the logic gate-based models produced by differentiable training and subsequent discretization can simultaneously (i) achieve high classification accuracy, (ii) remain compact in terms of logic resources (e.g., gate count as a proxy for hardware cost), and (iii) execute with very low end-to-end inference time on FPGA hardware. The disclosed approach is not merely theoretically compatible with hardware deployment; it can also deliver high-quality inference with logic-native execution characteristics.

FIG. 14B provides an example variability (repeatability) table 1450 that demonstrates the robustness of the disclosed training and discretization workflow across multiple independently trained model instances. For example, despite the use of randomized factors that may be present in some implementations (e.g., random initialization, randomized connection selection, randomized minibatch order, or other stochastic training effects), the resulting discretized logic gate networks can exhibit stable and reproducible inference accuracy with comparatively small run-to-run variation. This supports practical deployment scenarios in which consistent model quality is important (including hardware deployment), and it further supports embodiments in which multiple instances of a trained model (or multiple independently trained models) may be deployed, replicated, or synthesized with predictable behavior and predictable performance characteristics.

Figures 15, 16:
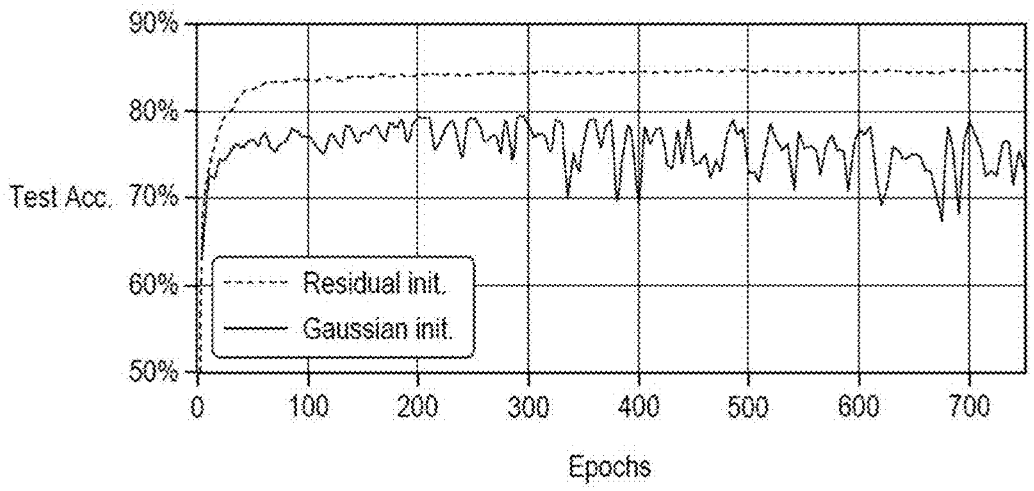
FIG. 15 illustrates an example ablation results table for architectural and training choices in convolutional logic gate networks, according to one embodiment.
FIG. 16 illustrates an example plot comparing training behavior under residual initialization versus Gaussian initialization, according to one embodiment.

FIG. 15 illustrates an example ablation results table 1500 for architectural and training choices in convolutional logic gate networks, according to one embodiment. The example ablation study table 1500 shows how architectural and training choices affect the performance of convolutional logic gate-tree networks (e.g., a "LogicTreeNet-L" configuration) and, in particular, how increasing convolutional/tree depth can improve accuracy while maintaining convolutional parameter sharing. In the illustrated example, a baseline LogicTreeNet-L configuration achieves about 84.99% accuracy with 15 trainable layers and 23 total logical layers when logical OR pooling ("or-pool"), residual initialization, weight decay, and a two-input-channel restriction per tree are enabled; shallower convolutional configurations (e.g., "Conv. d: 1,1,1,1" up through "Conv. d: 2,2,3,3") show progressively increasing accuracies (e.g., about 80.98% to 84.13%) as depth increases. The table 1500 further illustrates that omitting OR pooling can reduce accuracy (e.g., to about 81.45%), omitting residual initialization can substantially reduce accuracy (e.g., Gaussian initialization at about 76.18%), and other choices such as disabling weight decay or allowing additional input channels can also reduce accuracy; these results are consistent with the notion that using logic gate trees, residual initialization, and OR pooling affect the performance of convolutional LGNs, and that restricting each convolutional tree kernel to fewer input channels can encourage within-channel spatial comparisons and improve hardware routing/locality in some embodiments.

FIG. 16 illustrates an example plot 1600 comparing training behavior under residual initialization versus Gaussian initialization, according to one embodiment. The example training-trajectory plot 1600 compares test accuracy across training epochs for an embodiment with residual initialization versus a conventional Gaussian initialization, illustrating that residual initialization can stabilize training and enable convergence in deeper logic gate-based architectures. In some embodiments, residual initialization is performed by initializing each logic gate node's differentiable operator-selection parameters such that a feedforward operator (e.g., a wire/pass-through choice such as "A," and in some cases symmetrically also "B," "1-A," or "1-B") is assigned a dominant initial probability (e.g., about 90%) while remaining candidate operators share the remaining probability mass (e.g., about 0.67% each across 16 operators), which can be achieved by setting one parameter (e.g., z3=5) larger than the others (e.g., $z_i \neq 0$ for $i+3$) prior to applying a softmax mapping. As illustrated, without such residual initialization, the training can become unstable and may not converge, whereas residual initialization can prevent loss of information and vanishing gradients in deeper networks while allowing training to replace feedforward behaviors with other learned logic operations when beneficial, without hard-wiring additive residual connections or requiring additional dedicated residual gates.

FIG. 17A illustrates, for a trained logic gate network (e.g., an MNIST model), an example heat-map distribution 1700 of logic gate-operator selections resulting from Gaussian initialization, where rows correspond to layers and columns correspond to logic gate operator choices, and the heat-map intensity indicates the relative prevalence (or probability mass/selection frequency) of each operator choice in each layer. In this example, the Gaussian-initialized model exhibits a comparatively diffuse distribution across the candidate operator set (e.g., across a 16-operator family including constants, pass-throughs, inverters, and two-input Boolean operators), which is consistent with an initialization that does not intentionally bias the network toward feedforwarding ("wire-like") behaviors at the start of training.

FIG. 17B illustrates, for a trained logic gate network (e.g., an MNIST model), an example heat-map distribution 1750 of logic gate-operator selections resulting from residual initialization, again with rows corresponding to layers and columns corresponding to logic gate operators. In the illustrated example, residual initialization produces a pronounced concentration of operator selections (or selection probability mass) in a feedforward operator (e.g., "A"), reflecting a favorable inductive bias that can (i) improve trainability/stability of deeper logic gate networks and (ii) be reduced as needed by learning and/or subsequent logic simplification, as some gates transition away from pure feedforward behavior to implement more complex Boolean operations that improve task performance.

FIG. 18 illustrates an example results table 1800 comparing reinforcement-learning rewards and inference latencies for a neural-network teacher and a logic gate-network student, according to one embodiment. The table 1800 compares a conventionally trained neural-network teacher to a differentiable logic gate-network student across multiple environments (e.g., CartPole-v1, Acrobot-v1, and LunarLander-v3). In some embodiments, the teacher is trained using a reinforcement-learning algorithm (e.g., PPO), the teacher is evaluated to produce a data set of input observations and corresponding teacher predictions (e.g., action-probability distributions), and the student logic gate network is trained by minimizing a divergence between student outputs and teacher outputs (e.g., a Kullback-Leibler divergence) to transfer teacher behavior to a logic gate-based student suitable for ultra-low-latency inference. The illustrated results show that the student can match or exceed the teacher reward while dramatically reducing inference latency (e.g., teacher latencies on the order of ~12 μs versus student latencies on the order of ≤5 ns in the table 1800), thereby evidencing embodiments in which logic gate-network inference can be implemented in extremely small latency budgets (e.g., a single FPGA clock cycle or equivalent hardware-logic evaluation window) while maintaining task performance.

Figure 19:
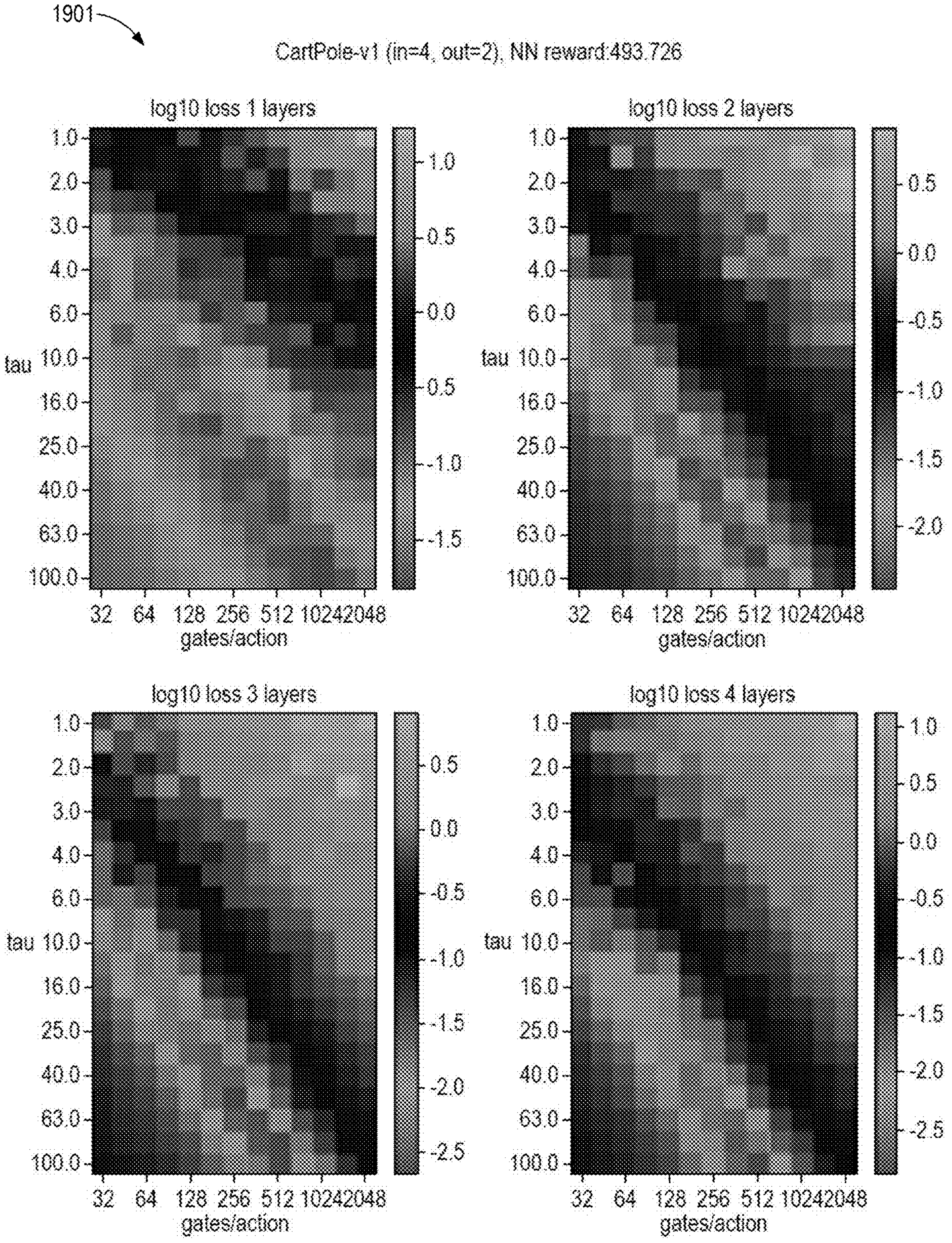
FIG. 19 illustrates example heatmaps of training loss and reward for CartPole-v1 across network depth and hyperparameter settings, according to one embodiment.

FIG. 19 illustrates example distillation (student-teacher) training-loss results for a logic gate-network student policy distilled from a trained neural-network teacher in a reinforcement-learning environment. In this example, the environment is CartPole-v1, the observation/input dimensionality is in=4, the action/output dimensionality is out=2, and the teacher achieves a reward of approximately 493.726. The figure shows four heat maps 1901 labeled "log 10 loss" for student depths of 1, 2, 3, and 4 layers. In the illustrated implementation, the loss is a divergence between teacher and student outputs (e.g., a Kullback-Leibler divergence between a teacher action-probability distribution and a student action-probability distribution), and the plotted quantity is a log-transformed version of this loss (log10 loss) for visualization. The vertical axis of each heat map 1901 corresponds to an output softmax temperature, and the horizontal axis corresponds to the number of gates per layer and action. Each cell in a heat map 1901 thus corresponds to a particular combination of (i) student depth, (ii) student width/capacity expressed as gates per layer per action, and (iii) softmax temperature, and the shading indicates the resulting training loss magnitude for that combination, thereby providing an example basis for selecting student-model hyperparameters in a student-teacher training workflow.

Figure 20:
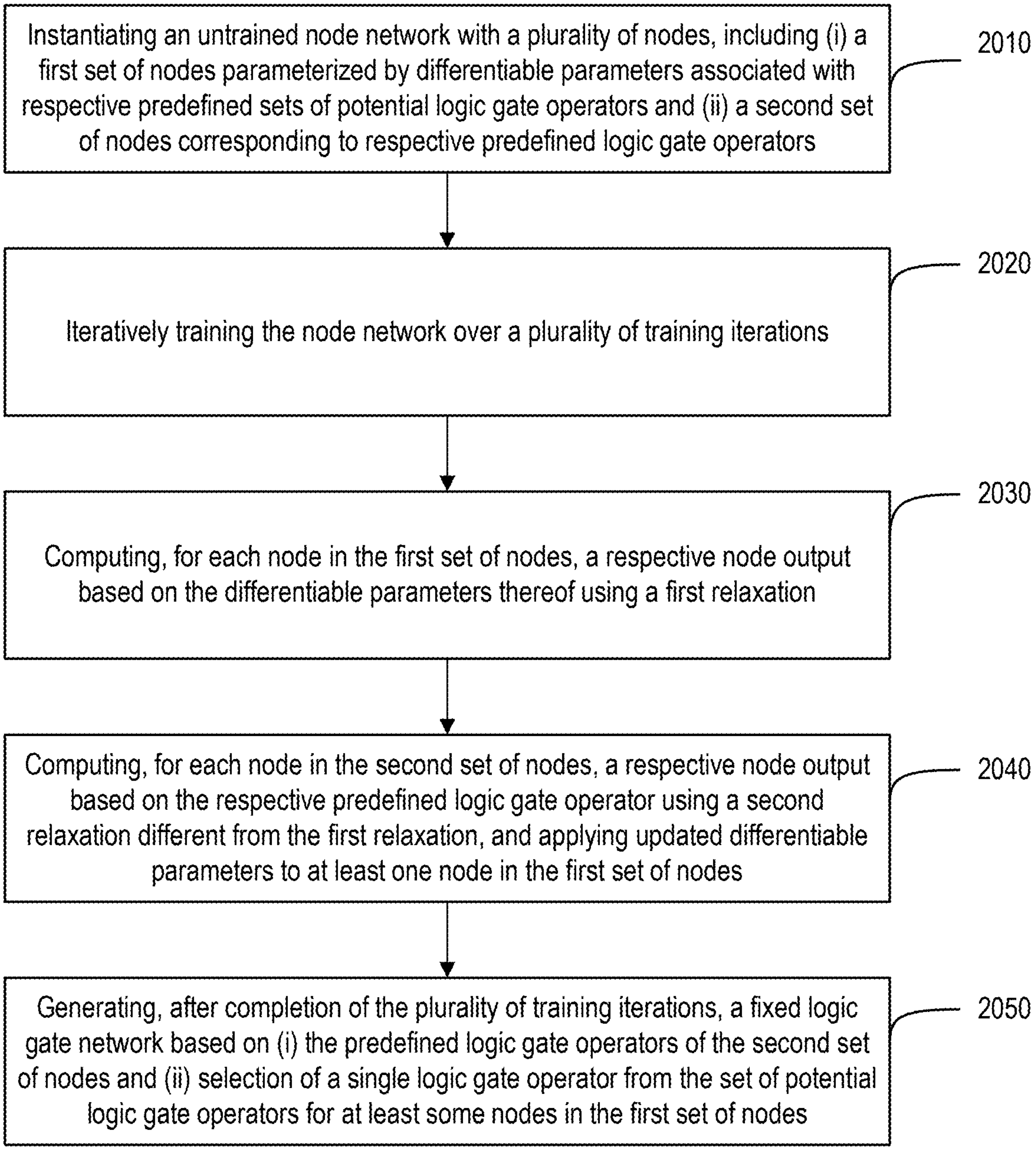
FIG. 20 illustrates an example process for training a node network using heterogeneous relaxations, according to one embodiment.

FIG. 20 illustrates an example process for training a node network using heterogeneous relaxations, according to one embodiment. In various embodiments, the process is performed by a computing system comprising one or more processors and a memory that stores instructions that, when executed, cause the computing system to instantiate an untrained node network comprising a plurality of nodes, including a first set of nodes and a second set of nodes. In some embodiments, each node in the first set is parameterized by a set of differentiable parameters associated with a respective predefined set of potential logic gate operators, while each node in the second set corresponds to a respective predefined logic gate operator. In some embodiments, the first set comprises learnable nodes and the second set comprises predefined nodes that represent a fixed or partially fixed structure within the node network.

At step 2010, the computing system instantiates the untrained node network. In some embodiments, instantiation includes allocating data structures representing the node network topology, allocating and initializing differentiable parameters for the first set of nodes, and associating the first set of nodes with respective predefined sets of potential logic gate operators. In some embodiments, the second set of nodes is instantiated as nodes corresponding to respective predefined logic gate operators, such that outputs of the second set are not determined by selecting among multiple candidate logic gate operators using differentiable parameters of the type used for the first set. At step 2020, the computing system iteratively trains the node network over a plurality of training iterations, as described herein.

At step 2030, the computing system computes, for each node in the first set of nodes, a respective node output based on the differentiable parameters of that node using a first relaxation. In some embodiments, the first relaxation is a relaxation for selecting among the predefined set of potential logic gate operators associated with the respective node, including embodiments in which the first relaxation facilitates subsequent selection of a single logic gate operator from the set. At step 2040, the computing system computes, for each node in the second set of nodes, a respective node output based on the respective predefined logic gate operator using a second relaxation different from the first relaxation. More specifically, the second relaxation is different from the first relaxation beyond the fact that the first relaxation uses differentiable parameters for selecting a single logic gate operator from the set of potential logic gate operators.

For example, in some embodiments, the first relaxation is probabilistic, continuous-non-linear, stochastic-sampling-based, Yager-based, or another differentiable relaxation, while the second relaxation is min/max-based, Hamacher-based, continuous, or another relaxation suitable for nodes corresponding to predefined logic gate operators. In some embodiments, the second relaxation is used to impose structural inductive bias in the node network.

For example, in some embodiments, in the context of convolutions, it may be favorable to use pooling operations from the second set of nodes using the second relaxation. In other words, in some embodiments, the second relaxation may be from a different family of relaxations compared to the first relaxation (e.g., probabilistic vs. min/max based relaxations). In some embodiments, one family of relaxations is advantageous from a computational perspective, while the other relaxation is advantageous from a learning dynamics perspective, motivating the use, in various embodiments, of two different types of relaxations for trainable and non-trainable relaxations.

For example, in some embodiments (e.g., in some contexts of sequential models, time-series models, and language models), structure can provide improved performance. For instance, logic gate operators can connect between different time-steps or cycles of the circuit, thereby providing a "bridge" through memory states (e.g., flip-flops) between time-steps, thereby maintaining information flow. In various embodiments, it may improve the network to keep this "bridge" with a non-trainable "foundation" that provides a desired functionality, while abstaining from the ability to change the choice of logic gate operator. Experimental evidence has shown that, in some embodiments, between trainable nodes and non-trainable nodes, different types of relaxations each offer distinct advantages. In some embodiments, this may be analogous to transformer models, which utilize predefined computational operations (attention) and different families of operations (e.g., softmax, inner product between activations) compared to the trainable part (e.g., activated matrix multiplication) of the model. In some other embodiments, the structural inductive bias is used to provide residual connections within the network(s).

At step 2050, after completion of the plurality of training iterations, the computing system generates a fixed logic gate network based on (i) the predefined logic gate operators of the second set of nodes and (ii) selection of a single logic gate operator from the set of potential logic gate operators for at least some nodes in the first set of nodes. In some embodiments, the fixed logic gate network is representable as a logical expression, circuit description, netlist, and/or hardware description language representation, and may be deployed in software, programmable logic, and/or fixed-silicon hardware. Although FIG. 20 illustrates a particular ordering of steps 2010-2050, in various embodiments, one or more steps may be subdivided, reordered, repeated, performed in parallel, and/or supplemented with additional operations.

Figure 21:
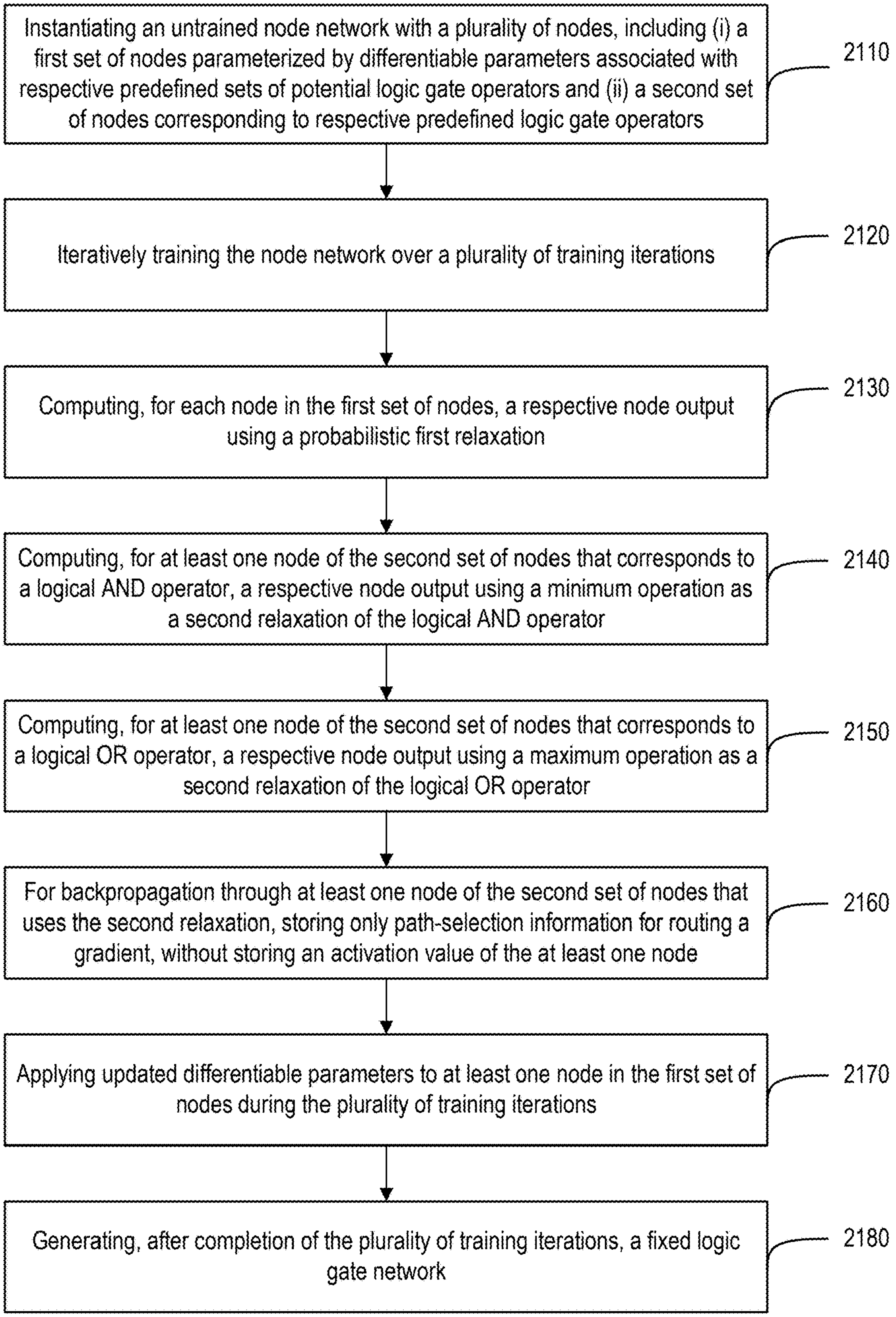
FIG. 21 illustrates an example process for training a node network using a first relaxation for a first set of nodes and a second relaxation for a second set of nodes, according to one embodiment.

FIG. 21 illustrates an example process for training a node network using a first relaxation for a first set of nodes and a second relaxation for a second set of nodes, according to a more specific example embodiment. In various embodiments, the process further illustrates example embodiments in which the first relaxation is probabilistic and the second relaxation uses a minimum operation and/or a maximum operation for respective predefined logic gate operators.

At step 2110, the computing system instantiates an untrained node network comprising a plurality of nodes, including (i) a first set of nodes parameterized by differentiable parameters associated with respective predefined sets of potential logic gate operators and (ii) a second set of nodes corresponding to respective predefined logic gate operators. At step 2120, the computing system iteratively trains the node network over a plurality of training iterations. At step 2130, the computing system computes, for each node in the first set of nodes, a respective node output using a probabilistic first relaxation. In some embodiments, the probabilistic first relaxation comprises probabilities corresponding to respective logic gate operators of the predefined set of potential logic gate operators based on the differentiable parameters, and inputs to a respective node of the first set are input activation probabilities between 0 and 1.

At step 2140, for at least one node of the second set of nodes that corresponds to a specific logical operator (e.g., a logical AND operator), the computing system computes a respective node output using a minimum operation as a second relaxation of the logical AND operator (per the specific example, but not by way of limitation). At step 2150, for at least one node of the second set of nodes that corresponds to a logical OR operator (by way of example, and not limitation), the computing system computes a respective node output using a maximum operation as a second relaxation of the logical OR operator (again, per the specific example, but not by way of limitation). In some embodiments, the second relaxation is used for nodes that provide structural inductive bias in the node network, including spatial pooling nodes, temporal-connection nodes, residual-activation-combination nodes, or other predefined nodes. In some embodiments, the second relaxation is different from the first relaxation (beyond the fact that the first relaxation uses differentiable parameters for selecting a single logic gate operator from the set of potential logic gate operators) and may reduce memory consumption during training relative to using the first relaxation for all nodes.

As illustrated at step 2160, in some specific examples, for backpropagation through at least one node of the second set of nodes that uses the second relaxation, the computing system stores only path-selection information for routing a gradient, without storing an activation value of the at least one node. In some embodiments, at least two nodes of the first set are connected to one node of the second set, the node of the second set receives the outputs of the at least two nodes of the first set, and for backpropagation a gradient is routed through only one path of the node of the second set such that the gradient is not backpropagated through all of the at least two nodes of the first set. In some embodiments, this path-selection-information-only approach reduces memory usage and computational overhead during training by avoiding storage and/or reuse of full activation values for the second-set nodes.

At step 2170, the computing system applies updated differentiable parameters to at least one node in the first set of nodes during the plurality of training iterations. At step 2180, after completing the plurality of training iterations, the computing system generates a fixed logic gate network. In some embodiments, the fixed logic gate network is based on (i) predefined logic gate operators of the second set of nodes and (ii) selection of single logic gate operators from predefined sets of potential logic gate operators for at least some nodes in the first set based on the differentiable parameters thereof. Although FIG. 21 illustrates a particular sequence of steps 2110-2180, in various embodiments, one or more steps may be combined, omitted, reordered, repeated, and/or performed concurrently.

Figures 22, 23:
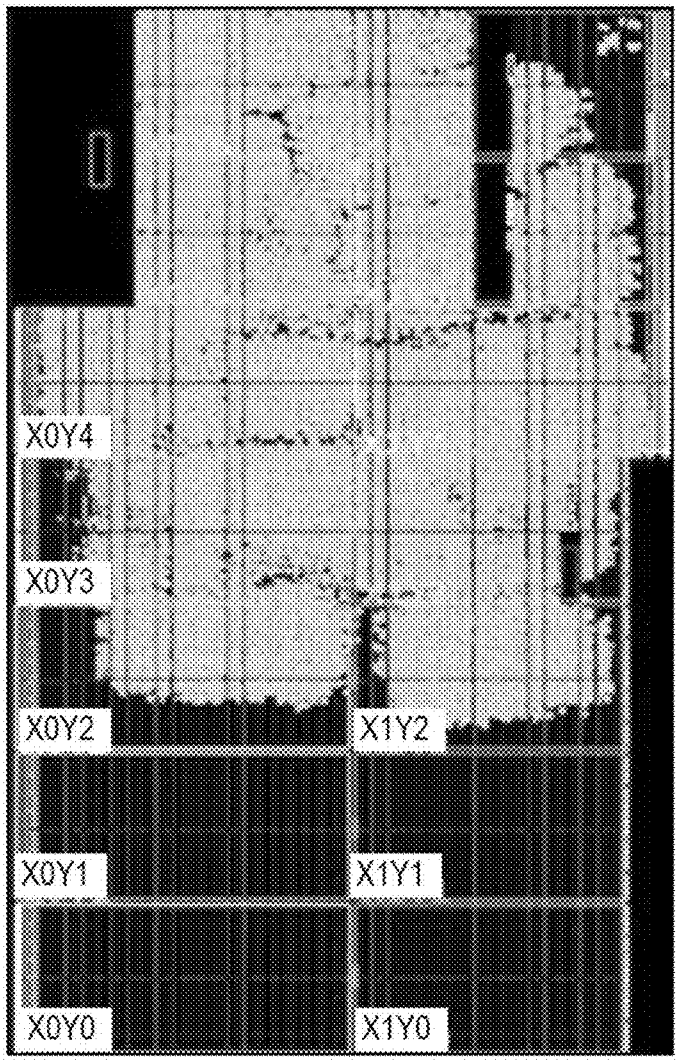
FIG. 22 illustrates an example hyperparameter table for training and scaling logic gate network models for CIFAR-10 and MNIST, according to one embodiment.
FIG. 23 illustrates an example hardware placement of a trained logic gate network on a programmable logic device, according to one embodiment.

FIG. 22 is a hyperparameter summary table 2200 that lists example training configurations used to train differentiable logic gate network models on image-classification tasks, including CIFAR-10 and MNIST. In the illustrated embodiment, the table 2200 is organized by model identifiers that correspond to different model scales (e.g., CIFAR-10: S, M, B, L, G; MNIST: S, M, L) and reports, for each model scale, a corresponding width parameter (k) and example training hyperparameters including a temperature ($\tau$), learning rate ($\eta$), weight decay ($\beta$), batch size (bs), and an output-gate factor ($o_x$). The table 2200 further lists example input-representation settings (e.g., a number of input bits), an outputs-per-class setting ($n_{out}/c$), and an associated maximum attainable class score derived from the outputs-per-class setting and the temperature (e.g., $n_{out}/c$ divided by $\tau$), with the attainable class-score range noted as spanning from 0 up to the maximum class score. In various embodiments, the configurations of FIG. 22 provide non-limiting examples of hyperparameter selections and output-representation scaling suitable for training and evaluating logic-gate-based models across different model sizes and datasets.

FIG. 23 illustrates an example hardware placement 2300 of a trained logic gate network implementing an MNIST inference model (e.g., model "M") on a field-programmable gate array (FPGA) (e.g., a Xilinx XC7Z045 FPGA), in which the discretized logic gate network is mapped into spatially distributed resources of the FPGA fabric for hardware inference. In some embodiments, to facilitate routable placement and reduce routing congestion, the system may select and/or constrain internal connections of the logic gate network that are recombined at a stage of output-gate accumulation (akin to grouped convolution), while maintaining accuracy given the inherent sparsity of logic gate networks.

In various embodiments, the discretized node network is implemented in hardware using either combinational logic, sequential logic, or a combination thereof. In some embodiments, the discretized node network is unrolled such that each discretized node (or at least a selected set of nodes) corresponds to a respective hardware logic instance and the network is evaluated combinationally (e.g., within a clock cycle subject to timing closure). In other embodiments, to reduce area, resource utilization, or routing congestion, the implementation is time-multiplexed such that a hardware instance (or a subset of hardware instances) implementing one or more discretized node functions is reused across multiple evaluation phases (e.g., across multiple layers, time steps, and/or spatial placements), thereby trading off throughput and/or latency for reduced hardware resource usage.

In some embodiments, time-multiplexing is facilitated using storage elements including flip-flops (registers) that store intermediate values and/or pipeline stages, together with multiplexers and control logic that select inputs to a reused node-function circuit over time. For example, in a convolutional node network in which a kernel circuit (e.g., a logic-gate-tree kernel) is applied at a plurality of kernel placements, the kernel circuit may be replicated for parallel evaluation at multiple placements (unrolling), or the kernel circuit may be reused by time-multiplexing the circuit between placements such that different placements are evaluated in different clock cycles while sharing the same kernel logic resources. In certain embodiments, sliding-window buffering (e.g., shift registers, line buffers, or block RAM) supplies receptive field inputs to the time-multiplexed kernel circuit, and flip-flops store intermediate node outputs and/or partial results to support pipelined evaluation and timing closure on a target FPGA and/or ASIC implementation. In some embodiments, the discretized node network is implemented in hardware using a combinational logic expression, divided into pipeline stages via registers, flip-flops, or latches, e.g., to increase throughput or to improve metastability.

Figure 24:
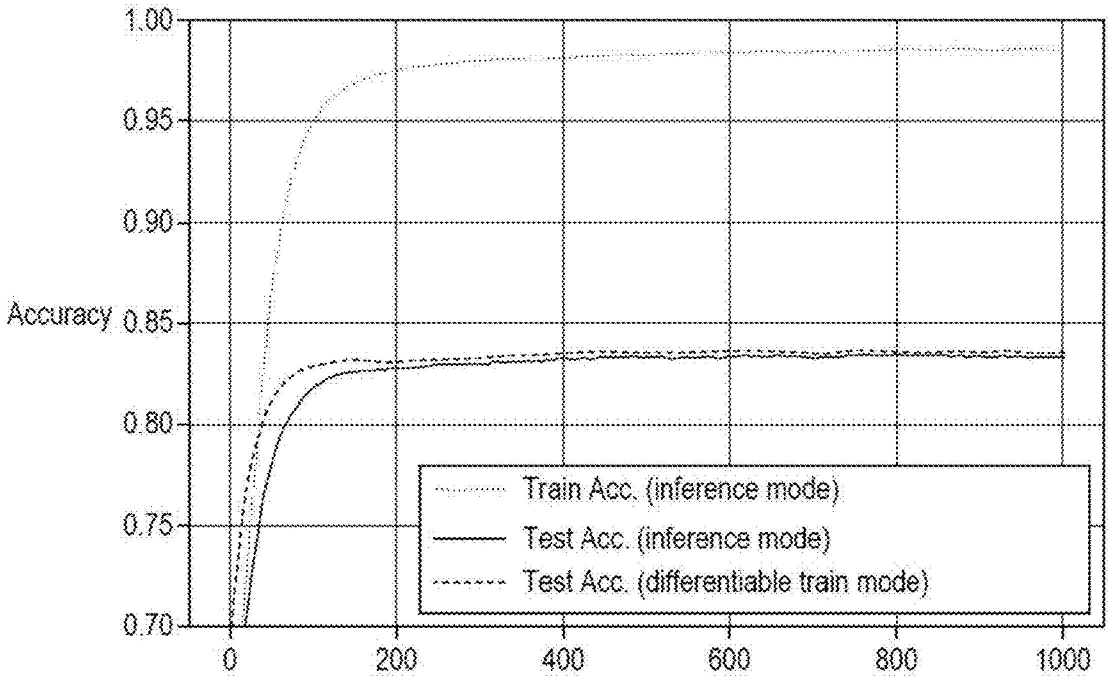
FIG. 24 illustrates an example plot comparing training and test accuracy between differentiable training mode and discretized inference mode, according to one embodiment.

FIG. 24 illustrates an example training and test accuracy plot 2400 (e.g., for a convolutional logic gate network trained on CIFAR-10) that compares (i) training accuracy in an inference (hard) mode, (ii) test accuracy in the inference (hard) mode, and (iii) test accuracy in a differentiable training mode, as a function of training progress/steps. FIG. 24 further illustrates that the resulting discretization error (i.e., the difference between inference-mode and differentiable-mode accuracy) is very small during late training, indicating that the operator-selection distributions converge to discrete choices as training progresses. In contrast, during early training, the discretization error may be larger because the model first learns a "smooth," differentiable network with higher uncertainty in individual gate choices, so discretization causes larger changes and may negatively affect accuracy.

Figure 25:
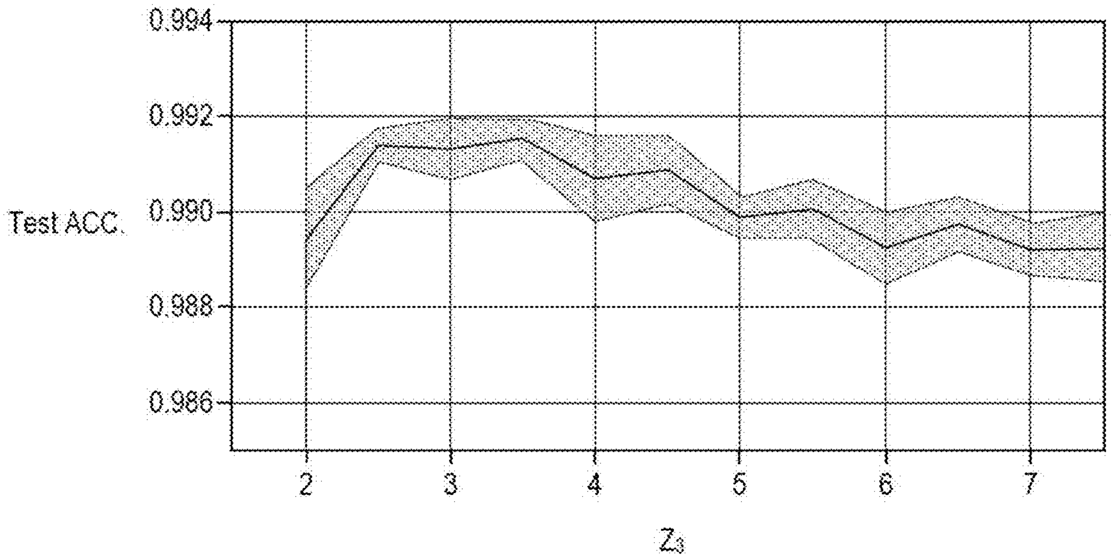
FIG. 25 illustrates an example plot of test accuracy versus a residual-initialization hyperparameter, according to one embodiment.

FIG. 25 illustrates a plot 2500 of an example sensitivity (ablation) study for a residual-initialization hyperparameter Z3. In the illustrated embodiment, Z3 controls the strength of the bias that an untrained differentiable logic gate network is initialized with toward feedforward behavior. In particular, Z3 may correspond to (or be used to set) an initial unnormalized score (e.g., a logit) for a feedforward logic gate operator (e.g., a direct-connection operator "A" that outputs one node input), relative to initial unnormalized scores for other candidate logic gate operators in a predefined set. The horizontal axis corresponds to Z3, and the vertical axis corresponds to test accuracy (Test ACC.) for a trained model (e.g., an MNIST classification model). The curves on the plot 2500 represent test accuracy obtained for different Z3 settings (e.g., in increments of about 0.5), and the curve and/or surrounding band represent the average and variability across a plurality of training runs. As illustrated, selecting Z3 to provide sufficiently strong residual initialization (e.g., Z3 at or above a threshold such as about 2) yields stable training and high test accuracy, whereas Z3 that is too small may fail to sufficiently bias the initial operator-selection distributions toward feedforward behavior, leading to unstable training and/or poor accuracy.

In some embodiments, Z3 is selected based on characteristics of the target architecture and/or training regimen. For example, deeper and/or larger models may require stronger residual initialization (i.e., a larger Z3) to preserve information flow and gradient propagation during early training, whereas shallower models and/or longer training regimens may tolerate, or even prefer, smaller Z3.

FIG. 26 illustrates a table 2600 with an example operator set for a two-input differentiable logic gate node, enumerating a plurality of candidate logic gate operators (e.g., sixteen operators corresponding to the sixteen possible Boolean functions of two inputs). In the illustrated embodiment, the table 2600 includes (i) an identifier (ID) for each operator, (ii) an operator name and/or Boolean form, (iii) a corresponding real-valued (continuous) relaxation formula, and (iv) a truth table indication (e.g., outputs for inputs 00, 01, 10, and 11). In some embodiments, the "real-valued" formulas correspond to probabilistic or fuzzy-logic relaxations in which node input activations A and B are treated as real values (e.g., probabilities) in [0,1], thereby enabling differentiability during training.

In some embodiments, the two-input candidate operators of FIG. 26 are represented in the discretized form as lookup-table (LUT) entries (truth tables) and/or as compact integer identifiers. For example, in a two-input case with inputs A and B, the truth table may be ordered as input patterns (A,B)=00, 01, 10, 11, yielding outputs (t00, t01, t10, t11). In one implementation, an operator identifier ID in the range 0-15 is computed as: $ID=t00+2\cdot t01+4\cdot t10+8\cdot t11$. In such embodiments, storing the selected operator for a node may include storing the ID and/or storing the corresponding 4-bit truth-table vector, and evaluating the node in the discretized network may include using the ID as a LUT index.

Under the above encoding, the single-input residual operators (i.e., operators that depend on only one input) correspond to the following IDs: NOT A has truth table (1,1,0,0) and ID=3; NOT B has truth table (1,0,1,0) and ID=5; B has truth table (0,1,0,1) and ID=10; and A has truth table (0,0,1,1) and ID=12. Accordingly, in certain embodiments, residual initialization comprises biasing the initial trainable parameters so that, prior to training, a disproportionate fraction of two-input nodes would be discretized to one of IDs 3, 5, 10, or 12 (e.g., ID=12 to implement a "wire A" pass-through), while training may subsequently cause at least some nodes to transition to other IDs that functionally depend on both inputs.

In various embodiments, the principles described with respect to the two-input operator set of FIG. 26 are extensible to multi-input nodes having k inputs, where $k\geq 3$. For a k-input node, the set of candidate discrete operations may include any subset (including all) of the 2^(2^k) Boolean functions of k Boolean inputs, and a discretized form of such a node may be represented as a lookup table having 2^k input patterns and a corresponding 2^k-bit output vector. For example, for a three-input node (k=3), there are 2^(2^3)=256 possible three-input Boolean operators, and the set of candidate node functions may include all 256 such operators. In this three-input case, the set of residual operators (i.e., operators that functionally depend on only a single input) includes at least six operators, namely the identity and inversion of each input (A, NOT A, B, NOT B, C, NOT C), and residual initialization may comprise biasing a disproportionate fraction of three-input nodes toward one or more such residual operators at initialization. More generally, for k-input nodes, the set of residual operators may include pass-through and inverter operators for each respective input, and different subsets of nodes may be residually initialized to different residual operators (e.g., a first subset initialized to pass through a first input and a second subset initialized to pass through a second input).

FIG. 27 illustrates a table 2700 of exemplary families of T-norm (triangular norm) functions that may be used as differentiable, real-valued implementations of conjunction (logical "AND") in a differentiable logic gate network, including implementations that operate on relaxed activations (e.g., probabilistic activations) in a continuous range such as [0,1]. In some embodiments, T-norms and T-conorms serve as building blocks of real-valued logics and may be used as alternatives to probabilistic T-norm/T-conorm implementations elsewhere in the disclosure.

FIG. 28 illustrates a table 2800 of exemplary families of T-conorm (triangular conorm) functions that may be used as differentiable, real-valued implementations of disjunction (logical "OR") in a differentiable logic gate network, including implementations that operate on relaxed activations in a continuous range, such as [0,1].

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, mathematical representations, combinations, and permutations of features, optional components, optional steps, and optional methods may be adapted for a specific environment and/or operating requirements without departing from the principles and scope of this disclosure. These and other changes or modifications, and all possible permutations and combinations of examples and embodiments disclosed, are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described with regard to various embodiments. However, benefits, advantages, solutions to problems, and any element(s) that may cause any benefit, advantage, or solution to occur or become more pronounced are not to be construed as a critical, required, or essential feature or element. Indeed, even inferior or non-optimized versions of the described embodiments are intended to be included within the scope of this disclosure. The scope of this disclosure includes the numbered claims below, and all claims and clauses in the applications to which this application claims priority, including all feasible combinations thereof.

What is claimed is:

1. A computing system, comprising:
one or more processors; and
a memory storing instructions that, when executed by the one or more processors, cause the computing system to:
instantiate an untrained node network comprising a plurality of nodes, wherein:
(i) each node of a first set of nodes of the plurality of nodes is parameterized by a set of differentiable parameters associated with a respective predefined set of potential logic gate operators, and
(ii) each node of a second set of nodes of the plurality of nodes corresponds to a respective predefined logic gate operator;
iteratively train the node network over a plurality of training iterations, each training iteration including:
computing, for each node in the first set of nodes, a respective node output based on the differentiable parameters thereof using a first relaxation for selecting a single logic gate operator from the set of potential logic gate operators,
computing, for each node in the second set of nodes, a respective node output based on the respective predefined logic gate operator using a second relaxation that is different from the first relaxation beyond the fact that the first relaxation uses differentiable parameters for selecting a single logic gate operator from the set of potential logic gate operators, and
applying updated differentiable parameters to at least one node in the first set of nodes; and
generate, after completion of the plurality of training iterations, a fixed logic gate network based on (i) the predefined logic gate operators of the second set of nodes, and (ii) a selection of a single logic gate operator from the set of potential logic gate operators based on the differentiable parameters of at least some nodes in the first set of nodes.

2. The computing system of claim 1, wherein the first relaxation is a probabilistic relaxation.

3. The computing system of claim 1, wherein the second relaxation uses at least one of:
(i) for at least one node of the second set of nodes that corresponds to a logical AND operator, a minimum operation as a relaxation of the logical AND operator; and
(ii) for at least one node of the second set of nodes that corresponds to a logical OR operator, a maximum operation as a relaxation of the logical OR operator.

4. The computing system of claim 3, wherein, for backpropagation through at least one node of the second set of nodes that uses the second relaxation, the computing system stores only path-selection information for routing a gradient, without storing an activation value of the at least one node.

5. The computing system of claim 3, wherein use of the second relaxation for the second set of nodes reduces memory consumption during training relative to using the first relaxation for all nodes.

6. The computing system of claim 3, wherein, at least two nodes of the first set are connected to one node of the second set, the node of the second set receiving the outputs of the at least two nodes of the first set, and wherein for backpropagation, a gradient is only routed through one path of the node of the second set such that the gradient is not backpropagated through all of the at least two nodes of the first set.

7. The computing system of claim 3, wherein the first relaxation is a probabilistic relaxation.

8. The computing system of claim 2, wherein the probabilistic relaxation comprises probabilities corresponding to each of the respective logic gate operators of the predefined set of logic gate operators based on the differentiable parameters, and wherein inputs to a respective node of the first set are input activation probabilities between 0 and 1, and wherein the training iterations further comprise computing an expectation value of an output under assumption of independent node input probabilities.

9. The computing system of claim 1, wherein the first relaxation is based on a Yager t-norm and Yager t-conorm, and wherein the second relaxation is based on the Hamacher t-norm and Hamacher t-conorm.

10. The computing system of claim 1, wherein the first relaxation comprises a continuous non-linear function of inputs to the respective node and differentiable parameters thereof.

11. The computing system of claim 1, wherein the first relaxation is a stochastic sampling-based relaxation, and wherein the second relaxation is a continuous relaxation.

12. The computing system of claim 1, wherein the second relaxation is used to impose a structural inductive bias in the node network.

13. The computing system of claim 12, wherein the structural inductive bias comprises using the second relaxation for spatial pooling in a convolutional logic gate network.

14. The computing system of claim 12, wherein the structural inductive bias comprises using the second relaxation for at least one temporal connection in a sequential logic gate network.

15. The computing system of claim 14, wherein the at least one temporal connection is implemented using at least one of a flip-flop, a latch, or another circuit element configured to convey information from a previous cycle.

16. The computing system of claim 12, wherein the structural inductive bias comprises using the second relaxation to combine an activation from one layer of the node network with a residual activation from a different layer of the node network.

17. The computing system of claim 1, wherein the predefined set of potential logic gate operators comprises entries of a lookup table.

18. The computing system of claim 1, wherein the predefined set of potential logic gate operators includes at least two elements, including one or more of: an AND operator, an OR operator, a NAND operator, a NOR operator, an XOR operator, a constant TRUE operator, a constant FALSE operator, an inverter operator, and a pass-through operator that outputs one of the node inputs.

19. An application-specific integrated circuit (ASIC), comprising:

logic circuitry implementing a fixed logic gate network for performing an inference task, the fixed logic gate network comprising a plurality of nodes, including:

a first set of nodes, each node of the first set implementing a respective selected logic gate operator selected from a respective predefined set of potential logic gate operators; and a second set of nodes, each node of the second set implementing a respective predefined logic gate operator, wherein the second set of nodes comprises a plurality of repeating structural inductive bias gates arranged at multiple locations in the fixed logic gate network to impose structural inductive bias on the fixed logic gate network;

wherein the fixed logic gate network implemented by the logic circuitry was generated by a training process comprising:

instantiating an untrained node network comprising a plurality of nodes, wherein:

(i) each node of a first set of nodes of the plurality of nodes is parameterized by a set of differentiable parameters associated with a respective predefined set of potential logic gate operators, and (ii) each node of a second set of nodes of the plurality of nodes corresponds to a respective predefined logic gate operator;

iteratively training the node network over a plurality of training iterations, each training iteration including:

computing, for each node in the first set of nodes, a respective node output based on the differentiable parameters thereof using a first relaxation for selecting among the set of potential logic gate operators, computing, for each node in the second set of nodes, a respective node output based on the respective predefined logic gate operator using a second relaxation different from the first relaxation, and applying updated differentiable parameters to at least one node in the first set of nodes; and generating, after completion of the plurality of training iterations, the fixed logic gate network based on (i) the predefined logic gate operators of the second set of nodes and (ii) selection of a single logic gate operator from the set of potential logic gate operators based on the differentiable parameters for at least some nodes of the first set of nodes.

20. The ASIC of claim 19, wherein at least a subset of the plurality of repeating structural inductive bias gates comprises one or more of:

(i) spatial pooling gates in a convolutional logic gate network, (ii) temporal connection gates in a sequential logic gate network, and (iii) gates configured to combine an activation from one layer with a residual activation from a different layer.

* * * * *